(12) United States Patent
Goel et al.

(10) Patent No.: US 11,200,733 B2
(45) Date of Patent: *Dec. 14, 2021

(54) PATCHED SHADING IN GRAPHICS PROCESSING

(71) Applicant: QUALCOMM Incorporated, San Diego, CA (US)

(72) Inventors: Vineet Goel, San Diego, CA (US); Andrew Evan Gruber, Arlington, MA (US); Donghyun Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/711,098

(22) Filed: Dec. 11, 2019

(65) Prior Publication Data

US 2020/0118328 A1 Apr. 16, 2020

Related U.S. Application Data

(63) Continuation of application No. 13/830,075, filed on Mar. 14, 2013, now Pat. No. 10,535,185.

(Continued)

(51) Int. Cl.
*G06T 15/80* (2011.01)
*G06T 15/00* (2011.01)
(Continued)

(52) U.S. Cl.
CPC ............. *G06T 15/80* (2013.01); *G06T 15/00* (2013.01); *G06T 15/005* (2013.01); *G06T 15/50* (2013.01); *G06T 17/20* (2013.01)

(58) Field of Classification Search
None
See application file for complete search history.

(56) References Cited

U.S. PATENT DOCUMENTS 5,109,504 A 4/1992 Littleton
5,870,604 A 2/1999 Yamagishi
(Continued)

FOREIGN PATENT DOCUMENTS

CN 1702692 A 11/2005
CN 1741066 A 3/2006
(Continued)

OTHER PUBLICATIONS

Advisory Action dated Apr. 15, 2016 from U.S. Appl. No. 01/120,813 (7 pages).

(Continued)

*Primary Examiner* — Saptarshi Mazumder
(74) *Attorney, Agent, or Firm* — Campbell C. Chiang

(57) ABSTRACT

Aspects of this disclosure relate to a process for rendering graphics that includes performing, with a hardware unit of a graphics processing unit (GPU) designated for vertex shading, a vertex shading operation to shade input vertices so as to output vertex shaded vertices, wherein the hardware unit adheres to an interface that receives a single vertex as an input and generates a single vertex as an output. The process also includes performing, with the hardware unit of the GPU designated for vertex shading, a hull shading operation to generate one or more control points based on one or more of the vertex shaded vertices, wherein the one or more hull shading operations operate on at least one of the one or more vertex shaded vertices to output the one or more control points.

27 Claims, 21 Drawing Sheets

Related U.S. Application Data

(60) Provisional application No. 61/620,340, filed on Apr. 4, 2012, provisional application No. 61/620,358, filed on Apr. 4, 2012, provisional application No. 61/620,333, filed on Apr. 4, 2012.

(51) Int. Cl.
   *G06T 17/20* (2006.01)
   *G06T 15/50* (2011.01)

(56) References Cited

U.S. PATENT DOCUMENTS

| | | | |
|---|---|---|---|
| 6,268,875 | B1 | 7/2001 | Duluk, Jr. et al. |
| 7,109,987 | B2 | 9/2006 | Goel et al. |
| 7,196,710 | B1 | 3/2007 | Fouladi et al. |
| 7,468,726 | B1 | 12/2008 | Wloka et al. |
| 7,570,267 | B2 | 8/2009 | Patel et al. |
| 7,671,862 | B1 | 3/2010 | Patel et al. |
| 7,701,459 | B1 | 4/2010 | Mrazek et al. |
| 7,739,473 | B1 | 6/2010 | Nordquist |
| 7,978,205 | B1 | 7/2011 | Patel et al. |
| 8,134,566 | B1 | 3/2012 | Brown et al. |
| 8,289,341 | B2 | 10/2012 | Sarel et al. |
| 8,436,854 | B2 | 5/2013 | Jiao et al. |
| 8,462,159 | B2 | 6/2013 | Lake et al. |
| 8,482,560 | B2 | 7/2013 | Sathe et al. |
| 8,499,305 | B2 | 7/2013 | Jiao |
| 8,922,565 | B2 | 12/2014 | Street |
| 9,412,197 | B2 | 8/2016 | Goel et al. |
| 9,947,130 | B2 | 4/2018 | Hasselgren et al. |
| 2002/0104077 | A1 | 8/2002 | Charnell et al. |
| 2003/0200538 | A1 | 10/2003 | Ebeling et al. |
| 2005/0225554 | A1 | 10/2005 | Bastos et al. |
| 2005/0243094 | A1 | 11/2005 | Patel et al. |
| 2007/0083870 | A1 | 4/2007 | Kanakogi |
| 2008/0094408 | A1 | 4/2008 | Yin et al. |
| 2008/0270753 | A1 | 10/2008 | Achiwa et al. |
| 2009/0051687 | A1 | 2/2009 | Kato et al. |
| 2009/0073168 | A1 | 3/2009 | Jiao et al. |
| 2009/0122068 | A1 | 5/2009 | Garritsen |
| 2009/0147017 | A1 | 6/2009 | Jiao |
| 2009/0189896 | A1 | 7/2009 | Jiao et al. |
| 2009/0237401 | A1 | 9/2009 | Wei et al. |
| 2009/0295804 | A1 | 12/2009 | Goel et al. |
| 2010/0079454 | A1 | 4/2010 | Legakis et al. |
| 2010/0123717 | A1 | 5/2010 | Jiao et al. |
| 2010/0164954 | A1* | 7/2010 | Sathe ............... G06T 17/20 345/423 |
| 2010/0328309 | A1 | 12/2010 | Sarel et al. |
| 2011/0037769 | A1 | 2/2011 | Chen et al. |
| 2011/0050716 | A1 | 3/2011 | Mantor et al. |
| 2011/0080404 | A1 | 4/2011 | Rhoades et al. |
| 2011/0084975 | A1 | 4/2011 | Duluk, Jr. et al. |
| 2011/0084976 | A1* | 4/2011 | Duluk, Jr. ............ G06T 15/005 345/522 |
| 2011/0102448 | A1 | 5/2011 | Hakura et al. |
| 2011/0115802 | A1 | 5/2011 | Mantor et al. |
| 2011/0267346 | A1 | 11/2011 | Howson |
| 2011/0310102 | A1* | 12/2011 | Chang ............... G06T 17/20 345/423 |
| 2012/0223947 | A1 | 9/2012 | Nystad et al. |
| 2012/0229460 | A1 | 9/2012 | Fortin |
| 2013/0265307 | A1 | 10/2013 | Goel et al. |
| 2013/0265308 | A1 | 10/2013 | Goel et al. |
| 2013/0265309 | A1 | 10/2013 | Goel et al. |

FOREIGN PATENT DOCUMENTS

| | | |
|---|---|---|
| CN | 101017566 A | 8/2007 |
| CN | 101156176 A | 4/2008 |
| CN | 101271584 A | 9/2008 |
| CN | 101714247 A | 5/2010 |
| CN | 101877116 A | 11/2010 |
| CN | 101894358 A | 11/2010 |
| CN | 101937556 A | 1/2011 |
| CN | 102016928 A | 4/2011 |
| CN | 102135916 A | 7/2011 |
| CN | 102184522 A | 9/2011 |
| CN | 102272798 A | 12/2011 |
| GB | 2488667 A | 9/2012 |
| JP | 2010086528 A | 4/2010 |
| JP | 2011227864 A | 11/2011 |
| KR | 20060044935 A | 5/2006 |
| KR | 20100036183 A | 4/2010 |
| KR | 20110112828 A | 10/2011 |
| WO | 2007049610 A1 | 5/2007 |
| WO | 2009058845 A1 | 5/2009 |
| WO | 2009073516 A1 | 6/2009 |
| WO | 2010078153 A2 | 7/2010 |
| WO | 2010138870 A2 | 12/2010 |
| WO | 2010141612 A1 | 12/2010 |
| WO | 2011028986 A2 | 3/2011 |
| WO | 2011135316 A2 | 11/2011 |

OTHER PUBLICATIONS

Advisory Action from U.S. Appl. No. 01/120,815 dated Nov. 24, 2015 (3 pages).

Amendment from U.S. Appl. No. 13/829,900, filed Jun. 26, 2015, 16 pp.

Amendment from U.S. Appl. No. 01/120,811,dated Sep. 3, 2015, 12 pp.

Amendment in response to Final Office Action dated Sep. 10, 2015 and Advisory Action dated Nov. 24, 2015 from U.S. Appl. No. 13/829,900, filed Dec. 10, 2015 (17 pages).

Amendment in response to Final Office Action dated Sep. 10, 2015 from U.S. Appl. No. 13/829,900, filed Nov. 10, 2015 (17 pages).

Amendment in response to Office Action dated Jan. 20, 2016 from U.S. Appl. No. 13/829,900, filed Apr. 20, 2016 (17 pages).

Anonymous: "Direct3D 11," InternetArchive-WayBackMachine / Wikipedia, Nov. 11, 2009, Retrieved from the Internet: URL: https://web.archive.org/web/ZOO91111075731/https://en.wikipedia.org/wiki/Direct3D#cite_note-gamefest . . . [retrieved on Jul. 5, 2018] (10 pp).

Blythe D., "SIGGRAPH 2006 Course 3 Notes GPU Shading and Rendering: Chap 2: Direct3d 10 (David Blythe)," Microsoft Corporation, 2006, XP002738238, Retrieved from the Internet, [retrieved on Apr. 8, 2015], p. 2-1, pgph.1; p. 2-2, pgph.1; p. 2-2 to 2-3 section "Geometry Shader Stage"; p. 2-4, section "PrimitiveID p. 2-6, section" 1.2.1 Vertex Shader Stage,"therin, pgph.1; p. 2-6, section " 1.2.2 Geometry Shader Stage p. 2-9, pgph.2-3.

Blythe D., "Rise of the Graphics Processor", Proceedings of the IEEE, IEEE, New York, US, vol. 96, No. 5, May 1, 2008 (May 1, 2008), XP011207764, ISSN: 0018-9219, pp. 761-778.

Chung K., et al., "Memory Bandwidth Saving by Hardware Tessellation with Vertex Shader," Electronics Letters, Feb. 26, 2009, vol. 45 (5), pp. 259-261, XP006032654, ISSN: 1350-911X, DOI: 10.1049/EL: 20092624 the whole document.

Final Office Action from U.S. Appl. No. 13/830,075 dated Jan. 5, 2016 (33 pages).

Final Office Action from U.S. Appl. No. 01/120,815, dated Sep. 10, 2015, 42 pp.

Final Rejection from U.S. Appl. No. 01/120,815, dated Jul. 21, 2016, 19 pp.

Foley T., et al., "Spark: Modular, composable shaders for graphics hardware", ACM Transactions On Graphics—Proceedings of ACM SIGGRAPH 2011, SIGGRAPH 2011 Jul. 2011 Association for Computing Machinery USA, vol. 30, No. 4, Jul. 2011 (Jul. 2011), XP002738836, pp. 1-12, DOI: 10.1145/1964921.1965002.

Goto H, "Will DirectX 11 Change Graphics Chip?," Nikkei Win PC, Japan, Nikkei Business Publications, Inc., Sep. 1, 2009, vol. 15, 14th issue, pp. 174-175.

International Preliminary Report on Patentability from International Applicaiton No. PCT/US2013/032098, dated Jun. 9, 2015, 10 pp.

International Preliminary Report on Patentability from International Application No. PCT/US2013/032123, dated Aug. 6, 2015, 15 pp.

International Preliminary Report on Patentability from International Application No. PCT/US2013/032136, dated Aug. 6, 2015, 14 pp.

(56) References Cited

OTHER PUBLICATIONS

International Search Report and Written Opinion from International Application No. PCT/US2013/032136, dated Jul. 28, 2015, 19 pp.
International Search Report and Written Opinion—PCT/US2013/032098—ISA/EPO—May 11, 2015.
International Search Report and Written Opinion—PCT/US2013/032123—ISA/EPO—Jul. 28, 2015.
Kim T-Y., et al., "A Unified Shader Based on the OpenGL ES 2.0 for 3D Mobile Game Development", Jun. 11, 2007 (Jun. 11, 2007), Technologies for E-Learning and Digital Entertainment; [Lecture Notes in Computer Science;; LNCS], Springer Berlin Heidelberg, Berlin, Heidelberg, pp. 898-903, XP019061730, ISBN: 978-3-540-73010-1.
Kobayashi A., et al., "A Video Compositing System Using GPU for Live Video Performance," Journal Transaction of IPSJ Heisei 22nd 2 [CD-ROM], Japan, The Information Processing Society of Japan, Apr. 15, 2011, vol. 4, 1, pp. 76-89.
Kovacs D., et al., "Real-Time Creased Approximate Subdivision Surfaces with Displacements," IEEE Transactions an Visualization and Computer Graphics, vol. 16, No. 5, Sep./Oct. 2010, pp. 742-751.
Loop C., et al., "Approximating Subdivision Surfaces with Gregory Patches for Hardware Tessellation", Dec. 1, 2009 (Dec. 1, 2009), pp. 1-9, XP002721769, Retrieved from the Internet: URL: http://research.microsoft.com/en-us/um/people/cloop/sga09.pdf [retrieved on Mar. 14, 2014] figure 2.
Loop C., "Hardware Subdivision and Tessellation of Catmuii-Ciark Surfaces", Technical Report MSR-TR-2010-163, Microsoft Corporation, May 11, 2010, pp. 1-15.
Ni T., et al., "Efficient substitutes for subdivision surfaces", ACM SIGGRAPH 2009 Courses, Aug. 3, 2009 (Aug. 3, 2009), pp. 1-107, XP055084843, New York, NY, USA DOI: 10.1145/1667239.1667252.
Ni T., et al., "GPU smoothing of quad meshes", IEEE International Conference On Shape Modeling and Applications, SMI 2008, Piscataway, NJ, USA, Jun. 4, 2008 (Jun. 4, 2008), pp. 3-9, XP031275301, ISBN: 978-1-4244-2260-9, section "4 GPU Implementation" on p. 6-7.
Non-Final Office Action from U.S. Appl. No. 13/830,075 dated Sep. 16, 2016 (45 pages).
Notice of Allowance from U.S. Appl. No. 13/830,145 dated Apr. 11, 2016 (8 pages).
Notice of Allowance from U.S. Appl. No. 13/830,145, dated Nov. 18, 2015, 7 pp.
NRTTKR: "Direct3D 11", I/O, Japan Society of Engineering Corporation, Nov. 1, 2008, vol. 33, No. 11, pp. 92-94.
"NVIDIA GeForce 8 GPU", ASHU REGE, Director of Developer Technology, 2007, 112 Pages.
Office Action from U.S. Appl. No. 13/829,900 dated Jan. 20, 2016 (17 pages).
Office Action from U.S. Appl. No. 13/829,900, dated Mar. 26, 2015, 33 pp.
Office Action from U.S. Appl. No. 13/830,075, dated Jun. 11, 2015, 28 pp.
Office Action from U.S. Appl. No. 13/830,145, dated Jun. 3, 2015, 5 pp.
Owens J.D., et al., "GPU Computing", Proceedings of the IEEE, IEEE, New York, US, vol. 96, No. 5, May 1, 2008 (May 1, 2008), pp. 879-899, XP011207684, ISSN: 0018-9219.
Partial International Search Report—PCT/US2013/032123—ISA/EPO—dated May 22, 2015.
Partial International Search Report—PCT/US2013/032136—ISAEPO—dated May 22, 2015.
Response to Final Office Action dated Jan. 5, 2016 from U.S. Appl. No. 13/830,075, filed Mar. 4, 2016 (17 pages).
Response to Office Action dated Jun. 11, from U.S. Appl. No. 13/830,075, filed Sep. 11, 2015, 16 pp.
Response to Office Action dated Sep. 16, 2016, from U.S. Appl. No. 13/830,075, filed Dec. 16, 2016, 10 pp.
Riffel A., et al., "Mio: Fast multipass partitioning via priority-based instruction scheduling", Proceedings of the SIGGRAPH/Eurographics Workshop On Graphics Hardware—Graphics Hardware 2004—Eurographics Symposium Proceedings 2004 Association for Computing Machinery USA, 2004, pp. 35-44, XP002738522, p. 36, left col., ppgh.4-5.
State Intellectual Property Office of the People's Republic of China Notification of Examination Decision for Invalidation Request, Application/Patent No. 201380018326.0; Case No. 4W107661, Aug. 26, 2019, 30 pages.
Valdetaro A., et al., "Understanding Shader Model 5.0 with DirectX 11", IX Sbgames, Brazilian Symposium on Computer Games and Digital Entertainment, Floranopolis, Nov. 8-10, 2010, Nov. 8, 2010 (Nov. 8, 2010), pp. 1-18, XP055169555, Retrieved from the Internet: URL: http://webserver2.tecgraf.puc-rio.br/~abraposo/pubs/SBGames2010/SBGames2010_Tutorial.pdf [retrieved on Feb. 13, 2015].
Wittenbrink C.M., et al., "Fermi GF100 GPU Architecture", IEEE Micro, IEEE Service Center, Los Alamitos, CA, US, vol. 31, No. 2, Mar. 1, 2011 (Mar. 1, 2011), pp. 50-59, XP011353945, ISSN: 0272-1732, DOI: 10.1109/MM.2011.24, section "Tessellation" starting on p. 54.

* cited by examiner

```
VS:    'Normal' VS code    //can use instanceID, initial registers stores primitveiD,
                           //misc, rel_prim
                           // Data left in GPRs
       END_FINAL;          // End if DX9 style Shader – ignore otherwise note
                           // that it is SP which writes gprs to VPC if shader ends.
```

```
       LM_Vs_offset = rel_primID*PRIM_SIZE + rel_vertex*VERT_SIZE;

Write vertex data in GPR to LM_Vs_offset

CHMSK               // use cov_mask_1 for second stage, switch to second
                           // shader resources (switch resource ptr to GS resources
                           // offset)

CHSH                // Switch to GS program counter and state offsets
```

```
GS:    For (vertex_id= 0; vertex_id++; vertex_id <= max_input)
          {   Load from LM using  offset = rel_primID*PRIM_SIZE + vertex_id *
              VERT_SIZE
              // fetch from LM using base address computed by HLSQ
          }
       for(streamid =0;streamid++;streamid<4);
       cut[streamid] = true;
       gsoutount = 0;

// 'normal' GS code
       {.. using primitiveID, GSInstanceID
       CUT(streamid):     { Cut[streamid] = true;}
       EMIT(streamid): {
              If(Gsoutcount==GsoutvertID){
                     oPos = vertex.pos; oColor =vertex.clr;
                     oMisc = (cut[streamid],streamid)
                     gsoutcount = maxoutputvertexcount;
                     go to END_FINAL;  // optional
              }
              cut[streamid] = false;
              gsoutcount++;
       }

If (gsoutcount < maxoutputvertexcount)
              KILL PRIM;  //eliminate any 'leftover' fibers

END_FINAL;
```

FIG. 5B

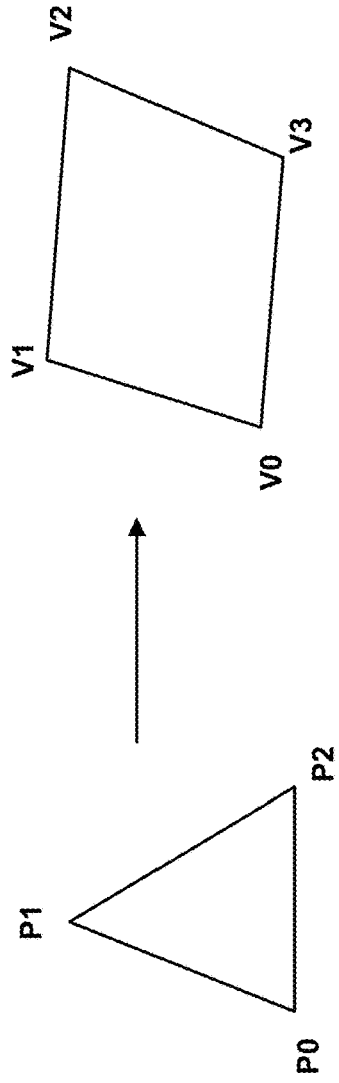

PER_PATCH_FIBERS = MAX(INPUT PATCH CONTROL POINT, OUTPUT PATCH CONTROL POINTS) = 4

| P0, LPATCH = 0 | P2, LPATCH = 0 | X, LPATCH = 0 |
| VS(P0) | VS(P1) | VS(P2) | X |
| END (VS) | | |

COPY VS OUTPUT GPRS TO LOCAL MEMORY SP
CHANGES CONSTANT/TEXTURE OFFSET PTRS;
CHANGE SHADER TO HS

| OUTVERT = 0 | OUTVERT = 1 | OUTVERT = 2 | OUTVERT = 3 |
| USE LPATCH DATA TO | | | |
| COMPUTE V# | | | |
| V0 | V1 | V2 | V3 |

WRITE V# OUTPUT TO L2/OFF-CHIP OR LOCAL MEMORY

FORK FIBERS

WRITE CONSTANT OUTPUT TO L2/OFF-CHIP OR LOCAL MEMORY

FORK FIBERS

FIG. 11

```
//VFD fetches vertex data based on vertex index and
//valid vertex. It should load vertex data to valid vertices
VS:    'Normal' VS code    // can use instanceID
                           // Data left in GPRs
       END_FINAL;          // End if DX9 style Shader – ignore otherwise
```

```
       LM_Vs_offset = rel_primID*PRIM_SIZE + rel_vertex*VERT_SIZE;

Write vertex data in GPR to LM_Vs_offset

CHMSK;              // use cov_mask_1 for second stage, switch to second
                           // shader resources (switch resource ptr to HS
                           // resources offset)

CHSH                // switch to shader program counter and state offsets
                           // (HS PC/offsets)
```

```
HS:    For (vertex_id= 0; vertex_id++; vertex_id <= max_input)
       {      Load from LM using offset = rel_primID*PRIM_SIZE + vertex_id *
              VERT_SIZE
              // fetch from LM using base address computed by HLSQ
       }

For (hsoutcount =0;hscountcount++;hsoutcount<=maxout)    // this can be
                                                                // done using fork(#_output_pnts)
       {      // HS code computing HS output vertex
              ... using primitiveID
           Mem_offset = rel_patchid*OUTPUT_PRIM_SIZE + outVertID *
           OUTPUT_VERTEX_SIZE + SCRATCH_MEMORY_CONTROL_BASE If (hscount == outVertID)      // done if patch output points are
                                          // processed serially
              (export computed vertex to mem_offset)
       }
       For (fork_id = outVertID;fork_id += WAVE_OUT_SIZE;fork_id <n)
       {
              Fork(fork_id)    // spread fork(n) instruction among
                               // fibers_per_prim for parallel computation
       }
         if (outVertID == 0)
       {      Join           // use only one fiber with outVertID=0
              Tf_offset = rel_patchid* TF_OUT_SIZE+ tess_attr +
              SCRATCH_MEMORY_TESS_BASE;    // write tessellation factors in
                                           // tessellation factor memory
              Write primitiveID
              Write tessellation factors
       }
         END_FINAL;
```

FIG. 12B

```
// VFD does not fetch any data
// InstanceID = rel_patchID
// (u,v) comes in different gprs
// compiler has complied DS code with the expectation for patchID in a gpr so SP
  can load instanceID which really represents rel_patchID to this gpr DS:   Compute  patch_ptr  =  rel_patchid * OUTPUT_PRIM_SIZE  +
      SCRATCH_MEMORY_CONTROL_BASE.
      'Normal' DS code
      // using patch_ptr + OUTPUT_VERTEX_SIZE * control_pointID to access
        HS output control points
      // using patch_ptr + OUTPUT_VERTEX_SIZE * num_output_control_pts to
        access HS constant data using (u,v) to compute tessellated point // Data left in GPRs
      END_FINAL; // End if DX11 DS Shader without GS – ignore otherwise
                  // note that it is SP which writes gprs to VPC if shader ends.
```

```
      LM_Vs_offset = rel_primID*PRIM_SIZE + rel_vertex*VERT_SIZE;

Write vertex data in GPR to LM_Vs_offset

CHMSK;      // switch resource ptr to GS resources offset
                  // use cov_mask_1 for second stage CHSH        // switch to GS program counter and state offsets
```

```
GS:   For (vertex_id= 0; vertex_id++; vertex_id <= max_input)
        {  Load from LM using  offset = rel_primID*PRIM_SIZE + vertex_id *
           VERT_SIZE
           // fetch from LM using base address computed by HLSQ
        }
      for(streamid =0;streamid++;streamid<4);
      cut[streamid] = true;
      gsoutount = 0;

// 'normal' GS code
      {.. using primitiveID, GSInstanceID
      CUT(streamid):    { Cut[streamid] = true;}
      EMIT(streamid): {
            If(Gsoutcount==GsoutvertID){
                  oPos = vertex.pos; oColor =vertex.clr;
                  oMisc = (cut[streamid],streamid)
                  gsoutcount = maxoutputvertexcount;
                  go to END_FINAL;  // optional
            }
            cut[streamid] = false;
            gsoutcount++;
      }

If (gsoutcount < maxoutputvertexcount)
            KILL PRIM;  //eliminate any 'leftover' fibers

END_FINAL;
```

FIG. 13B

PATCHED SHADING IN GRAPHICS PROCESSING

This application is a continuation of U.S. patent application Ser. No. 13/830,075, filed 14 Mar. 2013, which claims the benefit of U.S. Provisional Application 61/620,340, filed 4 Apr. 2012, U.S. Provisional Application 61/620,358, filed 4 Apr. 2012, and U.S. Provisional Application 61/620,333, filed 4 Apr. 2012, the entire contents of all of which are incorporated herein by reference.

TECHNICAL FIELD

This disclosure relates to computer graphics.

BACKGROUND

A device that provides content for visual presentation generally includes a graphics processing unit (GPU). The GPU renders pixels that are representative of the content on a display. The GPU generates one or more pixel values for each pixel on the display to render each pixel for presentation.

In some instances, a GPU may implement a unified shader architecture for rendering graphics. In such instances, the GPU may configure a plurality of similar computing units to execute a pipeline of different shading operations. The computing units may be referred to as unified shading units or unified shader processors.

SUMMARY

The techniques of this disclosure generally relate to performing shading operations associated with shader stages of a graphics rendering pipeline. For example, a graphics processing unit (GPU) may invoke one or more shading units to perform shading operations associated with a shader stage of the graphics rendering pipeline. According to aspects of this disclosure, the GPU may then perform shading operations associated with a second, different shader stage of the graphics rendering pipeline with the shading units that are designated for performing the first shading operations. For example, the GPU may perform shading operations associated with the second stage while adhering to an input/output interface associated with the first shader stage. In this way, the GPU may emulate a GPU having greater shading resources by performing multiple shading operations with the same shading units.

In an example, aspects of this disclosure relate to a method of rendering graphics that includes performing, with a hardware shading unit of a graphics processing unit designated for vertex shading, vertex shading operations to shade input vertices so as to output vertex shaded vertices, wherein the hardware unit is configured to receive a single vertex as an input and generate a single vertex as an output, and performing, with the hardware shading unit of the graphics processing unit, a geometry shading operation to generate one or more new vertices based on one or more of the vertex shaded vertices, wherein the geometry shading operation operates on at least one of the one or more vertex shaded vertices to output the one or more new vertices.

In another example, aspects of this disclosure relate to a graphics processing unit for rendering graphics that includes one or more processors configured to perform, with a hardware shading unit of the graphics processing unit designated for vertex shading, vertex shading operations to shade input vertices so as to output vertex shaded vertices, wherein the hardware unit is configured to receive a single vertex as an input and generate a single vertex as an output, and perform, with the hardware shading unit of the graphics processing unit, a geometry shading operation to generate one or more new vertices based on one or more of the vertex shaded vertices, wherein the geometry shading operation operates on at least one of the one or more vertex shaded vertices to output the one or more new vertices.

In another example, aspects of this disclosure relate to an apparatus for rendering graphics that includes means for performing, with a hardware shading unit of a graphics processing unit designated for vertex shading, vertex shading operations to shade input vertices so as to output vertex shaded vertices, wherein the hardware unit is configured to receive a single vertex as an input and generate a single vertex as an output, and means for performing, with the hardware shading unit of the graphics processing unit, a geometry shading operation to generate one or more new vertices based on one or more of the vertex shaded vertices, wherein the geometry shading operation operates on at least one of the one or more vertex shaded vertices to output the one or more new vertices.

In another example, aspects of this disclosure relate to a non-transitory computer-readable medium having instructions stored thereon that, when executed, cause one or more processors to, with a hardware shading unit designated for vertex shading, perform vertex shading operations to shade input vertices so as to output vertex shaded vertices, wherein the hardware unit is configured to receive a single vertex as an input and generate a single vertex as an output, and with the hardware shading unit that is designated for vertex shading, perform a geometry shading operation to generate one or more new vertices based on one or more of the vertex shaded vertices, wherein the geometry shading operation operates on at least one of the one or more vertex shaded vertices to output the one or more new vertices.

In another example, aspects of this disclosure relate to a method for rendering graphics that includes performing, with a hardware unit of a graphics processing unit designated for vertex shading, a vertex shading operation to shade input vertices so as to output vertex shaded vertices, wherein the hardware unit adheres to an interface that receives a single vertex as an input and generates a single vertex as an output, and performing, with the hardware unit of the graphics processing unit designated for vertex shading, a hull shading operation to generate one or more control points based on one or more of the vertex shaded vertices, wherein the one or more hull shading operations operate on at least one of the one or more vertex shaded vertices to output the one or more control points.

In another example, aspects of this disclosure relate to a graphics processing unit for rendering graphics that includes one or more processors configured to perform, with a hardware unit of the graphics processing unit designated for vertex shading, a vertex shading operation to shade input vertices so as to output vertex shaded vertices, wherein the hardware unit adheres to an interface that receives a single vertex as an input and generates a single vertex as an output, and perform, with the hardware unit of the graphics processing unit designated for vertex shading, a hull shading operation to generate one or more control points based on one or more of the vertex shaded vertices, wherein the one or more hull shading operations operate on at least one of the one or more vertex shaded vertices to output the one or more control points.

In another example, aspects of this disclosure relate to an apparatus for rendering graphics that includes means for performing, with a hardware unit of a graphics processing unit designated for vertex shading, a vertex shading operation to shade input vertices so as to output vertex shaded vertices, wherein the hardware unit adheres to an interface that receives a single vertex as an input and generates a single vertex as an output, and means for performing, with the hardware unit of the graphics processing unit designated for vertex shading, a hull shading operation to generate one or more control points based on one or more of the vertex shaded vertices, wherein the one or more hull shading operations operate on at least one of the one or more vertex shaded vertices to output the one or more control points.

In another example, aspects of this disclosure relate to a non-transitory computer-readable medium having instructions stored thereon that, when executed, cause one or more processors to perform, with a hardware unit of a graphics processing unit designated for vertex shading, a vertex shading operation to shade input vertices so as to output vertex shaded vertices, wherein the hardware unit adheres to an interface that receives a single vertex as an input and generates a single vertex as an output, and perform, with the hardware unit of the graphics processing unit designated for vertex shading, a hull shading operation to generate one or more control points based on one or more of the vertex shaded vertices, wherein the one or more hull shading operations operate on at least one of the one or more vertex shaded vertices to output the one or more control points.

In an example, aspects of this disclosure relate to a method of rendering graphics that includes designating a hardware shading unit of a graphics processing unit to perform first shading operations associated with a first shader stage of a rendering pipeline, switching operational modes of the hardware shading unit upon completion of the first shading operations, and performing, with the hardware shading unit of the graphics processing unit designated to perform the first shading operations, second shading operations associated with a second, different shader stage of the rendering pipeline.

In another example, aspects of this disclosure relate to a graphics processing unit for rendering graphics comprising one or more processors configured to designate a hardware shading unit of the graphics processing unit to perform first shading operations associated with a first shader stage of a rendering pipeline, switch operational modes of the hardware shading unit upon completion of the first shading operations, and perform, with the hardware shading unit of the graphics processing unit designated to perform the first shading operations, second shading operations associated with a second, different shader stage of the rendering pipeline.

In another example, aspects of this disclosure relate to an apparatus for rendering graphics that includes means for designating a hardware shading unit of a graphics processing unit to perform first shading operations associated with a first shader stage of a rendering pipeline, means for switching operational modes of the hardware shading unit upon completion of the first shading operations, and means for performing, with the hardware shading unit of the graphics processing unit designated to perform the first shading operations, second shading operations associated with a second, different shader stage of the rendering pipeline.

In another example, aspects of this disclosure relate to a non-transitory computer-readable medium having instructions stored thereon that, when executed, cause one or more processors to designate a hardware shading unit of a graphics processing unit to perform first shading operations associated with a first shader stage of a rendering pipeline, switch operational modes of the hardware shading unit upon completion of the first shading operations, and perform, with the hardware shading unit of the graphics processing unit designated to perform the first shading operations, second shading operations associated with a second, different shader stage of the rendering pipeline.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 5B illustrates pseudo code corresponding to the flow of operations shown in FIG. 5A, which may be executed by the merged vertex shader/geometry shader hardware shading unit.

FIG. 11 is a diagram illustrating example operations of a hardware shading unit that implements the techniques described in this disclosure to perform vertex shading and hull shading operations.

FIG. 12B generally illustrates pseudo code corresponding to the flow of operations shown in FIG. 12A, which may be executed by the merged vertex shader/hull shader hardware shading unit.

FIG. 13B generally illustrates pseudo code corresponding to the flow of operations shown in FIG. 13A, which may be executed by the merged domain shader/geometry shader hardware shading unit.

DETAILED DESCRIPTION

The techniques of this disclosure generally relate to performing shading operations associated with shader stages of a graphics rendering pipeline. For example, a graphics processing unit (GPU) may invoke one or more shading units to perform shading operations associated with a shader stage of the graphics rendering pipeline. According to aspects of this disclosure, the GPU may then perform shading operations associated with a second, different shader stage of the graphics rendering pipeline with the shading units that are designated for performing the first shading operations. For example, the GPU may perform shading operations associated with the second stage while adhering to an input/output interface associated with the first shader stage. In this way, the GPU may emulate a GPU having greater shading resources by performing multiple shading operations with the same shading units.

Figure 1:
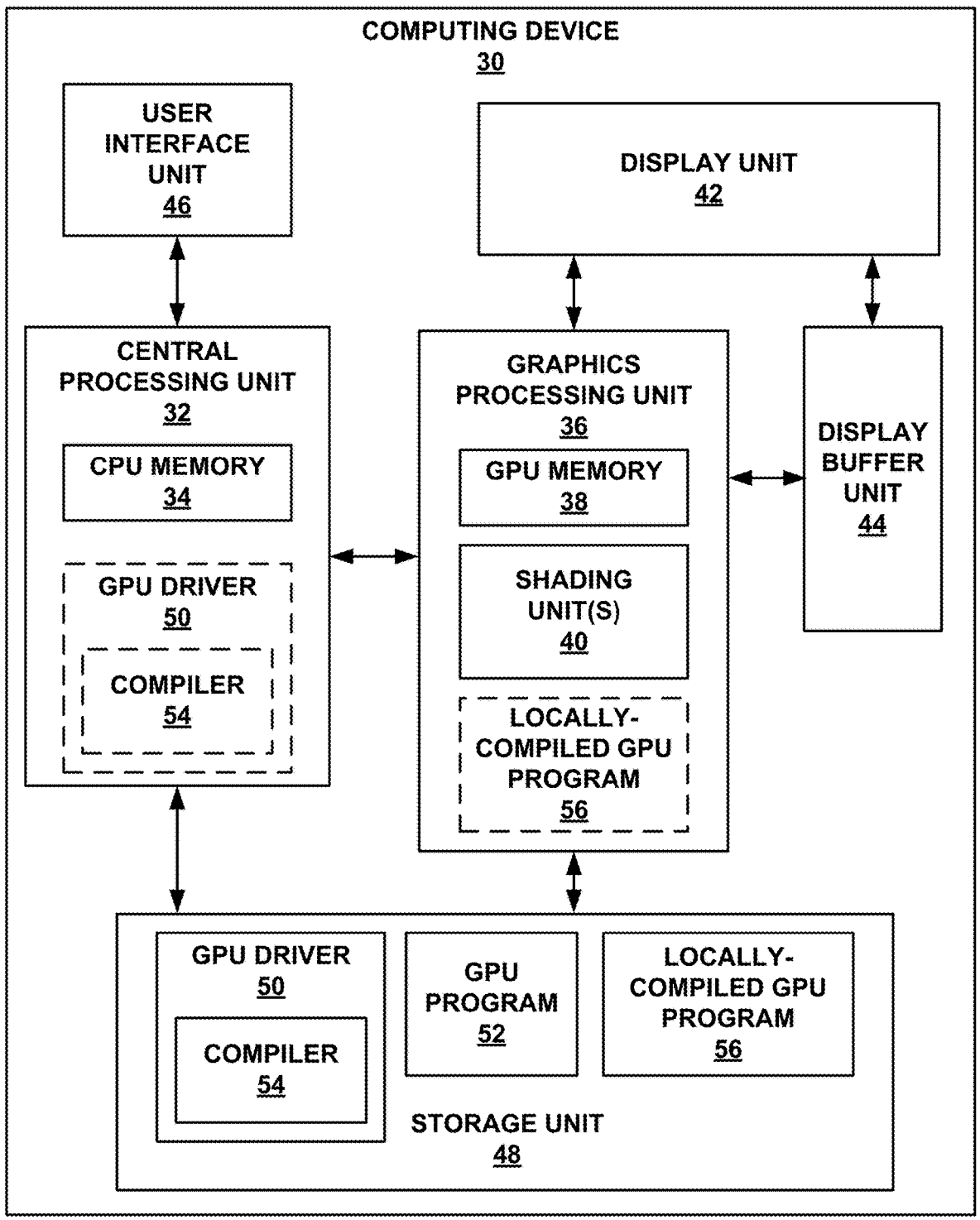
FIG. 1 is a block diagram illustrating a computing device that may implement the techniques described in this disclosure.

FIG. 1 is a block diagram illustrating a computing device 30 that may implement the techniques described in this disclosure. Examples of computing device 30 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like.

In the example of FIG. 1, computing device 30 includes a central processing unit (CPU) 32 having CPU memory 34, a graphics processing unit (GPU) 36 having GPU memory 38 and one or more shading units 40, a display unit 42, a display buffer unit 44, a user interface unit 46, and a storage unit 48. In addition, storage unit 48 may store GPU driver 50 having compiler 54, GPU program 52, and locally-compiled GPU program 56.

Examples of CPU 32 include, but are not limited to, a digital signal processor (DSP), general purpose microprocessor, application specific integrated circuit (ASIC), field programmable logic array (FPGA), or other equivalent integrated or discrete logic circuitry. Although CPU 32 and GPU 36 are illustrated as separate units in the example of FIG. 1, in some examples, CPU 32 and GPU 36 may be integrated into a single unit. CPU 32 may execute one or more applications. Examples of the applications may include web browsers, e-mail applications, spreadsheets, video games, audio and/or video capture, playback or editing applications, or other applications that initiate the generation for image data to be presented via display unit 42.

In the example shown in FIG. 1, CPU 32 includes CPU memory 34. CPU memory 34 may represent on-chip storage or memory used in executing machine or object code. CPU memory 34 may each comprise a hardware memory register capable of storing a fixed number of digital bits. CPU 32 may be able to read values from or write values to local CPU memory 34 more quickly than reading values from or writing values to storage unit 48, which may be accessed, e.g., over a system bus.

GPU 36 represents one or more dedicated processors for performing graphical operations. That is, for example, GPU 36 may be a dedicated hardware unit having fixed function and programmable components for rendering graphics and executing GPU applications. GPU 36 may also include a DSP, a general purpose microprocessor, an ASIC, an FPGA, or other equivalent integrated or discrete logic circuitry.

GPU 36 also includes GPU memory 38, which may represent on-chip storage or memory used in executing machine or object code. GPU memory 38 may each comprise a hardware memory register capable of storing a fixed number of digital bits. GPU 36 may be able to read values from or write values to local GPU memory 38 more quickly than reading values from or writing values to storage unit 48, which may be accessed, e.g., over a system bus.

GPU 36 also includes shading units 40. As described in greater detail below, shading units 40 may be configured as a programmable pipeline of processing components. In some examples, shading units 40 may be referred to as "shader processors" or "unified shaders," and may perform geometry, vertex, pixel, or other shading operations to render graphics. Shading units 40 may include a one or more components not specifically shown in FIG. 1 for purposes of clarity, such as components for fetching and decoding instructions, one or more arithmetic logic units ("ALUs") for carrying out arithmetic calculations, and one or more memories, caches, or registers.

Display unit 42 represents a unit capable of displaying video data, images, text or any other type of data for consumption by a viewer. Display unit 42 may include a liquid-crystal display (LCD), a light emitting diode (LED) display, an organic LED (OLED), an active-matrix OLED (AMOLED) display, or the like.

Display buffer unit 44 represents a memory or storage device dedicated to storing data for presentation of imagery, such as photos or video frames, for display unit 42. Display buffer unit 44 may represent a two-dimensional buffer that includes a plurality of storage locations. The number of storage locations within display buffer unit 44 may be substantially similar to the number of pixels to be displayed on display unit 42. For example, if display unit 42 is configured to include 640×480 pixels, display buffer unit 44 may include 640×480 storage locations. Display buffer unit 44 may store the final pixel values for each of the pixels processed by GPU 36. Display unit 42 may retrieve the final pixel values from display buffer unit 44, and display the final image based on the pixel values stored in display buffer unit 44.

User interface unit 46 represents a unit with which a user may interact with or otherwise interface to communicate with other units of computing device 30, such as CPU 32. Examples of user interface unit 46 include, but are not limited to, a trackball, a mouse, a keyboard, and other types of input devices. User interface unit 46 may also be a touch screen and may be incorporated as a part of display unit 42.

Storage unit 48 may comprise one or more computer-readable storage media. Examples of storage unit 48 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 48 may include instructions that cause CPU 32 and/or GPU 36 to perform the functions ascribed to CPU 32 and GPU 36 in this disclosure. Storage unit 48 may, in some examples, be considered as a non-transitory storage medium. The term "non-transitory" may indicate that the storage medium is not embodied in a carrier wave or a propagated signal. However, the term "non-transitory" should not be interpreted to mean that storage unit 48 is non-movable. As one example, storage unit 48 may be removed from computing device 30, and moved to another device. As another example, a storage unit, substantially similar to storage unit 48, may be inserted into computing device 30. In certain examples, a non-transitory storage medium may store data that can, over time, change (e.g., in RAM).

Figure 2:
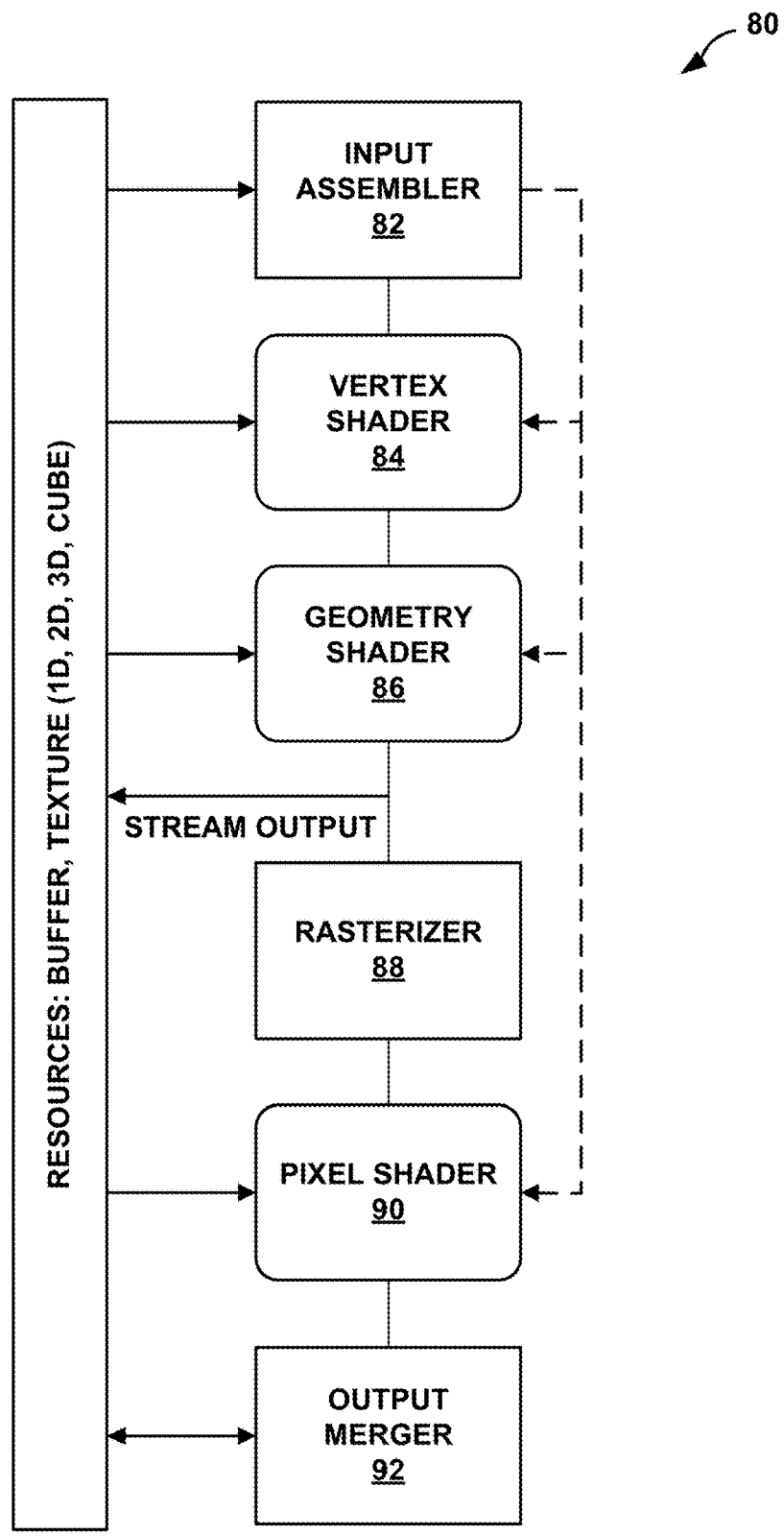
FIG. 2 is a block diagram illustrating an exemplary graphics processing pipeline 80.

As illustrated in the example of FIG. 2, storage unit 48 stores a GPU driver 50 and compiler 54, GPU program 52, and locally-compiled GPU program 56. GPU driver 50 represents a computer program or executable code that provides an interface to access GPU 36. CPU 32 executes GPU driver 50 or portions thereof to interface with GPU 36 and, for this reason, GPU driver 50 is shown in the example of FIG. 1 as a dash-lined box labeled "GPU driver 50" within CPU 32. GPU driver 50 is accessible to programs or other executables executed by CPU 32, including GPU program 52.

GPU program 52 may include code written in a high level (HL) programming language, e.g., using an application programming interface (API). Examples of APIs include Open-Computing Language ("OpenCL"), Open Graphics Library ("OpenGL"), and DirectX, as developed by Microsoft, Inc. In general, an API includes a predetermined, standardized set of commands that are executed by associated hardware. API commands allow a user to instruct hardware components of a GPU to execute commands without user knowledge as to the specifics of the hardware components.

GPU program 52 may invoke or otherwise include one or more functions provided by GPU driver 50. CPU 32 generally executes the program in which GPU program 52 is embedded and, upon encountering GPU program 52, passes GPU program 52 to GPU driver 50 (e.g., in the form of a command stream). CPU 32 executes GPU driver 50 in this context to process GPU program 52. That is, for example, GPU driver 50 may process GPU program 52 by compiling GPU program 52 into object or machine code executable by GPU 36. This object code is shown in the example of FIG. 1 as locally compiled GPU program 56.

In some examples, compiler 54 may operate in real-time or near-real-time to compile GPU program 52 during the execution of the program in which GPU program 52 is embedded. For example, compiler 54 generally represents a module that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, e.g., CPU 32 and GPU 36).

LL programming languages are considered low level in the sense that they provide little abstraction, or a lower level of abstraction, from an instruction set architecture of a processor or the other types of hardware. LL languages generally refer to assembly and/or machine languages. Assembly languages are a slightly higher LL language than machine languages but generally assembly languages can be converted into machine languages without the use of a compiler or other translation module. Machine languages represent any language that defines instructions that are similar, if not the same as, those natively executed by the underlying hardware, e.g., processor, such as the x86 machine code (where the x86 refers to an instruction set architecture of an x86 processor developed by Intel Corporation).

In any case, compiler 54 may translate HL instructions defined in accordance with a HL programming language into LL instructions supported by the underlying hardware. Compiler 54 removes the abstraction associated with HL programming languages (and APIs) such that the software defined in accordance with these HL programming languages is capable of being more directly executed by the actual underlying hardware.

In the example of FIG. 1, compiler 54 may receive GPU program 52 from CPU 32 when executing HL code that includes GPU program 52. Compiler 54 may compile GPU program 52 to generate locally-compiled GPU program 56 that conforms to a LL programming language. Compiler 54 then outputs locally-compiled GPU program 56 that includes the LL instructions.

GPU 36 generally receives locally-compiled GPU program 56 (as shown by the dashed lined box labeled "locally-compiled GPU program 56" within GPU 36), whereupon, in some instances, GPU 36 renders an image and outputs the rendered portions of the image to display buffer unit 44. For example, GPU 36 may generate a number of primitives to be displayed at display unit 42. Primitives may include one or more of a line (including curves, splines, etc.), a point, a circle, an ellipse, a polygon (where typically a polygon is defined as a collection of one or more triangles) or any other two-dimensional (2D) primitive. The term "primitive" may also refer to three-dimensional (3D) primitives, such as cubes, cylinders, sphere, cone, pyramid, torus, or the like. Generally, the term "primitive" refers to any basic geometric shape or element capable of being rendered by GPU 36 for display as an image (or frame in the context of video data) via display unit 42.

GPU 36 may transform primitives and other state data (e.g., that defines a color, texture, lighting, camera configuration, or other aspect) of the primitives into a so-called "world space" by applying one or more model transforms (which may also be specified in the state data). Once transformed, GPU 36 may apply a view transform for the active camera (which again may also be specified in the state data defining the camera) to transform the coordinates of the primitives and lights into the camera or eye space. GPU 36 may also perform vertex shading to render the appearance of the primitives in view of any active lights. GPU 36 may perform vertex shading in one or more of the above model, world or view space (although it is commonly performed in the world space).

Once the primitives are shaded, GPU 36 may perform projections to project the image into a unit cube with extreme points, as one example, at (−1, −1, −1) and (1, 1, 1).

This unit cube is commonly referred to as a canonical view volume. After transforming the model from the eye space to the canonical view volume, GPU 36 may perform clipping to remove any primitives that do not at least partially reside within the view volume. In other words, GPU 36 may remove any primitives that are not within the frame of the camera. GPU 36 may then map the coordinates of the primitives from the view volume to the screen space, effectively reducing the 3D coordinates of the primitives to the 2D coordinates of the screen.

Given the transformed and projected vertices defining the primitives with their associated shading data, GPU 36 may then rasterize the primitives. For example, GPU 36 may compute and set colors for the pixels of the screen covered by the primitives. During rasterization, GPU 36 may apply any textures associated with the primitives (where textures may comprise state data). GPU 36 may also perform a Z-buffer algorithm, also referred to as a depth test, during rasterization to determine whether any of the primitives and/or objects are occluded by any other objects. The Z-buffer algorithm sorts primitives according to their depth so that GPU 36 knows the order in which to draw each primitive to the screen. GPU 36 outputs rendered pixels to display buffer unit 44.

Display buffer unit 44 may temporarily store the rendered pixels of the rendered image until the entire image is rendered. Display buffer unit 44 may be considered as an image frame buffer in this context. Display buffer unit 44 may then transmit the rendered image to be displayed on display unit 42. In some alternate examples, GPU 36 may output the rendered portions of the image directly to display unit 42 for display, rather than temporarily storing the image in display buffer unit 44. Display unit 42 may then display the image stored in display buffer unit 78.

Figure 8:
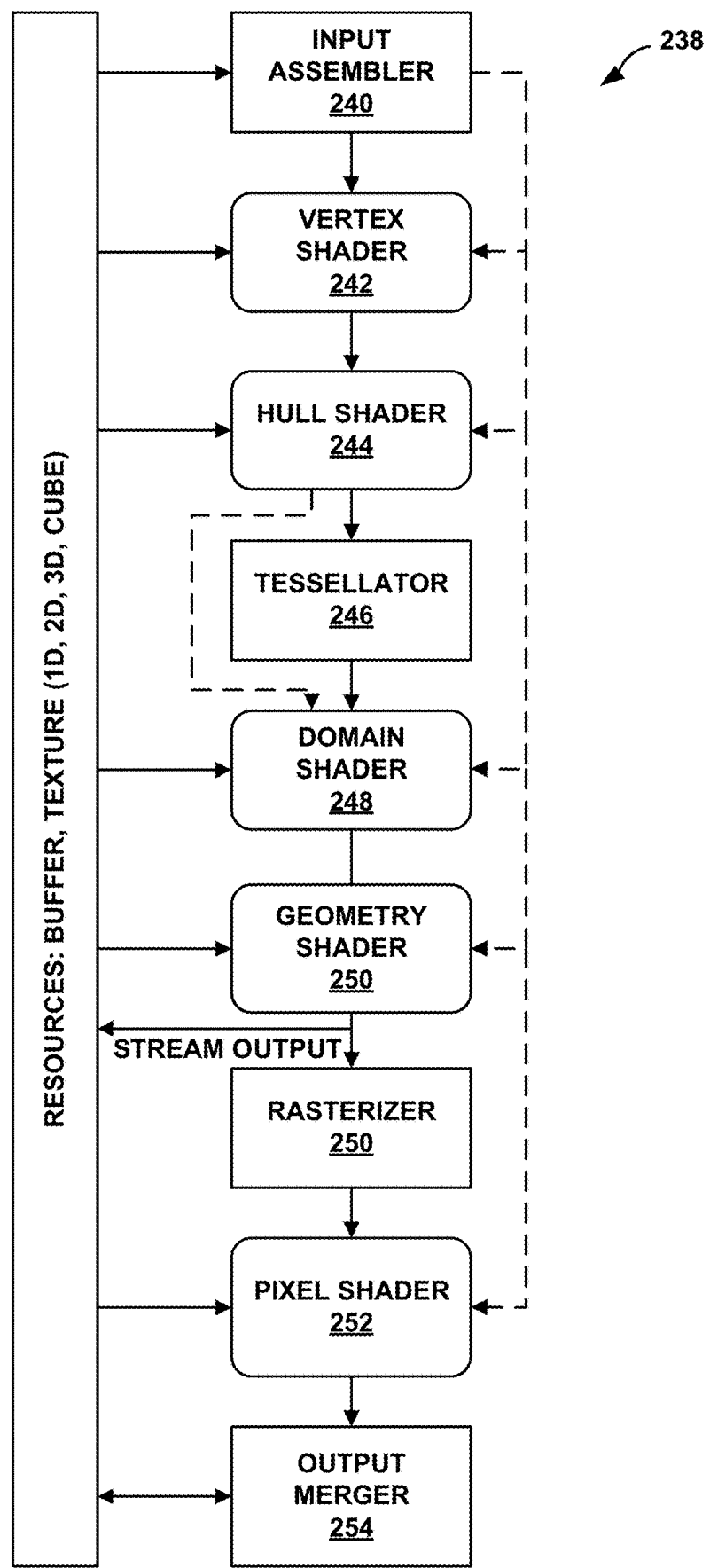
FIG. 8 is a block diagram illustrating an example graphics processing pipeline that includes tessellation stages.

To render pixels in the manner described above, GPU 36 may designate shading units 40 to perform a variety of shading operations (as described in greater detail, for example, with respect to FIGS. 2 and 8). However, certain GPUs (such as GPU 36) designed to support a relatively shorter rendering pipeline may be unable to support APIs having expanded rendering pipelines. For example, some GPUs may be prevented from designating shading units 40 to perform more than two different types of shading operations.

In an example, GPU 36 may designate shading units 40 to perform vertex shading and pixel shading operations. In this example, GPU 36 may lack the resources to designate shading units 40 to perform operations associated with a hull shader, a domain shader, and/or a geometry shader. That is, hardware and/or software restrictions may prevent GPU 36 from designating shading units 40 to perform hull shading, domain shading, and/or geometry shading operations. Accordingly, GPU 36 may be unable to support shader stages associated with APIs that include such functionality.

For example, predecessor GPUs that supported the previous DirectX 9 API (developed by Microsoft, which may include the Direct3D 9 API) may be unable to support DirectX 10 API (which may include the Direct3D 10 API). That is, at least some of the features of the DirectX 10 API (e.g., such as certain shader stages) may be unable to be performed using predecessor GPUs. Moreover, GPUs that supported the previous DirectX 9 API and the DirectX 10 API may be unable to support all features of the DirectX 11 API. Such incompatibilities may result in a large number of currently deployed GPUs that may no longer provide support for executing software or other applications that rely on DirectX 10 or DirectX 11. While the example above is described with respect to Microsoft's DirectX family of APIs, similar compatibility issues may be present with other APIs and legacy GPUs 36.

In addition, supporting a relatively longer graphics processing pipeline (e.g., a rendering pipeline having additional shader stages) may require a more complex hardware configuration. For example, introducing a geometry shader stage to the rendering pipeline to perform geometry shading, when implemented by a dedicated one of shading units 40, may result in additional reads and writes to the off-chip memory. That is, GPU 36 may initially perform vertex shading with one of shading units 40 and store vertices to storage unit 48. GPU 36 may also read vertices output by the vertex shader and write the new vertices generated when performing geometry shading by one of shading units 40. Including tessellation stages (e.g., a hull shader stage and domain shader stage) to a rendering pipeline may introduce similar complexities, as described below.

Additional reads and writes to off-chip memory may consume memory bus bandwidth (e.g., a communication channel connecting GPU 36 to storage unit 48) while also potentially increasing the amount of power consumed, considering that the reads and writes each require powering the memory bus and storage unit 48. In this sense, implementing a graphics pipeline with many stages using dedicated shading units 40 for each shader stage may result in less power efficient GPUs. In addition, such GPUs 36 may also perform slower in terms of outputting rendered images due to delay in retrieving data from storage unit 48.

Aspects of this disclosure generally relate to merging the function of one or more of shading units 40, such that one of shading units 40 may perform more than one shading function. For example, typically, GPU 36 may perform a rendering process (which may be referred to as a rendering pipeline having shader stages) by designating shading units 40 to perform particular shading operations, where each of shading units 40 may implement multiple instances of the same shader at the same time. That is, GPU 36 may designate one or more of shading units 40 to perform vertex shading operations, e.g., supporting up to 256 concurrent instances of a vertex shader. GPU 36 may also designate one or more of shading units 40 to perform pixel shading operations, e.g., supporting up to 256 concurrent instances of a pixel shader. These hardware units may store the output from executing one of the three shaders to an off-chip memory, such as storage unit 48, until the next designated hardware unit is available to process the output of the previous hardware unit in the graphics processing pipeline.

While aspects of this disclosure may refer to specific hardware shading units in the singular (e.g., a hardware shading unit), it should be understood that such units may actually comprise one or more shading units 40 (more than one shader processor), as well as one or more other components of GPU 36 for performing shading operations. For example, as noted above, GPU 36 may have a plurality of associated shading units 40. GPU 36 may designate more than one of shading units 40 to perform the same shading operations, with each of the shading units 40 configured to perform the techniques of this disclosure for merging shading operations. In general, a hardware shading unit may refer to a set of hardware components invoked by a GPU, such as GPU 36, to perform a particular shading operation.

In one example, aspects of this disclosure include performing vertex shading operations and geometry shading operations with a single hardware shading unit. In another example, aspects of this disclosure include performing vertex shading operations and hull shading operations with a single hardware shading unit. In still another example, aspects of this disclosure include performing domain shading operations and geometry shading operations with a single hardware shading unit. Aspects of this disclosure also relate to the manner in which a hardware shading unit transitions between shading operations. That is, aspects of this disclosure relate to transitioning between performing a first shading operation with the hardware shading unit and performing a second shading operation with the same hardware shading unit.

For example, according to aspects of this disclosure, GPU 36 may perform, with a shading unit 40 designated to perform vertex shading operations, vertex shading operations to shade input vertices so as to output vertex shaded vertices. In this example, shading unit 40 may be configured with an interface that receives a single vertex as an input and generates a single vertex as an output. In addition, GPU 36 may perform, with the same shading unit 40, a geometry shading operation to generate one or more new vertices based on one or more of the vertex shaded vertices. The geometry shading operation may operate on at least one of the one or more vertex shaded vertices to output the one or more new vertices. Again, while described with respect to a single shading unit 40, these techniques may be concurrently implemented by a plurality of shading units 40 of GPU 36.

Certain APIs may require that a shading unit 40 designated to perform vertex shading operations implements or adheres to a 1:1 interface, which receives a single vertex as an input and generates a single vertex as an output. In contrast, a shading unit 40 designated to perform geometry shading operations may implement or adhere to a 1:N interface, which receives one or more vertices as an input and generates one or more (and often many, hence the use of "N" above) vertices as outputs.

According to aspects of this disclosure, GPU 36 may leverage the 1:1 interface of a shading unit 40 designated to perform vertex shading operations to emulate this 1:N geometry shader interface by invoking multiple instances of a geometry shader program. GPU 36 may concurrently execute each of these geometry shader programs to generate one of the new vertices that result from performing the geometry shader operation. That is, shading units 40 may be programmable using a HLSL (e.g., with a graphics rendering API) such that shading units 40 may concurrently execute multiple instances of what is commonly referred to as a "shader program." These shader programs may be referred to as "fibers" or "threads" (both of which may refer to a stream of instructions that form a program or thread of execution). According to aspects of this disclosure and as described in greater detail below, GPU 36 may execute multiple instances of a geometry shader program using a hardware shading unit designated for vertex shading operations. GPU 36 may append the geometry shader instructions to the vertex shader instructions so that the same shading unit 40 executes both shaders, e.g., the vertex shader and the geometry shader, in sequence.

In another example, according to aspects of this disclosure, GPU 36 may perform, with a hardware shading unit designated to perform vertex shading operations, vertex shading operations to shade input vertices so as to output vertex shaded vertices. The hardware shading unit may adhere to an interface that receives a single vertex as an input and generates a single vertex as an output. In addition, GPU may perform, with the same hardware shading unit designated for performing vertex shading operations, one or more tessellation operations (e.g., hull shading operations and/or domain shading operations) to generate one or more new vertices based on one or more of the vertex shaded vertices. The one or more tessellation operations may operate on at least one of the one or more vertex shaded vertices to output the one or more new vertices.

For example, in addition to the shader stages described above, some graphics rending pipelines may also include a hull shader stage, a tessellator stage, and a domain shader stage. In general, the hull shader stage, tessellator stage, and domain shader stage are included to accommodate hardware tessellation. That is, the hull shader stage, tessellator stage, and domain shader stage are included to accommodate tessellation by GPU 36, rather than being performed by a software application being executed, for example, by CPU 32.

According to aspects of this disclosure, GPU 36 may perform vertex shading and tessellation operations with the same shading unit 40. For example, GPU 36 may perform vertex shading and tessellation operations in two passes. According to aspects of this disclosure and described in greater detail below, GPU 36 may store a variety of values to enable transitions between the different shading operations.

In an example, in a first pass, GPU 36 may designate one or more shading units 40 to perform vertex shading and hull shading operations. In this example, GPU 36 may append hull shader instructions to vertex shader instructions. Accordingly, the same shading unit 40 executes the vertex shading and hull shader instructions in sequence.

In a second pass, GPU 36 may designate the one or more shading units 40 to perform domain shading and geometry shading operations. In this example, GPU 36 may append domain shader instructions to the geometry shader instructions. Accordingly, the same shading unit 40 executes the domain shading and geometry shading operations in sequence. By performing multiple shading operations in multiple passes, GPU 36 may use the same shading hardware to emulate a GPU having additional shading capabilities.

Aspects of this disclosure also relate to the manner in which GPU 36 transitions between shading operations. For example, aspects of this disclosure relate to the manner in which shading operations are patched together, so that the operations are executed in sequence by the same hardware shading unit.

In an example, according to aspects of this disclosure, GPU 36 may designate one or more shading units 40 to perform first shading operations associated with a first shader stage of a rendering pipeline. GPU 36 may switch operational modes of shading unit 40 upon completion of the first shading operations. GPU 36 may then perform, with the same shading unit 40 designated to perform the first shading operations, second shading operations associated with a second, different shader stage of the rendering pipeline.

According to some examples, GPU 36 may patch shading operations together using a plurality of modes, with each mode having a particular set of associated shading operations. For example, a first mode may indicate that a draw call includes only vertex shading operations. In this example, upon executing the draw call, GPU 36 may designate one or more shading units 40 to perform vertex shading operations in accordance with the mode information. In addition, a second mode may indicate that a draw call includes both vertex shading and geometry shading operations. In this example, upon executing the draw call, GPU 36 may designate one or more shading units 40 to perform vertex shading operations. In addition, according to aspects of this disclosure, GPU 36 may append geometry shader instructions to vertex shader instructions, such that the same shading units execute both vertex and geometry shading operations. Additional modes may be used to indicate other combinations of shaders, as described in greater detail below.

In some examples, GPU driver 50 may generate the mode information used by GPU 36. According to aspects of this disclosure, the different shaders (e.g., vertex shading operations, geometry shading operations, hull shading operations, domain shading operations, and the like) do not have to be compiled in a particular manner in order to be executed in sequence by the same shading unit 40. Rather, each shader may be independently compiled (without reference to any other shader) and patched together at draw time by GPU 36. That is, upon executing a draw call, GPU 36 may determine the mode associated with the draw call and patch compiled shaders together accordingly.

The techniques of this disclosure may enable a GPU (such as GPU 36) having a limited number of shading units 40 for performing shading operations to emulate a GPU having a greater number of shading units 40. For example, while GPU 36 may be prevented from designating shading units 40 to perform more than two shading operations (e.g., vertex shading operations and pixel shading operations), the techniques of this disclosure may enable GPU 36 to perform additional shading operations (e.g., geometry shading operations, hull shading operations, and/or domain shading operations) without reconfiguring shading units 40. That is, the techniques may allow shading units 40 to adhere to input/output constraints of certain shader stages, while performing other shading operations.

Moreover, by performing multiple shading operations with the same shading units 40, the techniques may reduce memory bus bandwidth consumption. For example, in the case of vertex shading being performed with other shading operations (e.g., geometry shading), shading units 40 used for vertex shading do not need to store the vertex shading results to an off-chip memory (such as storage unit 48) prior to performing the other shader operations. Rather, vertex shading results may be stored to GPU memory 38 and immediately used for geometry shading operations.

In this manner, the techniques may reduce memory bus bandwidth consumption in comparison to GPUs having additional shading units 40, which may reduce power consumption. The techniques may therefore promote more power efficient GPUs that utilize less power than GPUs having additional hardware shader units. Accordingly, in some examples, the techniques may be deployed in power-limited devices, such as mobile devices, laptop computers and any other type of device that does not have a constant dedicated supply of power.

It should be understood that computing device 30 may include additional modules or units not shown in FIG. 1 for purposes of clarity. For example, computing device 30 may include a transceiver module for transmitting and receiving data, and may include circuitry to allow wireless or wired communication between computing device 30 and another device or a network. Computing device 30 may also include a speaker and a microphone, neither of which are shown in FIG. 1, to effectuate telephonic communications in examples where computing device 30 is a mobile wireless telephone, or a speaker where computing device 30 is a media player. In some instances, user interface unit 46 and display unit 42 may be external to computing device 30 in examples where computing device 30 is a desktop computer or other device that is equipped to interface with an external user interface or display.

FIG. 2 is a block diagram illustrating an exemplary graphics processing pipeline 80. The example pipeline 80 includes an input assembler stage 82, a vertex shader stage 84, a geometry shader stage 86, a rasterizer stage 88, a pixel shader stage 90, and an output merger stage 92. In some examples, an API, such as the DirectX 10 (or Direct3D 10) API may be configured to use each of the stages shown in FIG. 2. The graphics processing pipeline 80 is described below as being performed by GPU 36, but may be performed by a variety of other graphics processors.

Graphics processing pipeline 80 generally includes programmable stages (e.g., illustrated with rounded corners) and fixed function stages (e.g., illustrated with squared corners). For example, graphics rendering operations associated with certain stages of graphics rendering pipeline 80 are generally performed by a programmable shader processor, such as one of shading units 40, while other graphics rendering operations associated with other stages of graphics rendering pipeline 80 are generally preformed by non-programmable, fixed function hardware units associated with GPU 36. Graphics rendering stages performed by shading units 40 may generally be referred to as "programmable" stages, while stages performed by fixed function units may generally be referred to as fixed function stages.

Input assembler stage 82 is shown in the example of FIG. 2 as a fixed function stage and is generally responsible for supplying graphics data (triangles, lines and points) to graphics processing pipeline 80. For example, input assembler stage 82 may collect vertex data for high order surfaces, primitives, and the like, and output vertex data and attributes to vertex shader stage stage 84. Accordingly, input assembler stage 80 may read vertices from an off-chip memory, such as storage unit 48, using fixed function operations. Input assembler stage 80 may then create pipeline work items from these vertices, while also generating vertex identifiers ("VertexIDs"), instance identifiers ("InstanceIDs," which are made available to the vertex shader) and primitive identifiers ("PrimativeIDs," which are available to the geometry shader and pixel shader). Input assembler stage 80 may automatically generate VertexIDs, InstanceIDs, and PrimitiveIDs upon reading the vertices.

Vertex shader stage 84 may process the received vertex data and attributes. For example, vertex shader stage 84 may perform per-vertex processing such as transformations, skinning, vertex displacement, and calculating per-vertex material attributes. In some examples, vertex shader stage 84 may generate texture coordinates, vertex color, vertex lighting, fog factors, and the like. Vertex shader stage 84 generally takes a single input vertex and outputs a single, processed output vertex.

Geometry shader stage 86 may receive a primitive defined by the vertex data (e.g., three vertices for a triangle, two vertices for a line, or a single vertex for a point) and further process the primitive. For example, geometry shader stage 86 may perform per-primitive processing such as silhouette-edge detection and shadow volume extrusion, among other possible processing operations. Accordingly, geometry shader stage 86 may receive one primitive as an input (which may include one or more vertices) and outputs zero, one, or multiple primitives (which again may include one or more vertices). The output primitive may contain more data than may be possible without geometry shader stage 86. The total amount of output data may be equal to the vertex size multiplied by the vertex count, and may be limited per invocation. The stream output from geometry shader stage 86 may allow primitives reaching this stage to be stored to the off-chip memory, such as memory unit 48. The stream output is typically tied to geometry shader stage 86, and both may be programmed together (e.g., using an API).

Rasterizer stage 88 is typically a fixed function stage that is responsible for clipping primitives and preparing primitives for pixel shader stage 90. For example, rasterizer stage 88 may perform clipping (including custom clip boundaries), perspective divide, viewport/scissor selection and implementation, render target selection and primitive setup. In this way, rasterizer stage 88 may generate a number of fragments for shading by pixel shader stage 90.

Pixel shader stage 90 receives fragments from rasterizer stage 88 and generates per-pixel data, such as color. Pixel shader stage 96 may also perform per-pixel processing such as texture blending and lighting model computation. Accordingly, pixel shader stage 90 may receive one pixel as an input and may output one pixel at the same relative position (or a zero value for the pixel).

Output merger stage 92 is generally responsible for combining various types of output data (such as pixel shader values, depth and stencil information) to generate a final result. For example, output merger stage 92 may perform fixed function blend, depth, and/or stencil operations for a render target (pixel position). While described above in general terms with respect to vertex shader stage 84, geometry shader stage 86, and pixel shader stage 90, each of the foregoing description may refer to on or more shading units (such as shading units 40) designated by a GPU to perform the respective shading operations.

Certain GPUs may be unable to support all of the shader stages shown in FIG. 2. For example, some GPUs may be unable to designate shading units to perform more than two shading operations, due to hardware and/or software restrictions (e.g., a limited number of shading units 40 and associated components). In an example, certain GPUs may not support operations associated with geometry shader stage 86. Rather, the GPUs may only include support for designating shading units to perform vertex shader stage 84 and pixel shader stage 90. Thus, operations performed by shading units must adhere to the input/output interface associated with vertex shader stage 84 and pixel shader stage 90.

In addition, in some examples, introducing geometry shader stage 86 to the pipeline may result in additional reads and writes to storage unit 48, relative to a graphics processing pipeline that does not include geometry shader stage 86. For example, as noted above, vertex shader stage 86 may write vertices out to off-chip memory, such as storage unit 48. Geometry shader stage 86 may read these vertices (the vertices output by vertex shader stage 84) and write the new vertices, which are then pixel shaded. These additional reads and writes to storage unit 48 may consume memory bus bandwidth while also potentially increasing the amount of power consumed. In this sense, implementing a graphics processing pipeline that includes each of the vertex shader stage 84, geometry shader stage 86, and pixel shader stage 90 may result in less power efficient GPUs that may also be slower in terms of outputting rendered images due to delay in retrieving data from storage unit 48.

As noted above, aspects of this disclosure generally relate to merging the function of one or more of shading units 40, such that a shading unit 40 designated for a particular shading operation may perform more than one shading operation. As described in greater detail below, in some examples, one shading unit 40 may be designated for performing vertex shading operations associated with vertex shader stage 84. According to aspects of this disclosure, the same shading unit 40 may also be implemented to perform geometry shading operations associated with geometry shader stage 86. That is, GPU 36 may invoke the shading unit 40 to perform vertex shading operations, but may also implement the shading unit 40 to perform geometry shading operations without re-designating the shading unit 40 to perform the geometry shading task.

Figure 3A:
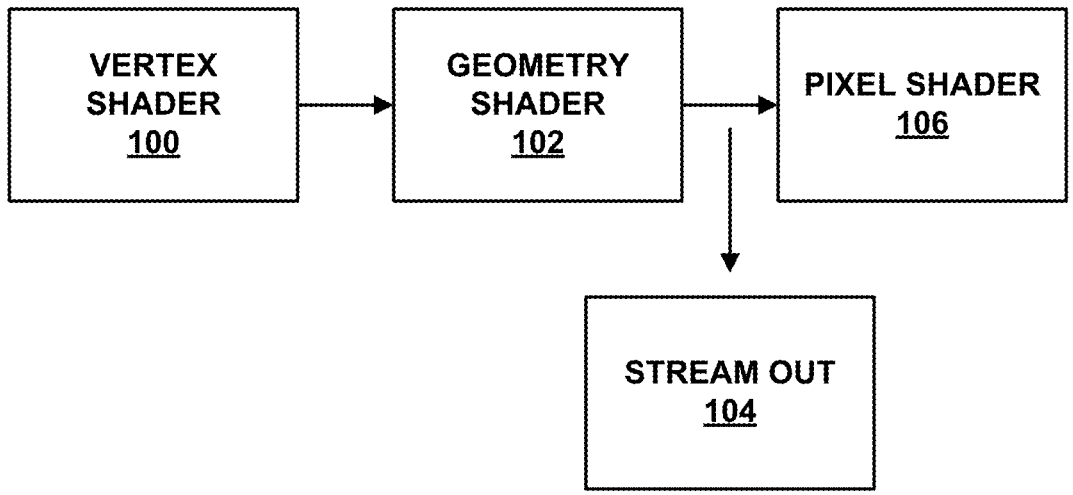
FIGS. 3A and 3B are conceptual diagrams of data flows in a graphics rendering pipeline, according to aspects of this disclosure.
Figure 3B:
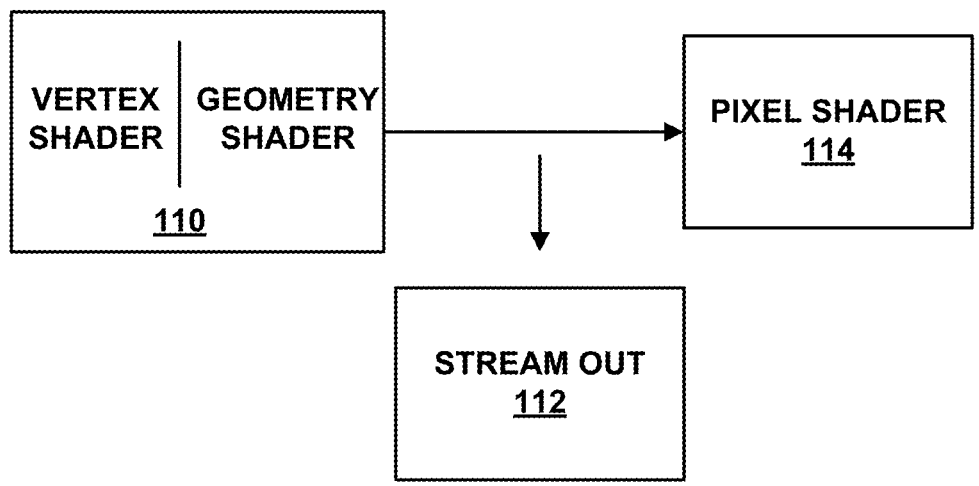

FIGS. 3A and 3B are conceptual diagrams of data flows in a graphics rendering pipeline, according to aspects of this disclosure. For example, FIG. 3A illustrates vertex shader stage 100, geometry shader stage 102, stream out 104, and pixel shader stage 106. In general, vertex shader stage 100, geometry shader stage 102, and pixel shader stage 106 shown in FIG. 3A each represent associated hardware for performing shading operations. That is, for example, each of vertex shader stage 100, geometry shader stage 102, and pixel shader stage 106 may be associated with separately designated processing units, such as shading units 40 designated to perform the respective tasks.

For example, vertex shader stage 100 represents one or more units (such as shading units 40) that perform vertex shading operations. That is, vertex shader stage 100 may include components that are invoked by GPU 36 to perform vertex shading operations. For example, vertex shader stage 100 may receive a vertex as an input and translate the input vertex from the three dimensional (3D) model space to a two-dimensional (2D) coordinate in screen space. Vertex shader stage 100 may then output the translated version of the vertex (which may be referred to as the "translated vertex"). Vertex shader stage 100 does not ordinarily create new vertices, but operates on one vertex at a time. As a result, vertex shader stage 100 may be referred to as a one-to-one (1:1) stage, that vertex shader stage 100 receives a single input vertex and outputs a single output vertex.

Geometry shader stage 102 represents one or more units (such as shading units 40) that perform geometry shading operations. That is, geometry shader stage 102 may include components that are invoked by GPU 36 to perform geometry shading operations. For example, geometry shader stage 102 may be useful for performing a wide variety of operations, such as single pass rendering to a cube map, point sprite generation, and the like. Typically, geometry shader stage 102 receives primitives composed of one or more translated vertices, which have been vertex shaded by vertex shader stage 100. Geometry shader stage 102 performs geometry shading operations to create new vertices that may form new primitives (or possibly transform the input primitive to a new type of primitive having additional new vertices).

For example, geometry shader stage 102 typically receives a primitive defined by one or more translated vertices and generates one or more new vertices based on the received primitive. Geometry shader stage 102 then outputs the new vertices (which may form one or more new primitives). As a result, geometry shader stage 102 may be referred to as a one-to-many (1:N) or even a many-to-many (N:N) stage, in that geometry shader stage 102 receives one or more translated vertices and generates a number of new vertices.

While described as being one-to-many or even many-to-many, geometry shader stage 102 may also, in some instances, not output any new vertices or only output a single new vertex. In this respect, the techniques should not be limited to only those geometry shaders that output many vertices in every instance, but may be generally implemented with respect to any geometry shader stage 102 that may output zero, one or many new vertices, as will be explained in more detail below.

The output of geometry shader stage 102 may be stored for additional geometry shading (e.g., during stream out 104). The output of geometry shader stage 102 may also be output to a rasterizer that rasterizes the new vertices (and the translated vertices) to generate a raster image comprised of pixels.

The pixels from geometry shader stage 102 may also be passed to pixel shader stage 106. Pixel shader stage 106 (which may also be referred to as a fragment shader) may compute color and other attributes of each pixel, performing a wide variety of operations to produce a shaded pixel. The shaded pixels may be merged with a depth map and other post shading operations may be performed to generate an output image for display via a display device, such as computer monitor, television, or other types of display devices.

The shader stages shown in FIG. 3A may support one or more graphics APIs. In an example for purposes of illustration, vertex shader stage 100, geometry shader stage 102, and pixel shader stage 106 may support the DirectX 10 API. That is, code produced using the DirectX 10 API may be executed by vertex shader stage 100, geometry shader stage 102, and pixel shader stage 106 to render graphics data. Geometry shader stage 102, however, may be not be included in all graphics rendering pipelines and may not be executable by all GPUs. For example, while the DirectX 10 API includes support for geometry shader stage 102, certain earlier revisions (e.g., DirectX 9) do not include such support. Accordingly, GPUs designed to execute code created with earlier revisions of the DirectX API (or GPUs designed for other APIs) may not be able to designate shading units 40 to perform the geometry shader stage 102.

FIG. 3B illustrates a modified conceptual diagram of a data flow in a graphics rendering pipeline (relative to the example shown in FIG. 3A) according to techniques of this disclosure. The example shown in FIG. 3B includes a merged vertex shader/geometry shader (VS/GS) stage 110, stream out 112, and pixel shader stage 114. According to aspects of this disclosure, merged VS/GS stage 110 may include one or more processing units for performing the functions described above with respect to vertex shader stage 100 and geometry shader stage 102. That is, whereas vertex shader stage 100 and geometry shader stage 102 represent distinct units invoked by a GPU (such as GPU 36) for performing vertex shading operations and geometry shading operations, respectively, according to aspects of this disclosure such functions may be performed by substantially the same hardware (e.g., shading units 40).

For example, upon vertex shading operations being invoked by GPU 36, VS/GS stage 110 may perform both vertex shading operations and geometry shading operations. That is, merged VS/GS stage 110 may include the same set of shading units 40 for performing the operations described above with respect to vertex shader stage 100 and for performing the operations described above with respect to geometry shader stage 102.

However, because GPU 36 initially invokes each shading unit 40 as a vertex shading unit, components of GPU 36 may be configured to receive data from the vertex shading unit in a particular format, e.g., adhering to a 1:1 input/output interface. For example, GPU 36 may allocate a single entry in a cache (e.g., a vertex parameter cache, as described in greater detail below) to store the output from a shading unit 40 for a shaded vertex. GPU 36 may also perform some rasterization operations based on the manner in which the shading unit 40 is invoked. As described in greater detail below, aspects of this disclosure allow GPU 36 to perform geometry shading operations with the same shading unit as the vertex shading operations, while still adhering to the appropriate interface.

In some instances, the geometry shader stage 102 may primarily be used for low amplification of data (e.g., point-sprite generation). Such operations may require relatively low ALU usage per geometry shader invocation. Accordingly, ALUs of shading units 40 may not be fully utilized during geometry shader stage 102. According to aspects of this disclosure, geometry shader stage 102 may be appended to vertex shader stage 100 to form merged VS/GS stage 110, which may be invoked as vertex shader stage 100 in GPU architecture. Invoking the merged VS/GS stage 110 in the manner described above may increase ALU utilization by allowing both vertex shading and geometry shading operations to be performed by the same processing units.

Figure 4:
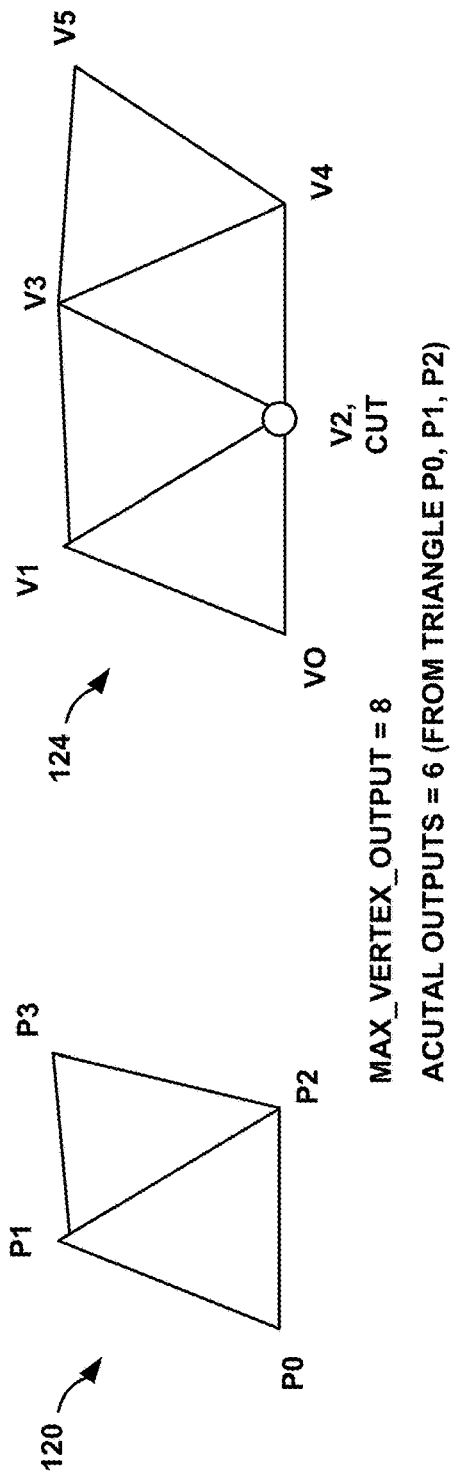
FIG. 4 is a diagram illustrating example operations of a hardware shading unit that implements the techniques described in this disclosure to perform vertex shading operations and geometry shading operations.

To enable merged VS/GS stage 110, GPU 36 may perform functions for transitioning between vertex shading operations (a 1:1 stage) and geometry shading operations (a 1:N stage), as described in greater detail with respect to the example shown in FIG. 4. In this way, the techniques of this disclosure allow a GPU having limited resources (e.g., which may prevent the GPU from designating shading units 40 to perform more than two shading operations) to emulate a GPU having additional resources.

FIG. 4 is a diagram illustrating example operations of a hardware shading unit that implements the techniques described in this disclosure to perform vertex shading operations and geometry shading operations. While described with respect to GPU 36 (FIG. 1), aspects of this disclosure may be performed by a variety of other GPUs having a variety of other components.

In the example of FIG. 4, GPU 36 may designate a shading unit 40 to perform vertex shading operations. Accordingly, components of GPU 36 may be configured to send data for a vertex to shading unit 40 and receive data for a shaded vertex from shading unit 40 (e.g., a 1:1 interface). The shading unit 40 may execute a vertex shader to perform vertex shading operations, thereby generating a first set of primitives 120. In the example of FIG. 4, the first set of primitives 120 include a triangle with adjacency having four vertices, denoted as points p0-p3.

After executing the vertex shading operations, GPU 36 may store the shaded vertices to local memory resources. For example, GPU 36 may export the vertex shader output to a position cache (e.g., of GPU memory 38), along with "cut" information (if any) and a streamid. The vertex shading operations and geometry shading operations may be separated by a VS END instruction. Accordingly, after executing the VS END instruction and completing the vertex shading operations, one or more shading units 40 designated to perform the vertex shading operations each begin performing geometry shading operations.

That is, according to aspects of this disclosure, the same shading unit 40 designated to perform vertex shading operations also performs geometry shading operations. For example, GPU 36 may change state to geometry shader specific resources (e.g., geometry shader constants, texture offsets, and the like) by changing one or more resource pointers. GPU 36 may perform this state change according to a mode (draw mode) assigned to the shading operations.

In some examples, GPU 36 may set a draw mode when executing a draw call. The draw mode may indicate which shading operations are associated with the draw call. In an example for purposes of illustration, a draw mode of 0 may indicate that the draw call includes vertex shading operations only. A draw mode of 1 may indicate that the draw call includes both vertex shading operations and geometry shading operations. Other draw modes are also possible, as described in greater detail below. Table 1 provides an example mode table having two modes:

TABLE 1

Mode Information Merged VS/GS

|  | Mode | |
| --- | --- | --- |
|  | Mode 0<br>GS: off | Mode 1<br>GS: on |
| Flow | VS->PS | VS|GS->PS |
| Index (32 bits) | Vertex index (VS) | Vertex index (VS) |
| PrimitiveID (32-bits) | Not used | PrimitiveID (GS) |
| Misc<br>(25 bits) | Not used | misc-><br>rel_primID (4:0)<br>misc-><br>rel_vertex (9:5)<br>misc-><br>GsInstance (14:10)<br>misc-><br>Gsoutvertex (24:15) |
| Vs_valid<br>(1 bit) |  |  |
| Gshs_valid<br>(1 bit) |  |  |
| Mode<br>(2:0) | Mode = mode_0 | Mode = mode_1 |

In the example of Table 1 above, "flow" indicates the flow of operations (as executed by GPU 36) associated with the respective modes. For example, mode 0 includes vertex shading (VS) and pixel shading (PS) operations. Accordingly, GPU 36 may designate shading units 40 to perform vertex shading operations and pixel shading operations upon executing a mode 0 draw call. Mode 1 of Table 1 includes vertex shading and pixel shading operations, as well as geometry shading (GS) operations.

Accordingly, GPU 36 may designate shading units 40 to perform vertex shading operations and pixel shading operations. However, GPU 36 may also append geometry shader instructions to vertex shader instructions, so that geometry shader operations are executed by the same shading units 40 responsible for executing the vertex shader operations. The "misc" bits are reserved for variables (e.g., rel_primID, rel_vertex, GsInstance, Gsoutvertex) that are used to enable the same shading unit 40 to execute multiple different shaders in succession.

In the example of FIG. 4, the same shading unit 40 also generates a second set of primitives 124 (which may be referred to as a triangle strip) having vertices V0-V5 using the first set of primitives 120 as an input. To generate vertices V0-V5, the shading unit 40 designated for vertex shading executes multiple instances of a geometry shader operation (e.g., denoted by their output identifiers (outID) and which may also be referred to as different instances of the same geometry shader program). Each instance of the geometry shader operation executes the same algorithm to perform the same geometry shading operation and generates respective instances of the one or more new vertices, V0-V5.

The eight columns of the table shown in FIG. 4 correspond to eight separate instances of the geometry shader operation (or program), where each column from left to right may be identified by the geometry shader operation outID of 0-7. The number of merged VS/GS outputs per input primitive may be equal to dcl_maxoutputvertexcount*GSInstancecount, where each VS/GS output is one vertex emitted from a geometry shader stage. In instances in which the number of geometry shader stage output vertices are less than dcl_maxoutputvertexcount, that output vertex can be conditionally discarded or omitted (which may be referred to as being "killed"), as described in greater detail below. Accordingly, each fiber corresponds to one invocation of a vertex shader followed by one invocation a geometry shader per geometry shader output vertex specified by MaxVertexOutput.

In the example shown in FIG. 4, each of the eight instances of the geometry shader operation is appended and executed, often concurrently, by the same shading unit 40 designated for vertex shading operations to generate a separate instance of the one or more new vertices. Thus, each of the instances of the geometry shader operations generates all six of the vertices (V0-V5), but only outputs a corresponding one of the six new vertices. Each instance of the geometry shader operation only outputs a corresponding one of the six new vertices so as to adhere to the 1:1 interface associated with invoking shading unit 40 to perform vertex shading operations.

As shown in the example of FIG. 4, each of the geometry shader operations outputs the one of the six new vertices that matches its outID. Thus, the first instance of the geometry shader operation having an outID=0 outputs the first one of the six new vertices, V0. The second instance of the geometry shader operation having an outID=1 outputs the second one of the six new vertices, V1. The third instance of the geometry shader operation having an outID=2 outputs the third one of the six new vertices, V2. The fourth instance of the geometry shader operation having an outID=3 outputs the fourth one of the six new vertices, V3. The fifth instance of the geometry shader operation having an outID=4 outputs the second one of the six new vertices, V4. The sixth instance of the geometry shader operation having an outID=5 outputs the sixth one of the six new vertices, V5.

The seventh and eighth instances of the geometry shader operation are "killed" or terminated because the geometry shader operation only generates six new vertices and the outIDs of the seventh and eighth instance of the geometry shader operation do not correspond to any of the six new vertices. Thus, shading unit 40 terminates execution of the seventh and eight instances of the geometry shader operation upon determining that there is no corresponding vertex associated with these instances of the geometry shader operation.

Table 2, shown below, illustrates several parameters that may be maintained by GPU 36 to perform vertex shading operations and geometry shading operations.

TABLE 2

Parameters for VS/GS

| Flow | VS|GS->PS |
| --- | --- |
| Index (32 bits) | Vertex index (VS) |
| uv_msb (2-bits) | Not used |
| PrimitiveID (32-bits) | PrimitiveID(GS) |
| Rel_patchid (32-bits) | Not used |
| Misc (25 bits) | misc-> rel_primID (4:0)<br>misc-> rel_vertex (9:5)<br>misc-> GsInstance (14:10)<br>misc-> Gsoutvertex (24:15) |
| Vs_valid (1 bit) |  |
| Gshs_valid (1 bit) |  |
| Mode (2:0) | Mode = mode_1 |
| Instance_cmd (2-bit) |  |

Certain parameters shown in Table 2 (e.g., uv_msb, Rel_patchid) are not used for VS/GS operations, and are described in greater detail below. In the example of Table 2, index indicates the relative index of the vertices. PrimitiveID indicates the primitive ID used during the geometry shading operations to identify the primitive of the associate vertices, and may be a system generated value (e.g., generated by one or more hardware components of GPU 36). As noted above, Misc indicates reserved cache values for performing the GS operations after the VS operations. For example, table 3, shown below, illustrates parameter values when performing the vertex shading and geometry shading operations described above with respect to FIG. 4.

TABLE 3

Parameter Values for VS/GS Operations

| Mode 1 GS: on | Fiber 0 | Fiber 1 | Fiber 2 | Fiber 3 | Fiber 4 | Fiber 5 | Fiber 6 | Fiber 7 |
|---|---|---|---|---|---|---|---|---|
| Valid_as_input | 1 | 1 | 1 | 0 | 0 | 0 | 0 | 0 |
| Vertex index (VS) | V0 | V1 | V2 | 0 | 0 | 0 | 0 | 0 |
| primitiveID (GS) | 5 | 5 | 5 | 5 | 5 | 5 | 5 | 5 |
| Valid_as_output | 1 | 1 | 1 | 1 | 1 | 1 | 1 | 1 |
| misc-> rel_primID (4:0) | 2 | 2 | 2 | 2 | 2 | 2 | 2 | 2 |
| misc-> rel_vertex (9:5) | 0 | 1 | 2 | 0 | 0 | 0 | 0 | 0 |
| misc-> GsInstance (14:10) | 0 | 0 | 0 | 0 | 0 | 0 | 0 | 0 |
| misc-> Gsoutvertex (24:15) | 0 | 1 | 2 | 3 | 4 | 5 | 6 | 7 |

While a number of fibers (e.g., instructions) are allocated for performing the vertex shading and geometry shading operations, in some instances, GPU 36 may only execute a sub-set of the fibers. For example, GPU 36 may determine whether instructions are valid (valid_as_input shown in Table 3 above) before executing the instructions with shading units 40. Because only three of the allocated fibers are used to generate shaded vertices, GPU 36 may not execute the remaining fibers (fibers 3-7 in Table 3 above) when performing vertex shading operations, which may conserve power. As described in greater detail below, GPU 36 may determine which fibers to executed by based on a mask (e.g., cov_mask_1 in FIG. 5B below).

Certain APIs (e.g., the DirectX 10 API) provide for a so-called "stream out" from the geometry shader stage, where the stream out refers to outputting the new vertices from the geometry shader to a memory, such as storage unit 48, so that these new vertices may be input back into the geometry shader.

The techniques may provide support for this stream out functionality by enabling the hardware unit to output the new vertices that result from performing the geometry shader operation to storage unit 48. The new vertices output via this stream out are specified in the expected geometry shader format, rather than in the format expected by the rasterizer. The hardware unit may retrieve these new vertices and continue to implement an existing geometry shader operation, or a new geometry shader operation with respect to these vertices, which may be referred to as "stream out vertices" in this context. In this way, the techniques may enable a GPU, such as GPU 36, having a relatively limited number of shading units 40 to emulate a GPU having more shading units.

Figure 5A:
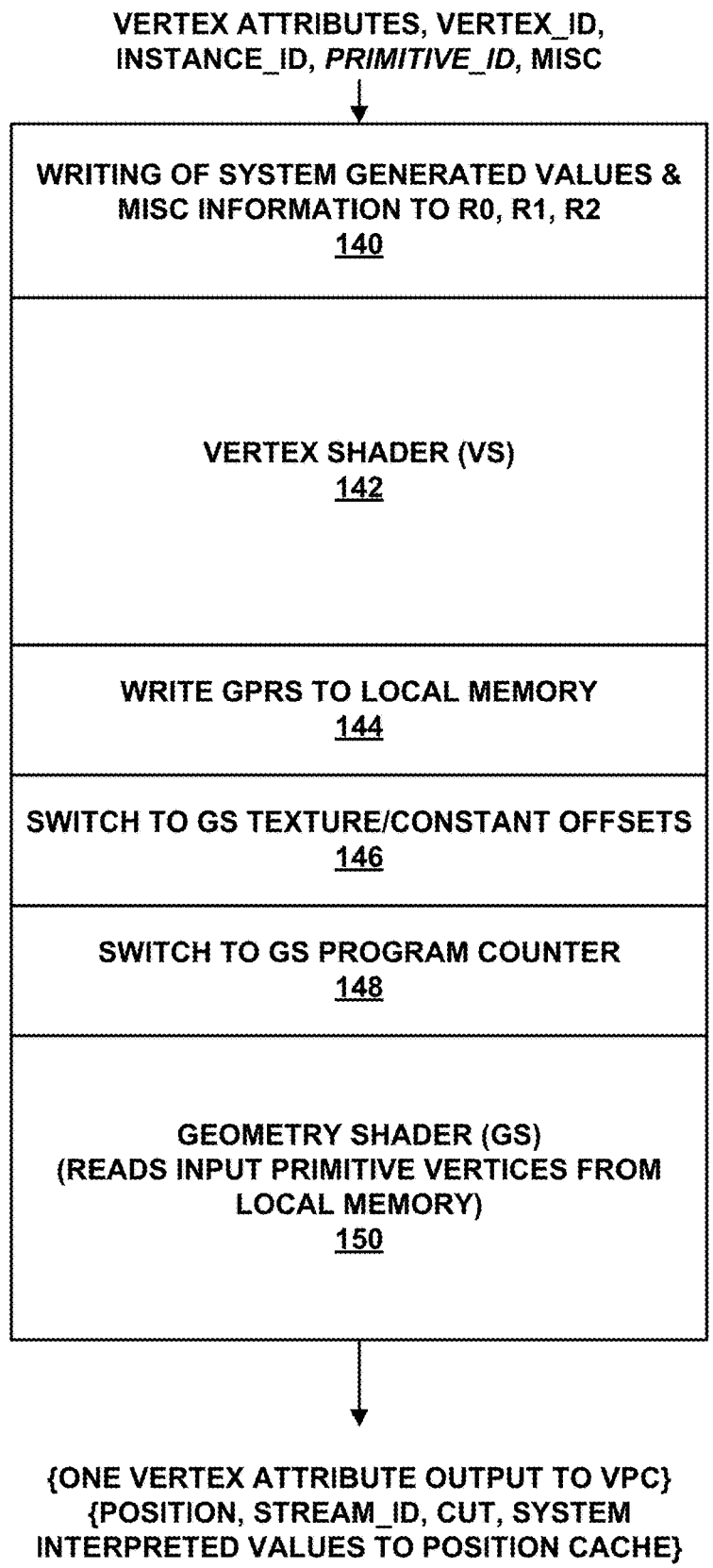
FIG. 5A illustrates a flow of operations performed by a merged vertex shader/geometry shader hardware shading unit when performing vertex shading operations and geometry shading operations.

FIGS. 5A and 5B illustrate example operations that may be performed by a hardware shading unit implementing the techniques of this disclosure. For example, FIG. 5A generally illustrates a flow of operations performed by a merged VS/GS hardware shading unit when performing vertex shading operations and geometry shading operations. The merged VS/GS hardware shading unit, in some examples, may include a shading unit 40 that is designated by GPU 36 to perform vertex shading operations, but that performs both vertex shading operations and hardware shading operations in accordance with techniques of this disclosure.

FIG. 5B generally illustrates pseudo code corresponding to the flow of operations shown in FIG. 5A, which may be executed by the merged VS/GS hardware shading unit. While certain aspects of FIGS. 5A and 5B may be described with respect to GPU 36 (FIG. 1), aspects of this disclosure may be performed by a variety of other GPUs having a variety of other components.

In the example shown in FIG. 5A, the merged VS/GS hardware shading unit writes system values such as vertex attributes, vertex_id, instance_id, primitive_id, misc to a series of registers R0, R1, and R2 (140). Typically, system values may be stored to any otherwise unallocated memory of GPU. By storing the system generated values to a series of registers in a predetermined location, GPU 36 may access the system generated values for each of the VS and GS stages. Accordingly, the GS stage does not need to be complied based on the VS stage in order to determine where system generated values have been stored. Rather, GPU 36 may access predetermined memory locations when performing each of the stages to access the required system generated values.

The merged VS/GS hardware unit then performs vertex shading operations (142). Following the vertex shading operations, the merged VS/GS hardware shading unit may write the contents of general purpose registers (GPRs) (e.g., primitive vertices from the vertex shading operations) to local memory, such as GPU memory 38. The merged VS/GS hardware shading unit may then switch to GS texture and constant offsets (146) and a GS program counter (148), as described in greater detail below with respect to FIG. 5B.

The merged VS/GS hardware shading unit may read the contents of local memory, such as the primitive vertices from the vertex shading operations, and perform geometry shading operations (150). The merged VS/GS hardware shading unit may output one vertex attribute to a vertex parameter cache (VPC), as well as an indication of the position of the geometry shaded vertices, a stream_id, any cut indications, and any interpreted values to a position cache.

FIG. 5B generally illustrates pseudo code corresponding to the flow of operations shown in FIG. 5A, which may be executed by the merged VS/GS hardware shading unit. Each shader stage may be complied separately and independently (e.g., without knowledge of how a particular stage will be linked with another stage). To allow a single hardware shading unit to performing multiple shading operations, the hardware shading unit may reserve certain positions in local memory. For example, the hardware shading unit may reserve positions in local memory that can be accessed by both of the shader stages (VS or GS). Certain variables (e.g., PrimitiveID, misc, and rel_patchid) may be used by more than one shader stage. Accordingly, the reserved portions in local memory provide a standardized position for commonly used variables that may be accessed by more than one shader stage.

In the example shown in FIG. 5B, the hardware shading unit may initially perform vertex shading operations (VS) (contained in the first dashed box from top to bottom, which may correspond to steps 140-142 in the example of FIG. 5A). According to aspects of this disclosure, the hardware shading unit (or another component of the GPU) may then execute a so-called "patch code" to initiate the switchover from the vertex shading operations to the geometry shading operations (contained in the second dashed box from top to bottom, which may correspond to steps 144-148 in the example of FIG. 5A). More specifically, the commands CHMSK and CHSH may cause the hardware shading unit to switch operational modes in accordance with a mode of the draw call being executed (as described above).

For example, the hardware shading unit may write the vertex data from the vertex shading operations to local GPU memory, so that the shaded vertices are available when performing geometry shading operations. The hardware shading unit (or another component of the GPU) then executes a change mask (CHMSK) instruction that switches the resources of the hardware shading unit for geometry shading operations. For example, executing the CHMSK instruction may cause the hardware shading unit to determine which mode is currently being executed.

With respect to the Table 2 above, executing CHMSK may also cause the hardware shading unit to determine which shader stages are valid (e.g., vs_valid, gs_valid, and the like). As noted above, GPU 36 may allocate a number of fibers for performing the vertex shading and geometry shading operations. However, upon executing CHMSK, GPU 36 may only execute a sub-set of the fibers. For example, GPU 36 may determine whether instructions are valid before executing the instructions with shading units 40. GPU 36 may not execute fibers that are not valid (e.g., do not generate a shaded vertex), which may conserve power.

The hardware shading unit also executes a change shader (CHSH) instruction to switch a program counter (PC) to the appropriate state offsets for performing geometry shading operations. As described in greater detail below, this patch code (contained in the second dashed box from top to bottom, which may correspond to steps 144-148 in the example of FIG. 5A) may be the same regardless of which shader stages are being merged.

After executing the patch code, the hardware shader unit ceases vertex shading operations and performs geometry shading operations (contained in the third dash box from top to bottom, corresponding to step 150 in the example of FIG. 5A). Typically shaders (code for performing shading operations) executed by a hardware shading unit that performs multiple shading operations may require recompiling based shader dependencies. For example, if primitiveID (a system generated value) is used by the GS stage, the VS stage may be compiled (e.g., by compiler 54) to put a primitiveID value in a location from which the GS stage can pick up the value. Accordingly, compilation of the VS stage may be dependent on the needs of the GS stage.

According to aspects of this disclosure, each of the shaders may be independently compiled without respect to other shaders. For example, the shaders may be independently compiled without knowledge when other shaders will be executed. After compilation, GPU 36 may patch together the shaders using the patch code shown in FIG. 5B based on mode information associated with the draw call being executed at draw time. System generated values vertexID and instanceID may only used in the vertex shader, and may be loaded at specified general purpose register slots (GPRs) as computed by compiling the VS stage. However, the primitiveID and other merge shader related values from the primitive controller (PC) (as shown, for example, in FIG. 6) such as misc and rel_patchid may be used by any of the shader stages.

The patch code described above may be added to compiled shaders by a driver for GPU 36, such as GPU driver 50. For example, GPU driver 50 determines which shaders are required for each draw call. GPU driver 50 may attach the patch code shown in FIG. 5B to the appropriate shaders (shaders being merged) at a so-called driver time or link time, thereby linking compiled shaders so that the shaders are executed by the same hardware shading units. GPU driver 50 does not need to recompile the entire shaders, thereby conserving computational resources.

In this way, GPU 36 may patch shading operations together using a plurality of modes, with each mode having a particular set of associated shading operations. Such techniques may enable GPU 36 to perform additional shading operations (e.g., geometry shading operations, hull shading operations, and/or domain shading operations) without reconfiguring shading units 40. That is, the techniques may allow shading units 40 to adhere to input/output constraints of certain shader stages, while performing other shading operations.

Figure 6:
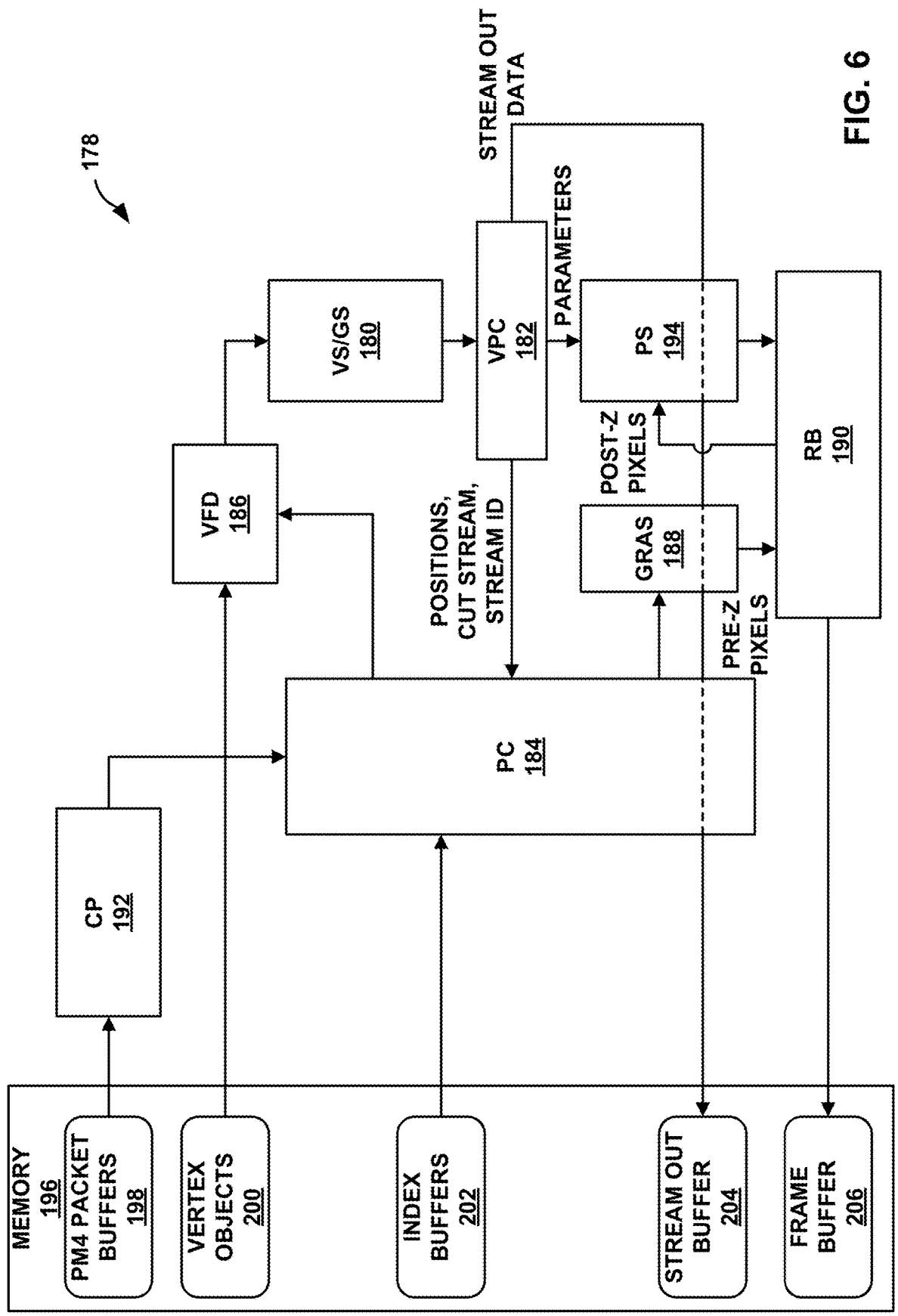
FIG. 6 is a diagram illustrating example components of a graphics processing unit for performing merged vertex shading operations and geometry shading operations, according to aspects of this disclosure.

FIG. 6 is a diagram illustrating example components of a graphics processing unit 178 for performing merged vertex shading operations and geometry shading operations, according to aspects of this disclosure. The example of FIG. 6 includes merged VS/GS unit 180, a vertex parameter cache (VPC) 182, a primitive controller (PC) 184, a vertex fetch decoder (VFD) 186, a graphics rasterizer (GRAS) 188, a render backend (RB) 190, a command processor (CP) 192, and a pixel shader (PS) 194. In addition, FIG. 6 includes memory 196 having PM4 packet buffers 198, vertex objects 200, index buffers 202, a stream out buffer 204, and a frame buffer 206.

In the example of FIG. 6, VS/GS unit 180 is implemented by a one or more shading units designated to perform vertex shading operations in the manner described above. VPC 182 may implement the stream out functionality to store stream out data to the stream out buffer 204. PC 184 may manage vertices that may need to be transformed. For example, PC 184 may assemble the vertices into triangle primitives. VFD 186 may fetch vertex data based on vertex format state. GRAS 188 may receive triangle vertices as an input and may output pixels that are within the triangle boundaries. A pre-fetch parser (PFP) may pre-decode a command stream and fetch data via pointers (e.g., resource pointers) so that this data is ready by the time the main CP engine 192 may need this data.

In an example for purposes of illustration, a DirectX 10 dispatch mechanism may be implemented using the graphics processing unit 178 shown in FIG. 6. For example, a DirectX draw call may be treated as single pass draw call with draw initiators having mode bits (mode information) indicating that VS operations and GS operations are merged, e.g., performed by the same shading units. This mode enables a GSblock within PC 184 to generate data for VFD 186 with GS output vertexID and GS instanceID. The GSblock creates number of VS fibers for an input primitive based on declared maxoutputvertexcount and GSinstancecount. If the number of fibers in a wave (e.g., an amount of work done by a shading unit, such as 32 fibers) are more than maxoutputvertexcount*GSinstancecount, then a wave may have multiple complete input GS primitives. Otherwise, GS input primitive vertex indices may be repeated for next wave until maxoutputvertexcount*GSinstancecount fibers are created. No vertex reuse is needed for the input primitive vertices.

At the output of VPC 182, PC 184 will generate primitive connectivity based on GS output primitive type. For example, the first output vertex from a GS (of VS/GS 180) may typically consist of "cut" bit in the position cache, which may indicate completion of a primitive (strip) before this vertex. PC 184 also sends this connectivity information for complete primitives to VPC 182 along with streamid for VPC 182 to stream out GS outputs to buffers 204 tied with a given stream. If there is a partial primitive between full primitives in GS 180, such a partial primitive is marked as PRIM_AMP_DEAD for GRAS 188 to drop the primitive. PC 184 also sends dead primitive types to VPC 182 to de-allocate a parameter cache for such a primitive.

Based on maxoutputvertexcount, a GPU driver (such as GPU driver 50 shown in FIG. 1) may compute how many input primitive vertices will be stored in local memory. This input primitive value may be computed as the variable GS_LM_SIZE according to the following equation:

$$\text{fibers\_in\_a\_wave/maxoutputvertexcount*number of vertices per primitive*size of vertex}$$

A high level sequencer (HLSQ) that receives the draw call of this type may check which shader processor's local memory (LM) has enough storage for GS_LM_SIZE (e.g., possibly using a round robin approach). The HLSQ may maintain the start base address of such an allocation, as well as the address of any read or write to local memory by an allocated wave. The HLSQ may also add a computed offset within the allocated memory to the base address when writing to local memory.

Accordingly, according to aspects of this disclosure, the relationship between input and output is not 1:1 (as would be typical for a shading unit designated to perform vertex shading operations) for VS/GS 180. Rather, the GS may output one or more vertices from each input primitive. In addition, the number of vertices that are output by GS is dynamic, and may vary from one to an API imposed maximum GS output (e.g., 1024 double words (dwords), which may be equivalent to an output maximum of 1024 vertices).

That is, the GS may produce a minimum of one vertex and a maximum of 1024 vertices, and the overall output from the GS may be 1024 dwords. The GS may declare at compile time a maximum number of output vertices from the GS using the variable dcl_maxoutputvertexcount. However, the actual number of output vertices may not be known at the time GPU 36 executes the GS. Rather, the declaration dcl_maxoutputvertexcount may only be required as a parameter for the GS.

The GS may also declare the variable instancecount for the number of GS instances (operations) to be invoked per input primitive. This declaration may act as an outer loop for the GS invocation (identifying the maximum number of geometry shader instances). The maximum instancecount may be set to 32, although other values may also be used. Accordingly, the GS has access to a variable GSInstanceID in the geometry shader operations, which indicates which instance a given GS is working on. Each of the GS instances can output up to 1024 dwords, and each may have dcl_maxoutputvertexcount as a number of maximum output vertices. In addition, each GS instance may be independent of other GS instances.

The input primitive type, which GPU 36 may declare at the input of the GS, may be a point, a line, a triangle, a line with adjacency, a triangle with adjacency, and patch1-32. A triangle with adjacency may be a new feature for certain APIs, such as DirectX 10. In addition, a patch1-32 may be a further enhancement for added for the DirectX 11 API. The output primitive type from the GS can be a point, line strip, or a triangle strip. The output of the GS may go to one of four streams that may be declared in the GS, and the GS may declare how many streams are used. In general, a "stream" refers to shaded data that is either stored (e.g., to a memory buffer) or sent to another unit of the GPU, such as the rasterizer. Each vertex "emit" instruction may use an "emit stream" designation that may indicate to which stream the vertex is going.

The GS may use a "cut stream" instruction or an "emit-thencut stream" instruction to complete a strip primitive type. In such examples, a next vertex will start a new primitive for a given stream. In some examples, a programmer may declare (using an API), at most, one of the streams to be used as a rasterized stream when setting up streams. In addition, four 1D buffers may be tied to one stream, but the total number of buffers tied to all of the GS streams may not exceed four. Off-chip buffers are not typically shared between streams.

When a vertex is emitted for a given stream, the subsections of the vertex for each buffer tied to the stream are written to an off-chip buffer (such as storage unit 48) as a complete primitive. That is, partial primitives are generally not written to an off-chip buffer. In some examples, the data written to the off-chip buffers may be expanded to include and indication of a primitive type, and if more than one stream is enabled for a given GS, an output primitive type for the GS may be "point" only.

The GS stage may receive a PrimitiveID parameter as an input, because the PrimitiveID is a system generated value. The GS may also output a PrimitiveID parameter, a ViewportIndex parameter, and a RenderTargetArrayIndex parameter to one or more registers. An attribute interpolation mode for the GS inputs is typically declared to be constant. In some examples, it is possible to declare the GS to be NULL, but still enable output. In such examples, only stream zero may be active. Therefore, the VS output may be expanded to list a primitive type, and may write values to buffers tied to stream zero. If the input primitive type is declared to be an adjacent primitive type, the adjacent vertex information may be dropped. That is, for example, only internal vertices of an adjacent primitive (e.g., even numbered vertex number) may be processed to form a non-adjacent primitive type.

In the case of a patch input primitive type with a NULL GS, the patch is written out as a list of points to buffers tied to the stream. If the declared stream is also rasterized, GPU 36 may render the patch as a plurality of points, as specified by patch control points. In addition, when GS is NULL, A viewportindex parameter and a rendertargetarrayindex parameter may be assumed to be zero.

Query counters may be implemented to determine how many VS or GS operations are being processed by GPU 36, thereby allowing hardware components to track program execution. Query counters may start and stop counting based on a stat_start event and a stat_end event. The counters may be sampled using a stat_sample event. The operational block that receives a stat_start and/or_stop event will start or stop counting at various points, where increment signals are sent, receive such events.

When a driver of GPU 36 needs to read such counters, the driver may send a stat_sample event through the command processor (CP), as shown and described with respect to FIG. 5B. The CP may refrain from sending any additional draw calls to GPU 36 until a register backbone management (RBBM) unit gets an acknowledgement (or "ack") back from the operational blocks responsible for incrementing the counters. Once an "ack" is received, the RMMB unit may read the counters and resume sending the next draw call(s).

GPU 36 may store a variety of data to local GPU memory 38. For example, the following query counts may be maintained by the CP in hardware. In some examples, the following query counts may be formed as 64-bit counters, which may be incremented using 1-3 bit pulses from various operational blocks, as indicated below:

IAVertices may refer to a number of vertices used in generating primitives. Accordingly, if an input primitive type is strip that produces triangles, the IAvertices value may be 6. This value may match a Windows Hardware Quality Labs (WHQL) number. This value may be controlled using a 2-bit pulse from a primitive controller (PC). For the patch primitive, the value may be incremented by one per control point.

IAPrimitives may refer to a number of complete input primitives generated. This value may not include any partial primitive that may result in a reset. This value may match a WQHL number. This value may be controlled using a one bit pulse from the PC after a primitive is generated, as well as after checking for a reset index and partial primitive drops.

VSInvocations may refer to a number of times that a VS operation is invoked. This value may be set after vertex reuse, which may determine a number of unique vertices for which the VS stage is invoked. This value may be depend on the particular hardware of GPU 36. This value may be controlled using a 2-bit pulse from the PC as the PC checks for vertex reuse for up to three vertices at a time. There is typically no vertex reuse for the GS and the hull shader (HS) (e.g., as described below, for example, with respect to FIGS. 12A-13B) cases. Accordingly, the PC may send a number of vertices in primitives in a draw call as VSInvocations.

HSInvocations may refer to the number of patches that have gone through the HS. This value may be a new value for certain APIs, such as DirectX 11. This value may not include any partial patches. This value may be controlled using a one bit pulse from the PC and from a HS block when a patch is completely sent to a vertex fetch decoder (VFD). This value should also match a WHQL number.

DSInvocations may refer to a number of times that a domain shader (DS) operation is invoked. This value should match WHQL when a tessellation output primitive type is of a type point. This value is controlled using a one bit pulse from a tessellation engine (TE) in the PC for each domain point (u,v) that is being generated.

GSInvocations may refer to a number of times a GS operation is invoked. If a GSinstancecount value is used, each instance is counted as one GS invocation. This value should match a WHQL number. This value may be controlled using a one bit pulse from a GS block that is sent once per input primitive per Gsinstance. In some examples, the GS block may send an input GS primitive several times when GS amplification is more than a wave size. This value is typically counted once per GS input primitive.

GSPrimitives may refer to a number of GS output primitives that are generated. This value may not include any partial primitives resulting from a "cut" operation. This value may match a WHQL number. This value may be controlled using a one bit pulse per output primitive from the PC after access to a position cache in which primitives are composed and after dropping partial primitives due to a "cut" operation or vertex kill event.

CInvocations may refer to a number of times so called "clippers" are executed. This value may be depend on the particular hardware of GPU 36.

CPrimitives may refer to a number of primitives that the clipper generated. This value may depend on the particular hardware of GPU 36.

PSInvocations may refer to a number of times that pixel shader (PS) threads (which may also be referred to as "fibers") are invoked.

CSInvocations may refer to a number of times compute fibers are invoked.

In addition to the values described above, there may be two stream out related query counts that are maintained per stream. These the stream out related values may include the following values:

NumPrimitiveWritten may refer to a total number of primitives written for a given stream before the draw call ended. This value may also include the data of the buffer tied with a stream when the buffer runs out of the storage for a complete primitive. This value may be controlled using a one bit pulse per stream from a vertex parameter cache (VPC) to the CP each time that there is space in any of the buffers of a given stream to store a full primitive.

PrimitiveStorageNeeded may refer to a total number of primitives that could have been written if any buffer tied with the stream did not run out of storage. This value may be controlled using a one bit pulse per stream from the VPC to the CP each time a primitive for a stream is generated by GS.

Typically, GPU 36 may support stream out directly from the VPC. As noted above, there may be up to four streams that are supported by a GS. Each of these streams may be bound by up to four buffers, and the buffers are not typically sharable between different streams. The size of the output to each buffer may be up to 128 dwords, which is the same as the maximum size of a vertex. However, a stride may be up to 512 dwords. The output data from a stream may be stored to multiple buffers, but the data generally may not be replicated between buffers. In an example for purposes of illustration, if "color.x" is written to one of the buffers tied to a stream, then this "color.x" may not be sent to another buffer tied to same stream.

Streaming out to the buffers may be performed as a complete primitive. That is, for example, if there is space in any buffer for a given stream for only two vertices, and a primitive type is triangle (e.g., having three vertices), then the primitive vertices may not be written to any buffer tied with that stream.

If the GS is null, and stream out is enabled, the stream out may be identified as a default stream zero. When stream out is being performed, the position information may be written into the VPC as well as into the PC, which may consume an extra slot. In addition, when binning is performed (e.g., the process of assigning vertices to bins for tile based rendering), stream out may be performed during the binning pass.

In some APIs, such as DirectX 10, a DrawAuto function (that may patch and render previously created streams) may be specified that consumes stream out data. For example, a GPU driver may send an event for a stream out flush for a given stream along with a memory address. The VPC, upon receiving such an event, may send an acknowledge (ack) bit to the RBBM. The RBBM, upon receiving the ack bit writes the amount of buffer space available in a buffer (buffered filled size) to a driver specified memory or memory location.

In the mean time, a pre-fetch parser (PFP), which may be included within the command processor (CP), waits to send any draw call. Once the memory address is written, the PFP may then send a next draw call. If the next draw call is an auto draw call, the GPU driver may send a memory address containing buffer filled size as part of a packet that indicate draw calls and state changes (e.g., a so-called "PM4" packet). The PFP reads the buffer_filled_size from that memory location, and sends the draw call to the PC.

Figure 7:
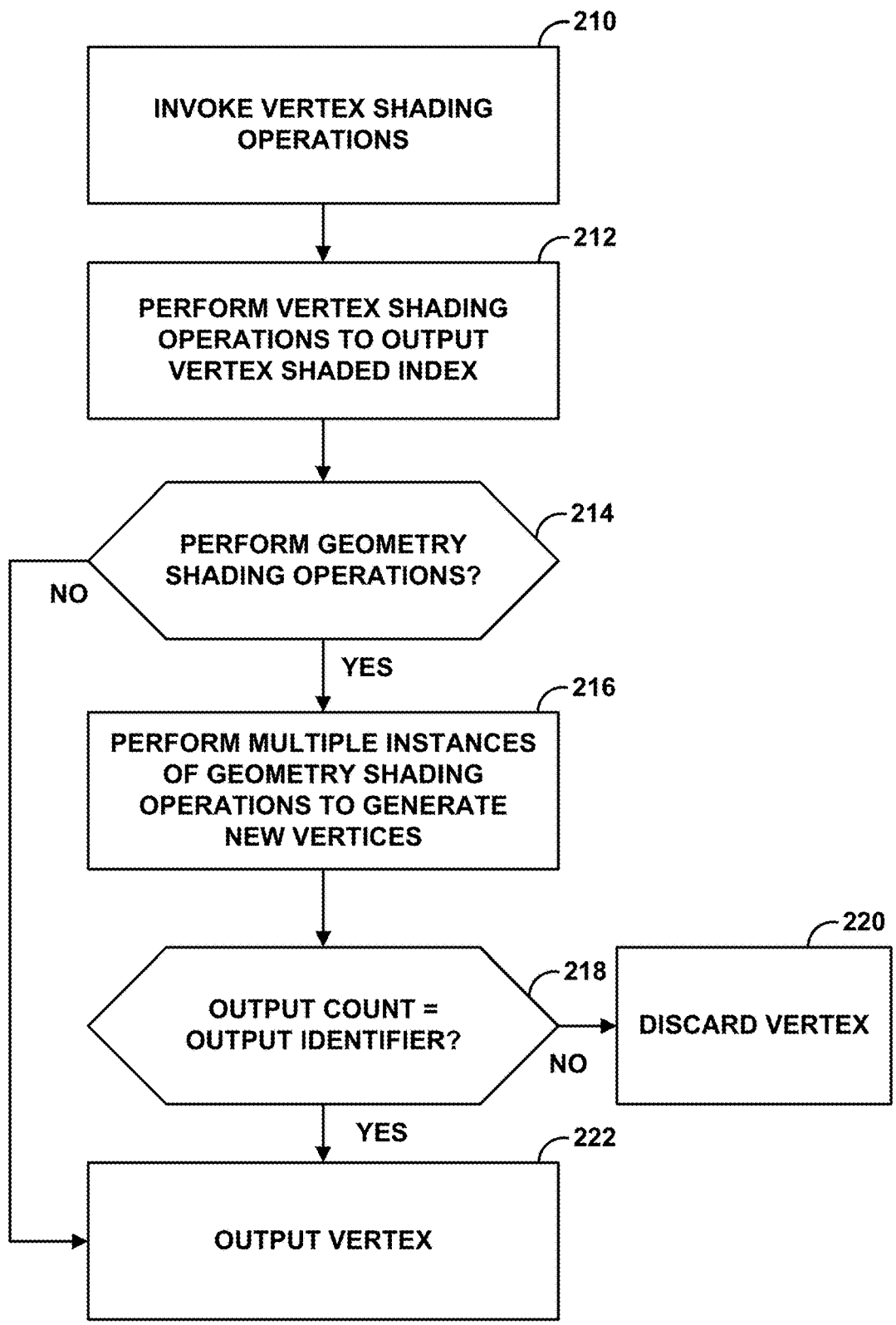
FIG. 7 is a flowchart illustrating an example process for performing vertex shading operations and geometry shading operations, according to aspects of this disclosure.

FIG. 7 is a flowchart illustrating an example process for performing vertex shading operations and geometry shading operations, according to aspects of this disclosure. While described as being carried out by GPU 36 (FIG. 1), it should be understood that the techniques described with respect to FIG. 7 may be performed by a variety of GPUs or other processing units.

GPU 36 may initially invoke vertex shading operations, for example, upon receiving vertex shader instructions (210). Invoking the vertex shading operations may cause GPU 36 to designate one or more shading units 40 for the vertex shading operations. In addition, other components of GPU 36 (such as a vertex parameter cache, rasterizer, and the like) may be configured to receive a single output per input from each of the designated shading units 40.

GPU 36 may perform, with a hardware shading units designated for vertex shading operations, vertex shading operations to shade input vertices (212). That is, the hardware shading unit may perform vertex shading operations to shade input vertices and output vertex shaded indices. The hardware shading unit may receive one vertex and output one shaded vertex (e.g., a 1:1 relationship between input and output).

GPU 36 may determine whether to perform geometry shading operations (214). GPU 36 may make such a determination, for example, based on mode information. That is, GPU 36 may execute patch code to determine whether any valid geometry shader instructions are appended to the executed vertex shader instructions.

If GPU 36 does not perform geometry shading operations (the NO branch of step 214), GPU the hardware shading unit may output one shaded vertex for each input vertex (222). If GPU 36 does perform geometry shading operations (the YES branch of step 214), the hardware shading unit may perform multiple instances of geometry shading operations to generate one or more new vertices based on the received vertices (216). For example, the hardware shading unit may perform a predetermined number of geometry shading instances, with each instance being associated with an output identifier. The hardware shading unit may maintain an output count for each instance of the geometry shading operations. In addition, an output identifier may be assigned to each output vertex.

Accordingly, to determine when to output a geometry shaded vertex, the hardware shading unit may determine when the output count matches an output identifier (218). For example, if an output count for a geometry shading operation does not match the output identifier (the NO branch of step 218), the vertex associated with that geometry shading operation is discarded. If the output count for a geometry shading operation does match the output identifier (the YES branch of step 218), the hardware shading unit may output the vertex associated with the geometry shading operation. In this way, the hardware shading unit designated for vertex shading outputs a single shaded vertex and discards any unused vertices for each instance of the geometry shading program, thereby maintaining a 1:1 input to output ratio.

FIG. 8 is a block diagram illustrating an example graphics processing pipeline 238 that includes tessellation stages. For example, pipeline 238 includes an input assembler stage 240, a vertex shader stage 242, a hull shader stage 244, a tesselator stage 246, a domain shader stage 248, a geometry shader stage 250, a rasterizer stage 252, a pixel shader stage 254, and an output merger stage 256. In some examples, an API, such as the DirectX 11 API may be configured to use each of the stages shown in FIG. 8. The graphics processing pipeline 238 is described below as being performed by GPU 36, but may be performed by a variety of other graphics processors.

Certain stages shown in FIG. 8 may be configured similarly to or the same as the stages shown and described with respect to FIG. 2 (e.g., assembler stage 240, vertex shader stage 242, geometry shader stage 250, rasterizer stage 252, pixel shader stage 254, and output merger stage 256). In addition, pipeline 238 includes additional stages for hardware tessellation. For example, graphics processing pipeline 238 includes, in addition to the stages described above with respect to FIG. 2, hull shader stage 244, tessellator stage 246, and domain shader stage 248. That is, hull shader stage 244, tessellator stage 246, and domain shader stage 248 are included to accommodate tessellation by GPU 36, rather than being performed by a software application being executed, for example, by CPU 32.

Hull shader stage 244 receives primitives from vertex shader stage 242 and is responsible for carrying out at least two actions. First, hull shader stage 244 is typically responsible for determining a set of tessellation factors. Hull shader stage 244 may generate tessellation factors once per primitive. The tessellation factors may be used by tessellator stage 246 to determine how finely to tessellate a given primitive (e.g., split the primitive into smaller parts). Hull shader stage 244 is also responsible for generating control points that will later be used by domain shader stage 248. That is, for example, hull shader stage 244 is responsible for generating control points that will be used by domain shader stage 248 to create actual tessellated vertices, which are eventually used in rendering.

When tessellator stage 246 receives data from hull shader stage 244, tessellator stage 246 uses one of several algorithms to determine an appropriate sampling pattern for the current primitive type. For example, in general, tessellator stage 246 converts a requested amount of tessellation (as determined by hull shader stage 244) into a group of coordinate points within a current "domain." That is, depending on the tessellation factors from hull shader stage 244, as well as the particular configuration of the tessellator stage 246, tessellator stage 246 determines which points in a current primitive need to be sampled in order to tessellate the input primitive into smaller parts. The output of tessellator stage may be a set of domain points, which may include barycentric coordinates.

Domain shader stage 248 takes the domain points, in addition to control points produced by hull shader stage 244, and uses the domain points to create new vertices. Domain shader stage 248 can use the complete list of control points generated for the current primitive, textures, procedural algorithms, or anything else, to convert the barycentric "location" for each tessellated point into the output geometry that is passed on to the next stage in the pipeline. As noted above, certain GPUs may be unable to support all of the shader stages shown in FIG. 8. For example, some GPUs may be unable to designate shading units to perform more than two shading operations, due to hardware and/or software restrictions (e.g., a limited number of shading units 40 and associated components). In an example, certain GPUs may not support operations associated with geometry shader stage 250, hull shader stage 244, and domain shader stage 248. Rather, the GPUs may only include support for designating shading units to perform vertex shader stage 242 and pixel shader stage 252. Thus, operations performed by shading units must adhere to the input/output interface associated with vertex shader stage 84 and pixel shader stage 90.

In addition, supporting a relatively longer graphics processing pipeline may require a relatively more complex hardware configuration. For example, control points, domain points, and tessellation factors from hull shader stage 244, tessellator stage 246, and domain shader stage 248 may require reads and writes to off-chip memory, which may consume memory bus bandwidth and may increase the amount of power consumed. In this sense, implementing a graphics pipeline with many stages using dedicated shading units 40 for each shader stage may result in less power efficient GPUs. In addition, such GPUs may also be slower in terms of outputting rendered images due to delay in retrieving data from off-chip memory as a result of limited memory bus bandwidth.

According to aspects of this disclosure, as described in greater detail below, shading units 40 designated by GPU 36 to perform a particular shading operation may perform more than one operation. For example, a shading unit 40 designated to perform vertex shading (VS) operations may also perform hull shading operations associated with hull shader stage 244. In another example, the same shading unit 40 may also perform domain shading operations associated with domain shader stage 248, followed by geometry shader operations associated with geometry shader stage 250.

As described in greater detail below, GPU 36 may perform the shading operations above by breaking a draw call into two sub-draw calls (e.g., pass I and pass II), with each sub-draw call having associated merged shader stages. That is, GPU 36 may invoke the shading unit 40 to perform vertex shading operations, but may also implement the shading unit 40 to perform hull shading operations during a first pass. The GPU 36 may then use the same shading unit 40 (designated to perform vertex shading operations) to perform domain shading operations and geometry shading operations without ever re-designating the shading unit 40 to perform the hull shading, domain shading, or geometry shading tasks.

Figure 9:
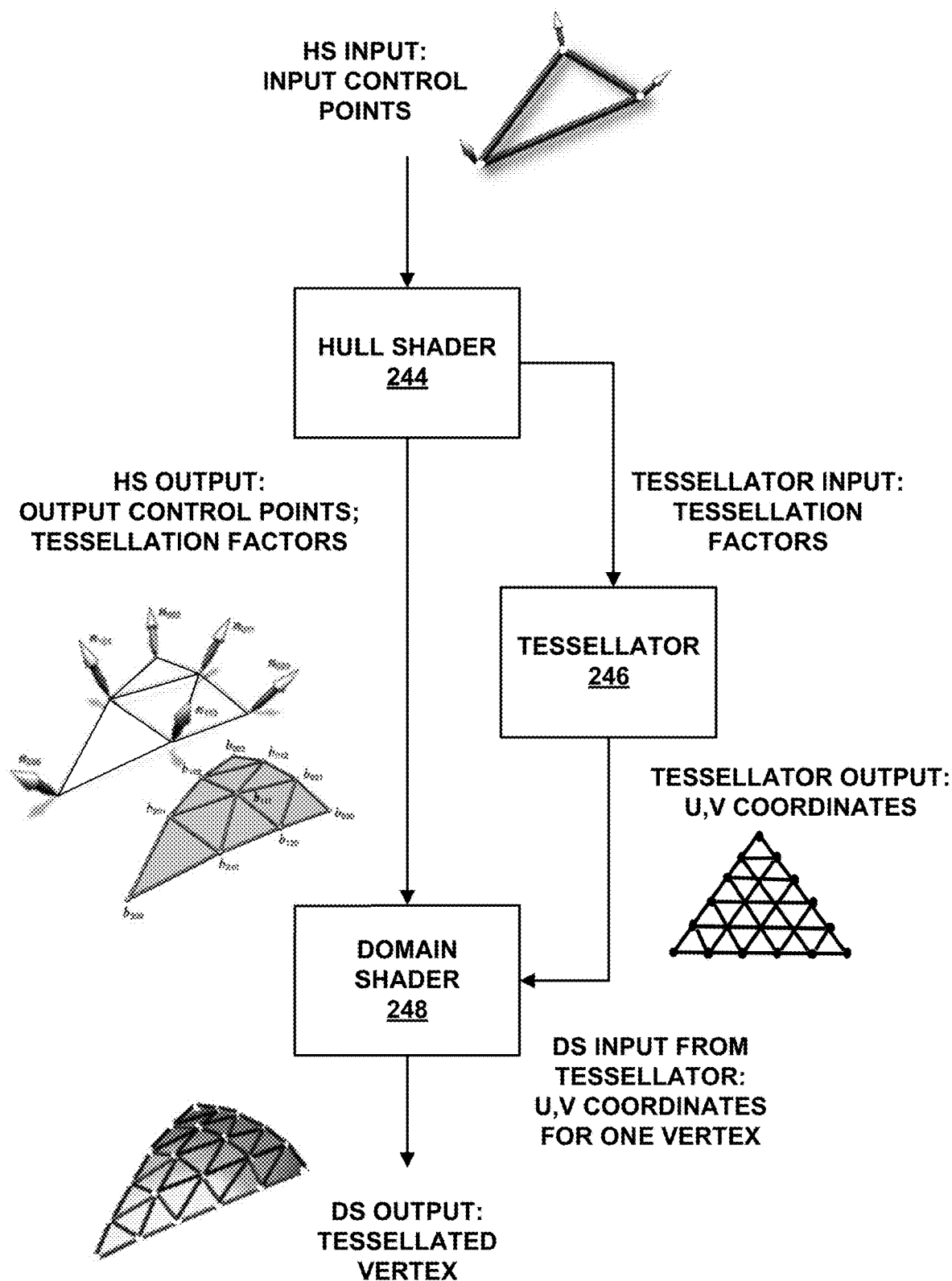
FIG. 9 is a conceptual diagram illustrating tessellation.

FIG. 9 is a conceptual diagram illustrating tessellation in greater detail. Hull shader (HS) stage 244 and domain shader (DS) 248 may be full fledged shader stages, each with their own set of constant buffers, textures, and other resources. In general, tessellation may be performed using a primitive type referred to as a patch. Accordingly, in the example shown in FIG. 9, hull shader stage 244 initially receives one or more input control points, which may be referred to as patch control points. The patch control points may be developer controlled (e.g., using an API). The hull shader stage 244 may perform calculations to generate a so-called Bezier patch that includes control points, which are used by domain shader stage 248, as described below.

Hull shader stage 244 also generates tessellation factors that may be used to control the amount of tessellation of a patch. For example, hull shader stage 244 may determine how much to tessellate based on a viewpoint and/or view distance of the patch. If an object is relatively close to the viewer in a scene, a relatively high amount of tessellation may be required to produce a generally smooth looking patch. If an object is relatively far away, less tessellation may be required.

Tessellator stage 246 receives tessellation factors and performs tessellation. For example, tessellator stage 246 operates on a given patch (e.g., a Bezier patch) having a uniform grade to generate a number of {U,V} coordinates. The {U, V} coordinates may provide texture for the patch. Accordingly, domain shader stage 248 may receive the control points (having displacement information) and the {U,V} coordinates (having texture information) and output tessellated vertices. These tessellated vertices may then be geometry shaded, as described above.

According to aspects of this disclosure, and as described in greater detail below, shading operations associated with hull shader stage 244 and domain shader stage 248 may be performed by the same shading units of a GPU (such as shading units 40). That is, for example, one or more shading units 40 may be designated to perform vertex shading operations. In addition to the vertex shading operations, the GPU may append shader instructions associated with hull shader stage 244 and domain shader stage 248 such that the shaders are executed by the same shading units in sequence and without being reconfigured to perform the tessellation operations.

Figure 10A:
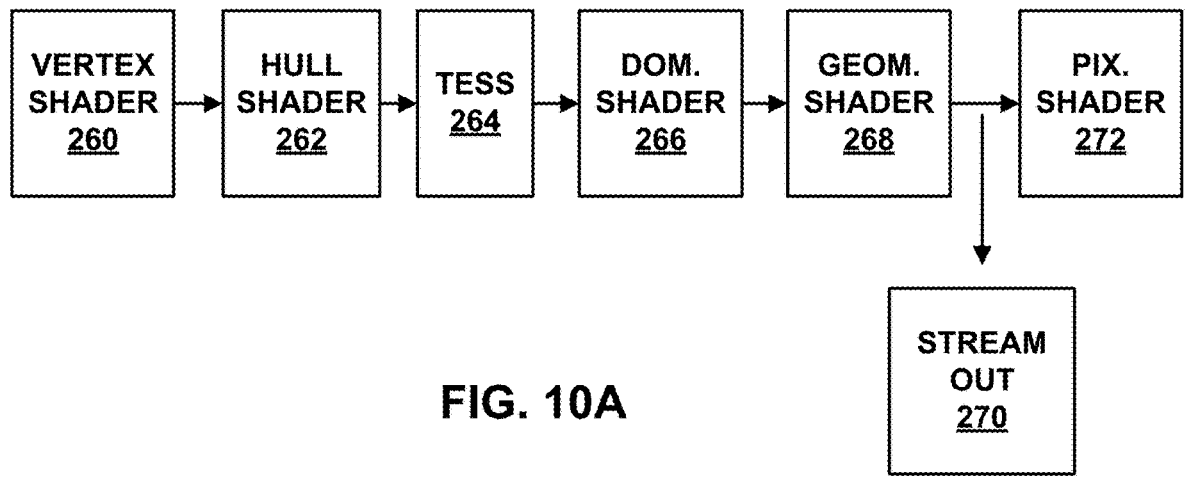
FIGS. 10A and 10B are conceptual diagrams of data flows in a graphics rendering pipeline, according to aspects of this disclosure.
Figure 10B:
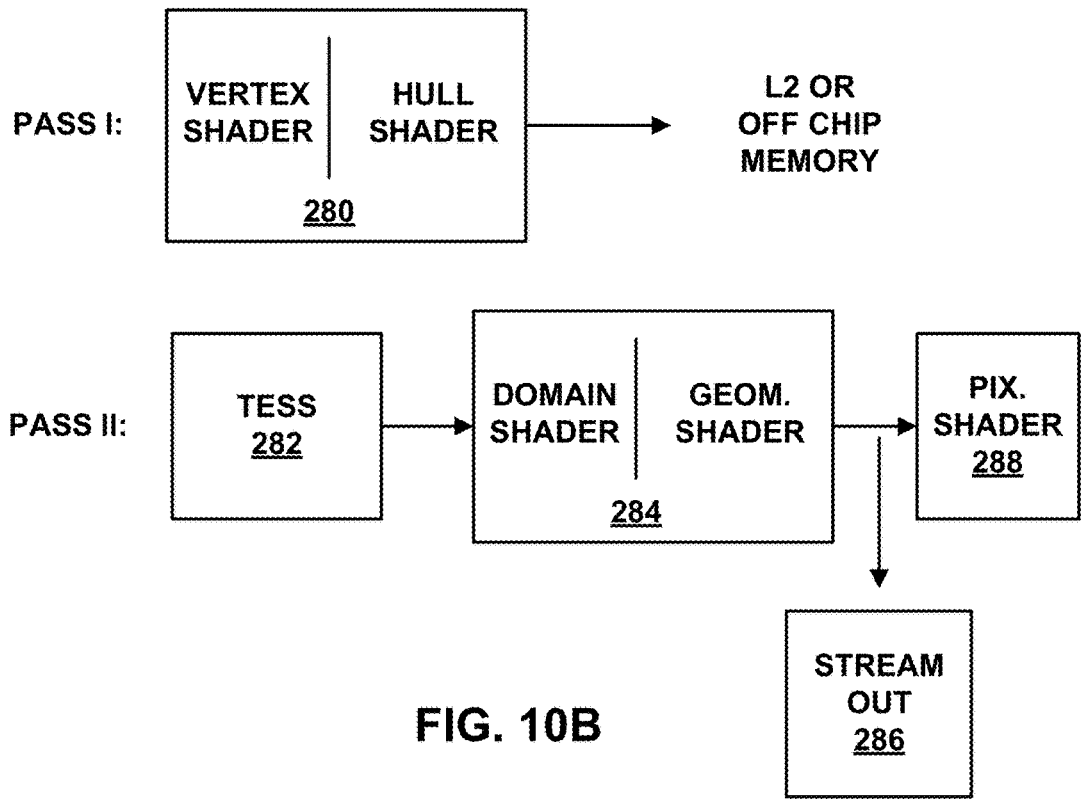

FIGS. 10A and 10B are conceptual diagrams of data flows in a graphics rendering pipeline, according to aspects of this disclosure. For example, FIG. 10A illustrates vertex shader stage 260, hull shader stage 262, a tessellator stage 264, a domain shader stage 266, a geometry shader stage 268, stream out 270, and pixel shader stage 272. In general, each of the shader stages shown in FIG. 10A represent associated hardware for performing shading operations. That is, for example, each of vertex shader stage 260, hull shader stage 262, domain shader stage 266, geometry shader stage 268, and pixel shader stage 272 may be associated with separately designated processing units, such as shading units 40.

In the example shown in FIG. 10A, vertex shader stage 260 may be invoked on so-called "patch control points" (or "control points," as described above with respect to FIGS. 8 and 9). Points in a given patch may be visible to hull shader stage 262, which uses the points to compute tessellation factors for the use by tessellation stage 264. Hull shader stage 262 may also output patch control points and constant data for use by domain shader stage 266.

In some examples, tessellator stage 264 may include fixed function hardware units for performing tessellation. Tessellator stage 264 may receive tessellation factors and control points from hull shader stage 262 and output so-called domain points (e.g., {U,V} points that specify where to tessellate. Domain shader stage 266 uses these domain points to compute vertices using output patch data from hull shader stage 262. Possible output primitives from domain shader stage 266 include, for example, a point, a line, or a triangle, which may be sent for rasertization, stream out 270, or to geometry shader stage 268. If any of the tessellation factors are less than or equal to zero, or not a number (NaN), the patch may be culled (discarded without being computed further).

The shader stages shown in FIG. 10A may support one or more graphics APIs. In an example for purposes of illustration, vertex shader stage 260, hull shader stage 262, domain shader stage 266, geometry shader stage 268 and pixel shader stage 272 may support the DirectX 11 API. That is, code produced using the DirectX 11 API may be executed by vertex shader stage 260, hull shader stage 262, domain shader stage 266, geometry shader stage 268 and pixel shader stage 272 to render graphics data. However, certain stages such as hull shader stage 262, domain shader stage 266, and/or geometry shader stage 268 may be not be included in all graphics rendering pipelines and may not be executable by all GPUs. For example, while the DirectX 11 API includes support for such stages, earlier revisions (e.g., DirectX 9 and 10) do not include such support. Accordingly, GPUs designed to execute code created with earlier revisions of the DirectX API (or GPUs designed for other APIs) may not be able to designate shading units 40 to perform operations associated with hull shader stage 262, domain shader stage 266, and/or geometry shader stage 268.

According to aspects of this disclosure, more than one of the shader stages in FIG. 10A may be merged, in that the shader stages are performed by a single hardware shading unit (e.g., such as shading unit 40). For example, according to aspects of this disclosure, a GPU (such as GPU 36) may perform multiple passes when executing a draw call to perform the shader stages shown in FIG. 10A, as described below with respect to FIG. 10B.

FIG. 10B illustrates a data flow in a graphics rendering pipeline that includes a first pass (Pass I) having a merged vertex shader and hull shader (VS/HS) stage 280. In addition, the data flow includes a second pass (Pass II) having a tessellation stage 282, a merged domain shader and geometry shader (DS/GS) stage 284, a stream out 286, and a pixel shader stage 288. The passes shown in FIG. 10B may be implemented to execute a draw call having tessellation operations.

For example, GPU 36 may execute an input draw call that includes tessellation operations, as described above with respect to FIG. 10A. GPU 36 may initially break the draw call into multiple sub-draw calls, with each sub-draw call including both Pass I operations and Pass II operations. The manner in which GPU 36 divides the draw call may depend at least partially on an amount of memory that is available (e.g., on-chip GPU memory, L2, global memory (GMEM), or offchip memory). For example, GPU 36 may configure the sub-draw calls so that GPU 36 is able to store all of the data generated by the Pass I operations to local memory for use with Pass II operations. The division of the draw call may be done in the command processor (CP) under the control of CP code, which may be based on the input draw call type.

In example for purposes of illustration, assume a draw call includes 1000 associated patches for rendering. In addition, assume that local memory has the capacity to store data associated with 100 patches. In this example, GPU 36 (or a driver for GPU, such as GPU driver 50) may split the draw call into 10 sub-draw calls. GPU 36 then performs the Pass I operations and Pass II operations for each of the 10 sub-draw calls in sequence.

With respect to Pass I operations, upon vertex shading operations being invoked by GPU 36, VS/HS stage 280 may perform both vertex shading operations and hull shading operations. That is, merged VS/HS stage 280 may include a single set of one or more shading units and may perform the operations described above with respect to vertex shader stage 260 and hull shader stage 262 in sequence. As described in greater detail below, aspects of this disclosure allow GPU 36 to perform hull shading operations with the same shading unit as the vertex shading operations, while still adhering to the appropriate interface. In some examples, hull shader instructions may be appended to vertex shader instructions using a patch code, thereby allowing the same shading unit to execute both sets of instructions.

GPU 36 may then perform Pass II operations. For example, tessellation stage 282 may perform tessellation, as described with respect to tessellation stage 264 above. Merged DS/GS stage 284 may include the same set of one or more shading units 40 as the merged VS/HS stage 280 described above. Merged DS/GS stage 284 may perform the domain shading and geometry shading operations described above with respect to domain shader stage 266 and geometry shader stage 368 in sequence. In some examples, geometry shader instructions may be appended to domain shader instructions using a patch code, thereby allowing the same shading unit to execute both sets of instructions. Moreover, these domain shader instructions and geometry shader instruction may be appended to the hull shader instructions (of Pass I), so that the same shading unit may perform vertex shading, hull shading, domain shading, and geometry shading without being re-configured.

The Pass II geometry shading operations may include essentially the same geometry shading operations as those described above. However, when beginning Pass II operations, the GPR initialized input (previously for the VS stage, now for the DS stage) may include (u, v, patch_id) produced by tessellation stage 282, rather than fetched data from the vertex fetch decoder (VFD). The PC may also compute rel_patch_id for Pass II, and may pass the patch ID information to the DS along with (u,v) computed by tessellation stage 282. Tessellation stage 282 may use tessellation factors to produce (u,v) coordinates for tessellated vertices. The output of tessellation stage 282 can be fed to merged DS/GS stage 284 to prepare tessellated for further amplification (geometry shading) or stream out 286. DS uses hull shader (HS) output control point data and HS patch constant data from the off-chip scratch memory.

In some examples, the two passes shown in FIG. 10B may be performed consecutively, but separated by a wait for idle between the two passes. For example, the CP of the GPU may send a draw call for Pass I operations. Prior to commencing Pass II on the data, the GPU may wait for control point values to be fully written to local memory. To ensure that the correct values are available in local memory, the GPU may confirm that the components of the GPU are idle before beginning Pass II operations.

The command processor (CP) may then send a draw call for Pass II. In an example, the ratio of the amount of latency to start a first useful vertex versus the amount of work done in Pass II may be approximately less than 2%. Accordingly, in some examples, there may be no overlap between Pass I and Pass II. In other examples, as described below, the GPU may include an overlap between Pass I and Pass II operations. That is, the GPU may overlap the pixel shading operations of pixel shader stage 288 of Pass II of a previous draw call with vertex shading operations of VS/HS stage 280 of the Pass I of a current draw call, because pixel shader processing may take longer than vertex shader processing.

According to aspects of this disclosure, a primitive controller (PC) may send PASS_done event after the Pass I, which may help the hardware unit to switch to Pass II. In an example in which there may be overlap between Pass I and Pass II, the existence of Pass I operations and Pass II operations may be mutually exclusive at the shader processor executing the instructions. However, the tessellation factors for Pass II may be fetched while Pass I is still executing.

As described below with respect to FIG. 11, the PC may keep a counter per shaded patch to record how many Pass I waves are completed. These counters may indicate how many patches have completed processing for Pass I. As soon as all the counter values are greater than zero, tessellation factors may be fetched for Pass II. Accordingly, Pass II may start before Pass I is completed. However, a draw call for Pass II may not start processing until all of the indices for the Pass I draw call are processed. In this way, pipeline flushing (transfer from local GPU memory to external memory) between the passes may be avoided.

FIG. 11 is a diagram illustrating example operations of a hardware shading unit that implements the techniques described in this disclosure to perform vertex shading and hull shading operations. For example, FIG. 11 generally illustrates performing vertex shading operations and hull shading operations during a first pass (Pass I) of a draw call, as described above with respect to FIG. 10B, in accordance with techniques of this disclosure. While described with respect to GPU 36 (FIG. 1), aspects of this disclosure may be performed by a variety of other GPUs having a variety of other components.

In the example of FIG. 11, GPU 36 may designate a shading unit 40 to perform vertex shading operations, which may also ultimately perform hull shading, domain shading, and geometry shading, as described in greater detail below, without being reconfigured to perform such shading operations. For example, the shading unit 40 may initially perform vertex shading operations to generate an input primitive (a triangle strip) having three vertices, denoted as points p0-p2.

After executing the vertex shading operations, GPU 36 may store the shaded vertices to local memory resources. For example, GPU 36 may export the vertex shader output to a position cache (e.g., of GPU memory 38). The vertex shading operations and hull shading operations may be separated by a VS END instruction. Accordingly, after executing the VS END instruction and completing the vertex shading operations, one or more shading units 40 designated to perform the vertex shading operations each begin performing hull shading operations.

The same shading unit 40 may then perform hull shading operations to generate an output patch having control points V0-V3. In this example, the shading unit 40 executes multiple instances of the hull shader operation (which are denoted by their output identifiers (Outvert) in a similar manner to the geometry shader operations described above with respect to FIG. 4. Each instance of the hull shader operation performs the same algorithm to perform the same hull shading operation and generates respective instances of the one or more new control points, V0-V3.

That is, the four columns of the table shown in FIG. 11 correspond to four separate instances of the hull shader operation (or program), where each column from left to right may be identified by the hull shader operation Outvert of 0-3. Each of these four instances of the hull shader operation is executed, often concurrently, by the shading unit 40 to generate a separate instance of the one or more new control points. Thus, each of the instances of the hull shader operations generates all four of the control points (V0-V3), but only outputs a corresponding one of the four new control points. Each instance of the hull shader operation only outputs a corresponding one of the four new control points so as to adhere to the 1:1 interface of the shading unit 40, which was invoked for vertex shading operations.

In the example of FIG. 11, each of the hull shader operations outputs the one of the four new control points that matches its Outvert. Thus, the first instance of the hull shader operation having an Outvert=0 outputs the first one of the four new control points, V0. The second instance of the hull shader operation having an Outvert=1 outputs the second one of the four new control points, V1. The third instance of the hull shader operation having an Outvert=2 outputs the third one of the four new control points, V2. The fourth instance of the hull shader operation having an Outvert=3 outputs the fourth one of the four new control points, V3. After the hull shader values have been written to local memory, domain shading operations and geometry shading operations may be performed during a second pass (Pass II), as described above.

According to aspects of this disclosure, the same shading unit 40 designated to perform vertex shading operations also performs the hull shading operations described above. Moreover, the same shading unit 40 may also perform domain shading and geometry shading operations during a second pass (Pass II) of the draw call. For example, GPU 36 may change state to shader specific resources (e.g., hull, domain, and/or geometry shader constants, texture offsets, and the like). GPU 36 may perform this state change according to a mode (draw mode) assigned to the shading operations.

Table 4, shown below, illustrates operational modes and parameters that may be maintained by GPU 36 to perform vertex shading, hull shading, domain shading, and geometry shading with the same shading unit 40.

TABLE 4

Modes for Performing Shading Operations

|  | Mode | | | | |
| --- | --- | --- | --- | --- | --- |
|  | Mode 0<br>GS: off,<br>HS: off | Mode 1<br>GS: on<br>HS: off | Mode 4<br>GS: on,<br>HS: on<br>(PassII) | Mode 3<br>GS: off,<br>HS: on<br>(PassII) | Mode 2<br>GS: off,<br>HS: on<br>(Pass I) |
| Flow | VS->PS | VS\|GS->PS | DS\|GS<br>->PS | DS->PS | VS\|HS |
| Index (32 bits) | Vertex index (VS) | Vertex index (VS) | u(15:0) v (31:16) | u(15:0) v (31:16) | Vertex index |
| uv_msb (2-bits) | Not used | Not used | Upper bit of u, v | Upper bit of u, v | Not used |
| PrimitiveID (32-bits) | Not used | PrimitiveID (GS) | PrimtiiveID (DS, GS) | PrimtiiveID (DS) | PrimtiiveID (HS) |
| Rel_patchid (32-bits) | Not used | Not used | Rel_patchid (DS) | Rel_patchid (DS) | Rel_patchid (HS) |

TABLE 4-continued

Modes for Performing Shading Operations

| | Mode | | | | |
|---|---|---|---|---|---|
| | Mode 0 GS: off, HS: off | Mode 1 GS: on HS: off | Mode 4 GS: on, HS: on (PassII) | Mode 3 GS: off, HS: on (PassII) | Mode 2 GS: off, HS: on (Pass I) |
| Misc (25 bits) | Not used | misc-> rel_primID (4:0) misc-> rel_vertex (9:5) misc-> GsInstance (14:10) misc-> Gsoutvertex (24:15) | misc-> rel_primID (4:0) misc-> rel_vertex (9:5) misc-> GsInstance (14:10) misc-> Gsoutvertex (24:15) | Not used | misc-> rel_primID (4:0) misc-> rel_vertex (9:5) misc-> outvertID (14:10) |
| Vs_valid (1 bit) | | | | | |
| Gshs_valid (1 bit) | | | | | |
| Mode (2:0) | Mode = mode_0 | Mode = mode_1 | Mode = mode_4 | Mode = mode_3 | Mode = mode_2 |
| Instance_cmd (2-bit) | | | | | |

In some instances, as indicated in Table 4 above, certain shading operations may not be performed for a particular draw call. For example, a draw call may include vertex shading, hull shading, domain shading, and pixel shading operations, but may not include geometry shading operations (as shown for Mode 3). GPU 36 may use mode information to determine which shading operations to perform when executing a draw call.

Table 5, shown below, illustrates parameter values when performing Pass II operations without performing geometry shading operations.

TABLE 5

Parameter Values Without Geometry Shading

| Mode 3 GS: off, HS: on | Fiber 0 | Fiber 1 | Fiber 2 | Fiber 3 | Fiber 4 | Fiber 5 | Fiber 6 | Fiber 7 |
|---|---|---|---|---|---|---|---|---|
| Valid_as_input | 1 | 1 | 1 | 1 | 1 | 1 | 1 | 1 |
| Vertex index (VS) | U\|V | U\|V | U\|V | U\|V | U\|V | U\|V | U\|V | U\|V |
| Uv_msb | u\|v | u\|v | u\|v | u\|v | u\|v | u\|v | u\|v | u\|v |
| primitiveID (HS) | 105 | 105 | 105 | 105 | 105 | 105 | 105 | 105 |
| Rel_patchID | 5 | 5 | 5 | 5 | 5 | 5 | 5 | 5 |

Table 6, shown below, illustrates parameter values when performing Pass II operations including performing geometry shading operations.

TABLE 6

Parameter Values With Geometry Shading

| Mode 4 GS: on, HS: on | Fiber 0 | Fiber 1 | Fiber 2 | Fiber 3 | Fiber 4 | Fiber 5 | Fiber 6 | Fiber 7 |
|---|---|---|---|---|---|---|---|---|
| Valid_as_input | 1 | 1 | 1 | 0 | 0 | 0 | 0 | 0 |
| Vertex index (VS) | U\|V | U\|V | U\|V | U\|V | 0 | 0 | 0 | 0 |
| Uv_msb | u\|v | u\|v | u\|v | u\|v | 0 | 0 | 0 | 0 |
| primitiveID(HS & GS) | 105 | 105 | 105 | 105 | 105 | 105 | 105 | 105 |
| Rel_patchID | 5 | 5 | 5 | 5 | 5 | 5 | 5 | 5 |
| Valid_as_output | 1 | 1 | 1 | 1 | 1 | 1 | 1 | 1 |
| misc-> rel_primID (4:0) | 0 | 0 | 0 | 0 | 0 | 0 | 0 | 0 |
| misc-> rel_vertex (9:5) | 0 | 1 | 2 | 0 | 0 | 0 | 0 | 0 |

TABLE 6-continued

Parameter Values With Geometry Shading

| Mode 4<br>GS: on, HS: on | Fiber<br>0 | Fiber<br>1 | Fiber<br>2 | Fiber<br>3 | Fiber<br>4 | Fiber<br>5 | Fiber<br>6 | Fiber<br>7 |
|---|---|---|---|---|---|---|---|---|
| misc–><br>GSInstance1 4:10) | 0 | 0 | 2 | 0 | 0 | 0 | 0 | 0 |
| misc–><br>GsOutvertex (24:15) | 0 | 1 | 2 | 3 | 4 | 5 | 6 | 7 |

After completing the operations associated with the first pass (Pass I) as shown in FIG. 11, GPU 36 may wait for idle. GPU 36 may then perform the second pass of the draw call (Pass II) to complete the draw call.

Figure 12A:
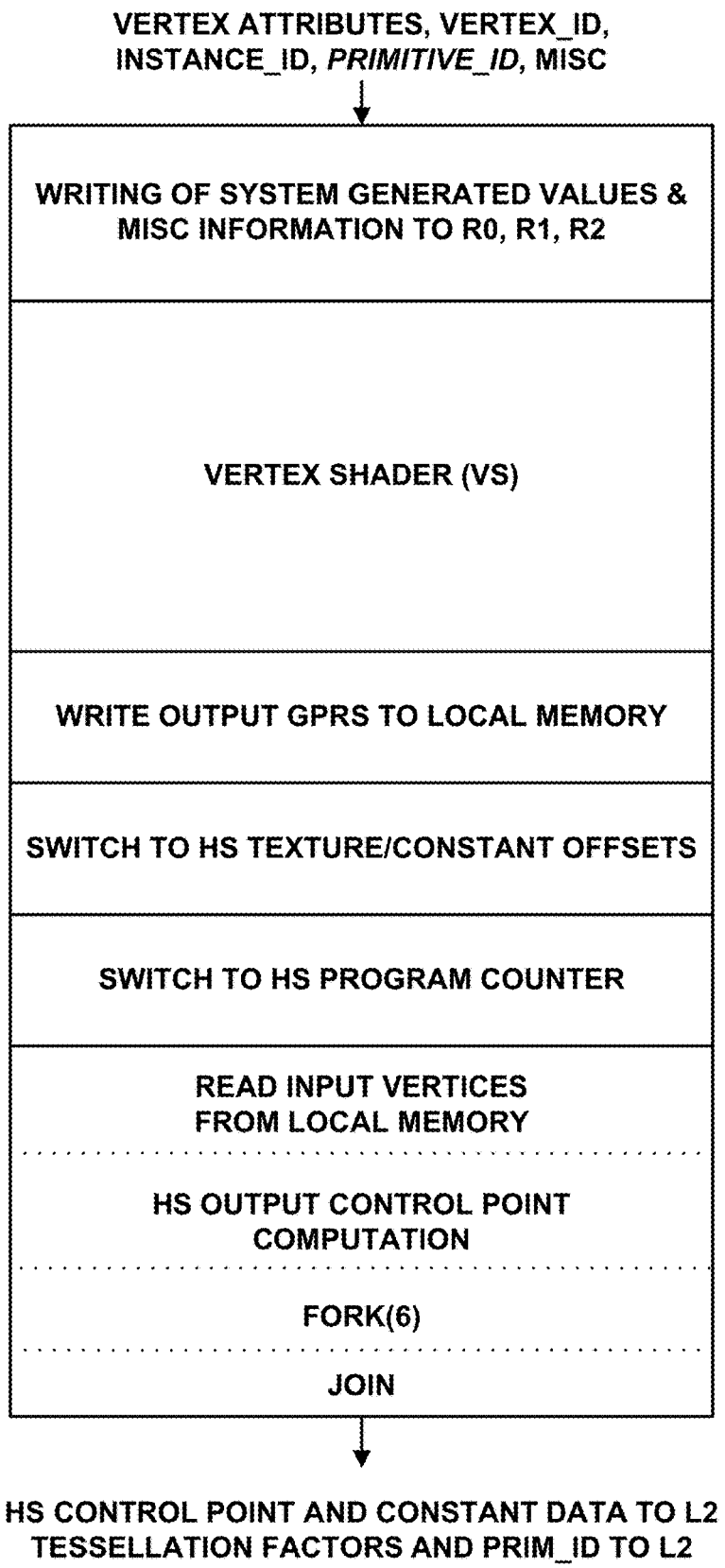
FIG. 12A illustrates a flow of operations performed by a merged vertex shader/hull shader hardware shading unit when performing vertex shading operations and hull shading operations.

FIGS. 12A and 12B illustrate example operations that may be performed by a hardware shading unit implementing the techniques of this disclosure. FIGS. 12A and 12B may generally correspond to the shading operations described above with respect to Pass I.

For example, FIG. 12A generally illustrates a flow of operations performed by a merged VS/HS hardware shading unit when performing vertex shading operations and hull shading operations. The merged VS/HS hardware shading unit, in some examples, may include a shading unit 40 that is designated by GPU 36 to perform vertex shading operations, but that performs both vertex shading operations and hull shading operations in accordance with techniques of this disclosure. FIG. 12B generally illustrates pseudo code corresponding to the flow of operations shown in FIG. 12A, which may be executed by the merged VS/HS hardware shading unit.

As shown in FIG. 12A, the hardware shading unit may perform VS operations followed by HS operations. For example, a GPU (such as GPU 36) may write system generated values including vertex attributes, vertex_id, instance_id, primitive_id, and misc (as described above) to registers. As noted above, by storing the system generated values to a series of registers in a predetermined location, GPU 36 may access the system generated values for each of the VS and HS stages. Accordingly, the HS stage does not need to be complied based on the VS stage in order to determine where system generated values have been stored. Rather, GPU 36 may access predetermined memory locations when performing each of the stages to access the required system generated values.

The hardware shading unit may then perform vertex shading operations to generate one or more shaded vertices. The hardware shading unit may write the shaded verticies to local memory, so that the shaded vertices are available for hull shading operations.

The GPU may then switch the memory offsets and program counter prior to performing the hull shading operations. The GPU may perform such tasks, for example, when executing the patch code described above. The hardware shading unit may then read the shaded vertices from local memory and perform hull shading operations to generate one or more control points and tessellation factors.

The control points and tessellation factors generated during the first pass may be stored, for example, to local GPU memory. In some examples, the control points and tessellation factors may be stored in separate buffers within local GPU memory.

FIG. 12B is an example portion of code that may be executed by the hardware shading unit performing the Pass I operations described above. In the example shown in FIG. 12B, the capital lettered words are state or constant registers. The italicized words indicate shader input. A number of GPRs allocated for the VS/HS operations is maximum of (gprs_needed_for_vs, gprs_needed_for_hs). Accordingly, after being used in VS operations, the GPRs are released and used for HS operations.

In some instances, in the VS portion of the shading operations, only valid VS fibers are executed (as noted above with respect to FIG. 5B). On encountering an 'SWITCH_ACTIVE' instruction, the coverage mask bits are changed to be associated with the HS shader, and only active HS fibers are executed. In this way, the reserved registers may be used by both VS and HS, and the VS and HS may be implemented by a single hardware shading unit without re-designating the shading unit to perform HS operations.

Figure 13A:
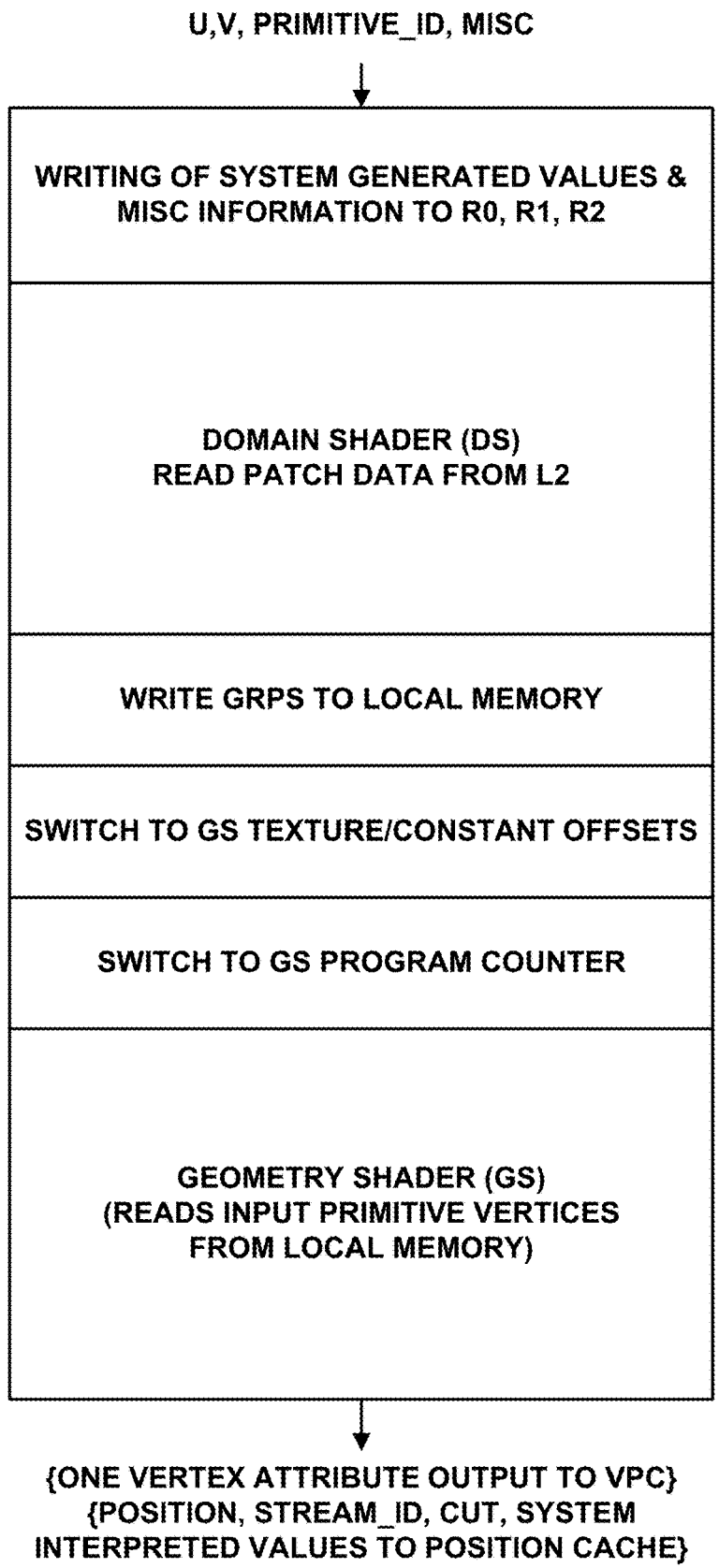
FIG. 13A generally illustrates a flow of operations performed by a merged domain shader/geometry shader hardware shading unit when performing domain shading operations and geometry shading operations.

FIGS. 13A and 13B also illustrate example operations that may be performed by a hardware shading unit implementing the techniques of this disclosure. FIGS. 13A and 13B may generally correspond to Pass II shading operations described above.

For example, FIG. 13A generally illustrates a flow of operations performed by a merged DS/GS hardware shading unit when performing domain shading operations and geometry shading operations. The merged DS/GS hardware shading unit, in some examples, may include the same shading unit 40 as described above with respect to FIGS. 12A and 12B and that is originally designated by GPU 36 to perform vertex shading operations. FIG. 13B generally illustrates pseudo code corresponding to the flow of operations shown in FIG. 13A, which may be executed by the merged DS/GS hardware shading unit.

According to aspects of this disclosure, the first pass (described with respect to FIGS. 12A and 12B) may be followed by a "wait for idle." That is, to prevent data from being read from local memory during the second pass before the data has been fully written to memory during the first pass, the GPU may wait for one or more components of the GPU to register as being idle (e.g., not computing or transferring data) before initiating the second pass operations shown in FIGS. 13A and 13B.

In any case, as shown in FIG. 13A, the hardware shading unit may perform Pass II operations including domain shading and geometry shading (tessellation may also be performed by a fixed-function tessellation unit). For example, the GPU may write system generated values including {U, V} coordinates, primitive_id, and misc (as described above) to registers. As noted above, by storing the system generated values to a series of registers in a predetermined location, GPU 36 may access the system generated values for each of the DS and GS stages. Accordingly, the GS stage does not need to be complied based on the DS stage in order to determine where system generated values have been stored. Rather, GPU 36 may access predetermined memory locations when performing each of the stages to access the required system generated values.

The hardware shading unit may then perform domain shading operations to generate one or more tessellated vertices. The hardware shading unit may write the tessellated verticies to local memory, so that the tessellated vertices are available for geometry shading operations.

The GPU may then switch the memory offsets and program counter prior to performing the geometry shading operations. The GPU may perform such tasks, for example, when executing the patch code described above. The hardware shading unit may then read the tessellated vertices from local memory and perform geometry shading operations to generate one or more geometry shaded vertices, which may be stored to a vertex parameter cache.

In the example shown in FIG. 13B, the capital lettered words are state or constant registers. The italic word indicates shader input. Number of GPRs allocated for this shader is a maximum of (gprs_needed_for_vs, gprs_needed_for_gs). Accordingly, GPRs used in DS operations are released and used for GS operations. Upon encountering an 'SWITCH_ACTIVE' instruction, the coverage mask bits are changed to be associated with the GS operations, and only active GS fibers are executed. Upon encountering an 'END_1st' instruction, the hardware shader unit may switch resource offsets for the Constant File and Texture Pointers (e.g., a resource pointer) to the GS programmed offsets and jump to the first instruction of the GS. In this way, the reserved registers may be used by both DS and GS shader stages, and the DS and GS shader stages may be executed by the same hardware shading unit that performed the Pass I operations.

As shown in the examples of FIGS. 12A-13B, a single hardware shading unit may perform the operations of four different shader stages. According to some examples, the patch code for merging shader stages may be the same, regardless of which shader stages are being merged. For example, DS operations may be merged with GS operations using the same patch code (shown in the second dashed box from the top of FIG. 13B) as that used for merging VS and HS operations (shown in the second dashed box from the top of FIG. 12B). The hardware shading unit may switch to the appropriate shading operations based on an operational mode (as shown and described with respect to the tables above), which may be determined by the GPU at draw time.

According to aspects of this disclosure, each shader stage (VS/GS/HS/DS) may be complied separately and without knowing how the stages will be linked during execution. Accordingly, three GPRs may be reserved to store parameters such as primitveID, rel_patch_ID and misc. The compiler may cause input attributes or internal variables to be stored in GPRs IDs beyond two for DX10/DX11 applications.

Figure 14:
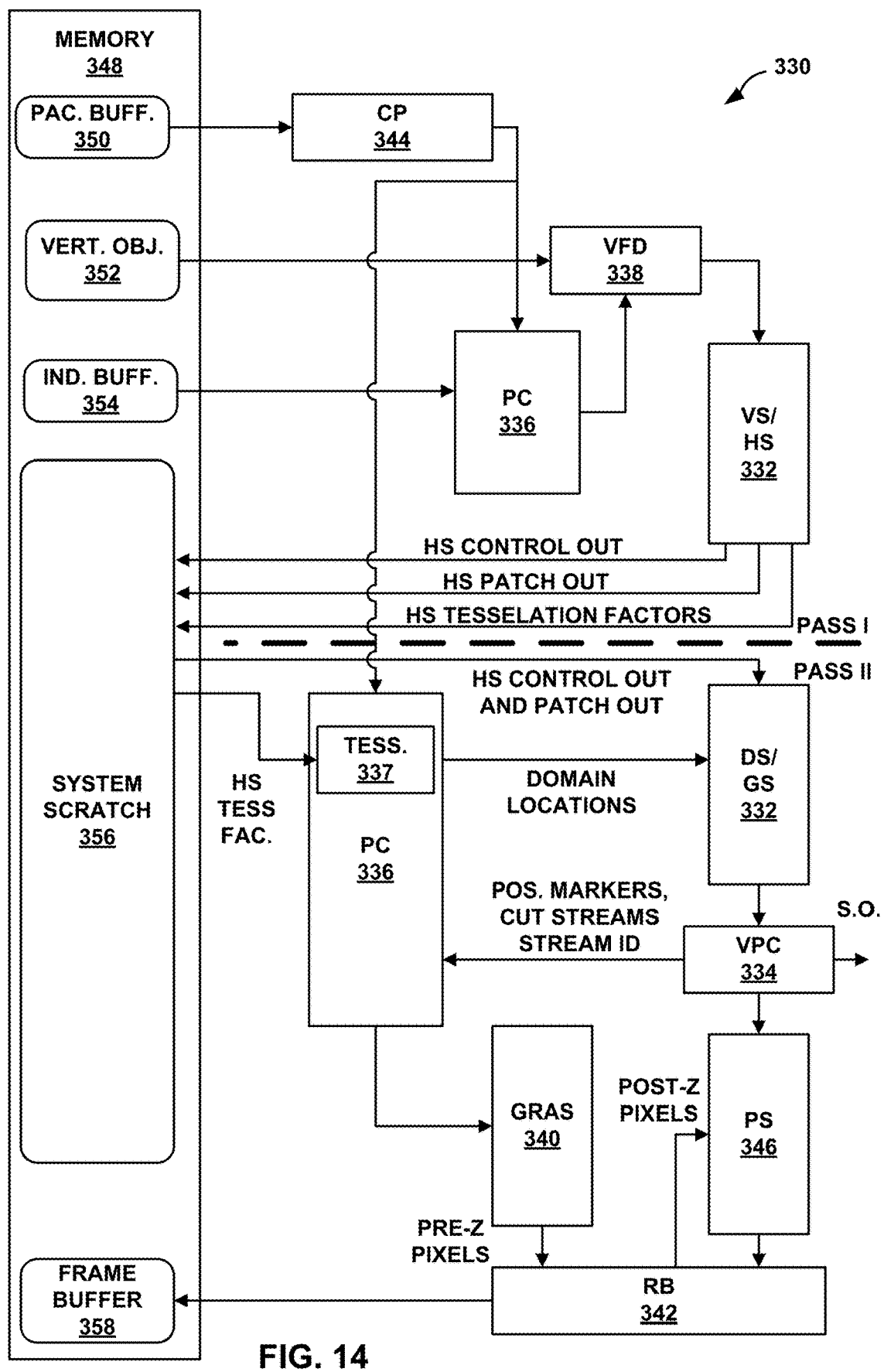
FIG. 14 is a diagram illustrating example components of a graphics processing unit for performing merged vertex shading, hull shading, domain shading, and geometry shading operations, according to aspects of this disclosure.

FIG. 14 is a diagram illustrating example components of a graphics processing unit 330 for performing merged vertex shading, hull shading, domain shading, and geometry shading operations, according to aspects of this disclosure. The example of FIG. 14 includes merged VS/HS unit (Pass I) and merged DS/GS unit (Pass II) 332, a vertex parameter cache (VPC) 334, a primitive controller (PC) 336 having tessellator 337, a vertex fetch decoder (VFD) 338, a graphics rasterizer (GRAS) 340, a render backend (RB) 342, a command processor (CP) 344, and a pixel shader (PS) 346. In addition, FIG. 14 includes memory 348 having PM4 packet buffers 350, vertex objects 352, index buffers 354, a system scratch 356 and a frame buffer 358.

In the example of FIG. 14, the VS/GS unit 332 is implemented by one or more shading units in the manner described above. VPC 334 may implement the stream out functionality to store stream out data to memory 348. PC 336 may manage vertices that may need to be transformed, and assembles the vertices into triangle primitives. VFD 338 may fetch vertex data based on vertex format state. GRAS 340 may receive triangle vertices as an input and may output pixels that are within the triangle boundaries. A pre-fetch parser (PFP) may pre-decode a command stream and fetch data via pointers (e.g., resource pointers) so that this data is ready by the time the main CP engine 344 needs this data.

With respect to a dispatch mechanism for DirectX 11, a draw call may be divided in two pass draw by CP 344. Based on available storage to store output of Pass I, a draw call may be divided into multiple sub-draw calls, with each sub-draw call having a Pass I and a Pass II. Each sub-draw call may adhere to the ordering of passes, such that Pass I is performed for a sub-draw call, followed by Pass II for the sub-draw call.

Upon receiving a sub-draw call with Pass I, PC 336 may fetch indices and process a patch primitive type using VS/HS 332. VS/HS 332 creates $HS\_FIBERS\_PER\_PATCH=2^{ceil(log_2(max(input_{patch}, output_{patch})))}$ VS fibers per patch and fits integer number of patches per wave (where a wave is a given amount of work). There is no vertex reuse at the input. Since the output of the VS/HS 332 is transferred off-chip to system scratch 356, there may be no allocation of position and parameter cache.

Based on HS_FIBERS_PER_PATCH a GPU driver (such as GPU driver 50 shown in FIG. 1) may compute how many input primitive vertices will be stored in local memory (local to VS/HS 332). This may be computed as:

$$HS\_LM\_SIZE \left\lceil \frac{fibers\_in\_a\_wave}{HS\_FIBERS\_PER\_PATCH} \right\rceil * control\_points\_in\_input\_patch * size\_of\_vertex$$

The driver may also add additional size to HS_LM_SIZE if the driver is to write intermediate data to local memory before writing the final data to memory 348. Such additional space may be useful if HS is using a computed control point in multiple phases of the HS (e.g., in a constant phase of the HS). A high level sequencer (HLSQ) that receives the draw call of this type may check which shading unit's local memory (LM) has enough storage for GS_LM_SIZE. The HLSQ may maintain the start base address of such an allocation, as well as the address of any read or write to local memory by an allocated wave. The HLSQ may also add a computed offset within the allocated memory to the base address when writing to local memory.

System interpreted values (SIV) (e.g., clip/cull distances, rendertarget, viewport) may also be provided to VPC 334 for loading into PS 346. A shader stage (e.g., VS or GS) may conditionally output the values. Accordingly, if PS 346 needs the values, PS 346 may set such a condition as part of a state. If PS 346 does not need the values, and such a determination is done after compilation of the pixel shading operations, the state of outputting these SIVs can be reset so that VS or GS will not write the values to VPC 334 at draw time.

For null GS (if no geometry shader stage is being executed), the compiler may also create a template GS, so that there is no separate path for null or non-null GS. This template GS may copy VS or domain shader (DS) output to local memory and further copy from local memory to output to VPC 334. This may only be done for a case in which stream out is performed.

The process of binning and consuming a visibility streams may be different, depending on which shaders are being implemented. For example, certain GPUs may divide image data to be rendered into tiles or "bins," rendering each bin successively (or sometimes concurrently or in parallel) until the entire image is rendered. By dividing the image into bins, the GPUs may reduce on-chip memory requirements while also promoting less data retrieval from off-chip memory (considering that the on-chip memory may be large enough to store sufficient image data to render the tile).

With respect to a visibility stream, a Z-buffer algorithm may be used to determine primitives that are occluded by other primitives (and therefore do not need to be rendered). For example, the GPU may draw each primitive, working from the back-most (depth-wise) primitive to the front-most (again, depth-wise) primitive. In this example, some primitives may be rendered only to be drawn over by other primitives.

As a result of this so-called "overdraw," GPUs may be adapted to perform early Z-buffer algorithm testing, which allows the GPUs to identify primitives that are entirely occluded or not within the eye view to be ignored or bypassed when the GPU performs rendering. In this respect, GPUs may be adapted to determine what may be referred to as visibility information with respect to each primitive and/or object.

With respect to DX10, during the binning pass, PC 336 sends "end of primitive" to GRAS 340 at the end of all the output primitives from a GS. Therefore, visibility information is recorded per input primitive. Stream out may be performed during the binning pass. CP 344 can read all stream out buffer related information at the end of the binning pass. Geometry related query counters may be updated during the binning pass.

A visibility pass may read the visibility stream and advance the stream as visibility information per primitive is read. If no stream is rasterized, then the visibility pass may be skipped. Otherwise, PC 336 checks for visibility input GS primitive and process to render without any streamouts.

With respect to DX11, during a binning pass, PC 336 sends "end of primitive" to GRAS 340 at the end of all the output primitives from a GS in Pass II (e.g., one bit per input patch). Stream out may be performed as described above. During a visibility pass, a visibility stream is processed in Pass I along with patches (only patches with visibility may be processed). Pass II only processes visible patches and fetches tessellation factors for visible patches only.

Table 7, shown below, provides information regarding the binning pass and rendering pass for each of five different modes of operation. Each mode corresponds to certain operations being performed by a single hardware shading unit, as described above.

TABLE 7

Binning for Different Modes

| Modes | VS Stage | PS Stage | Binning Pass | Rendering Pass |
|---|---|---|---|---|
| Mode_0 | VS | PS | Viz information per primitive | Consuming viz stream |
| Mode_1 | VS + GS | PS | Viz information per input primitive: For amplified primitive, bin coverage are or-ed to generate viz information for input primitive | Consuming viz stream |
| Mode_2 | VS + HS | | No viz generation | Consuming viz stream |
| Mode_3 | DS | PS | Viz information is generated per input patch, all the tessellated primitives bin-coverage are or-ed to generate viz information for input primitive | No consuming of viz stream |
| Mode_4 | (DS + GS) | PS | Viz information is generated per input patch, all the tessellated and GS primitives bin-coverage are or-ed to generate viz information for input primitive | No consuming of viz stream |

Figure 15:
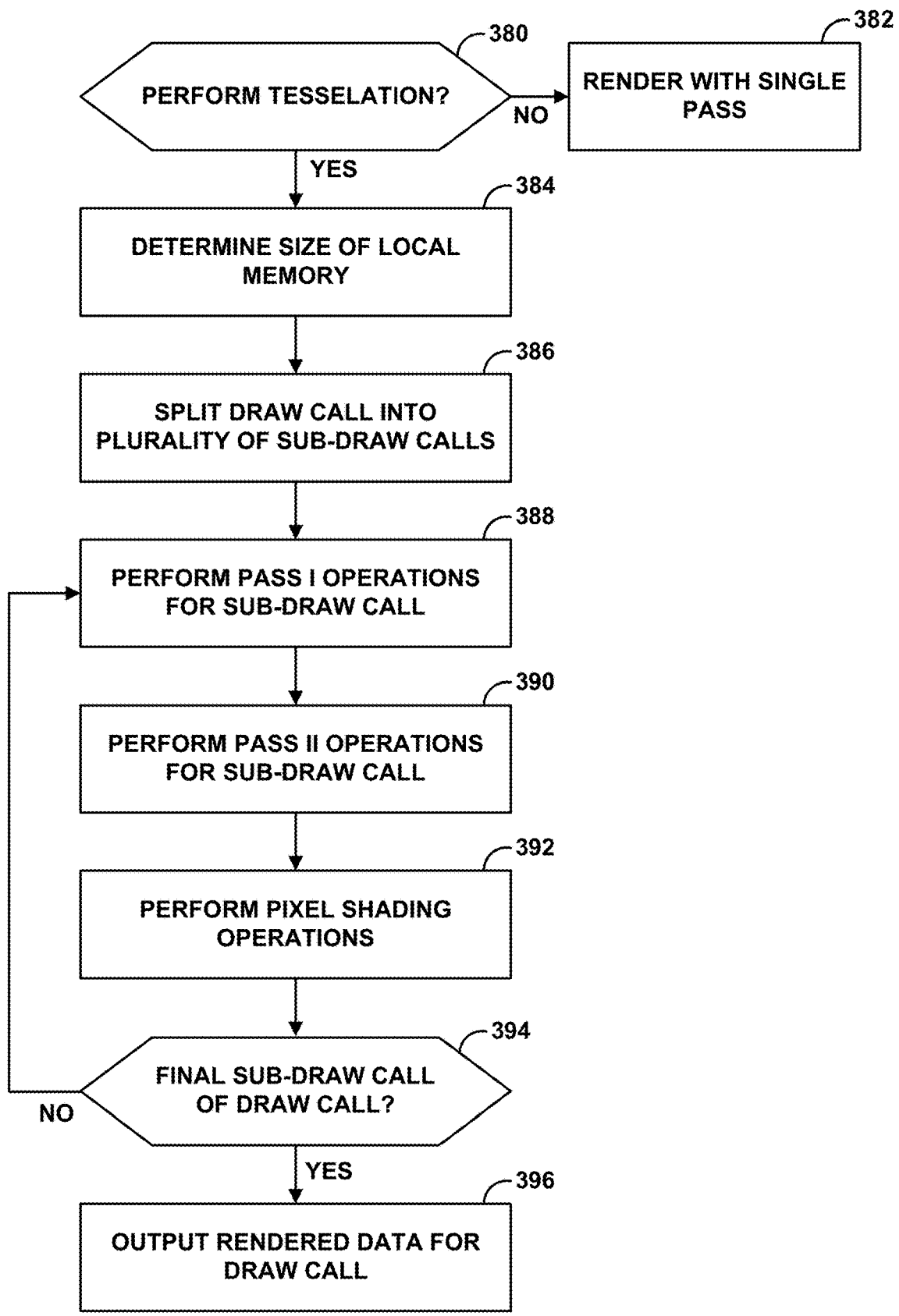
FIG. 15 is a flow diagram illustrating performing graphics rendering in two rendering passes using the same hardware shading unit, according to aspects of this disclosure.

FIG. 15 is a flow diagram illustrating performing graphics rendering in two rendering passes using the same hardware shading unit, according to aspects of this disclosure. While described with respect to GPU 36 (FIG. 1), aspects of this disclosure may be performed by a variety of other GPUs having a variety of other components.

In the example of FIG. 15, GPU 36 determines whether the draw call currently being executed to render graphics includes tessellation operations (380). Tessellation operations may include, for example, operations associated with a hull shader stage, a tessellation stage, and a domain shader stage, as described above. If the draw call does not include tessellation operations, GPU 36 may perform rendering with a single pass (382). For example, GPU 36 may perform vertex shading, geometry shading, and pixel shading in the manner described above.

If the draw call does include tessellation operations, GPU 36 may determine the size of local GPU memory resources, such as GPU memory 38 (384). GPU 36 may then split the draw call into a plurality of sub-draw calls (386). In some examples, each sub-draw call may include the Pass I operations and Pass II operations described above. For example, Pass I operations may include vertex shading operations and hull shading operations, while Pass II operations may include domain shading operations and geometry shading operations.

The amount of data rendered by each sub-draw call may be determined based on the size of GPU memory 38. For example, GPU 36 may configure the sub-draw calls so that GPU 36 is able to store all of the data generated by the Pass I operations to local memory for use with Pass II operations. In this way, GPU 36 may reduce the amount of data being transferred between local GPU memory and memory external to the GPU, which may reduce latency associated with rendering, as described above.

After determining the sub-draw calls, GPU 36 may perform Pass I operations for the first sub-draw call (388). As noted above, Pass I operations may include performing vertex shading operations and hull shading operations using the same hardware shading unit, e.g., each of one or more shading units 40. That is, while GPU 36 may designate a number of shading units 40 to perform vertex shading, each of the shading units 40 may perform both vertex shading and hull shading operations.

GPU 36 may also perform Pass II operations for the first sub-draw call (390). As noted above, Pass II operations may include performing domain shading operations and geometry shading operations using the same one or more shading units 40. Again, while GPU 36 may designate a number of shading units 40 to perform vertex shading, each of the shading units 40 may perform Pass II operations such that each of shading units 40 performs vertex shading operations, hull shading operations, domain shading operations, and geometry shading operations.

GPU 36 may also perform pixel shading operations for the sub-draw call (392). GPU 36 may perform pixel shading operations using one or more other shading units 40. In other examples, GPU 36 may perform pixel shading for an entire draw call after all of the sub-draw calls are complete.

GPU 36 may then determine whether the completed sub-draw call is the final sub-draw call of the draw call (392). If the sub-draw call is the final sub-draw call of a draw call, GPU 36 may output the rendered graphics data associated with the draw call. If the sub-draw call is not the final sub-draw call of the draw call, GPU 36 may return to step 388 and perform Pass I operations for the next sub-draw call.

It should be understood that the steps shown in FIG. 15 are provided as merely one example. That is, the steps shown in FIG. 15 need not necessarily be performed in the order shown, and fewer, additional, or alternative steps may be performed.

Figure 16:
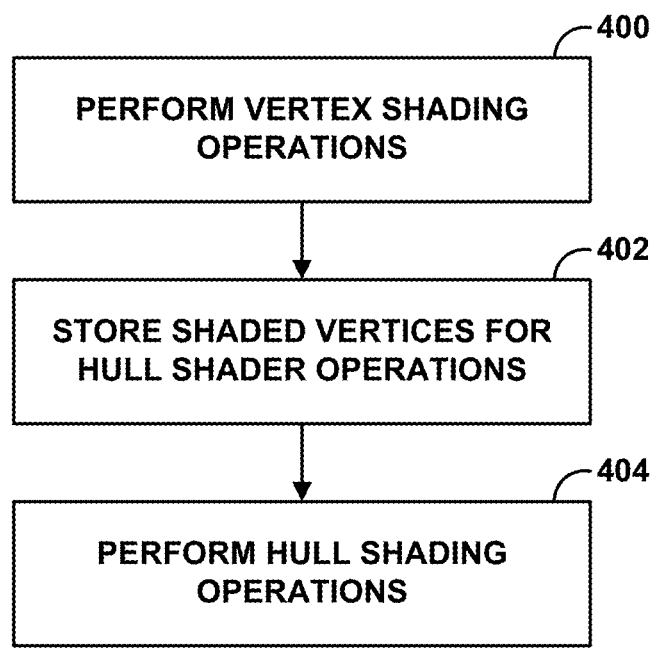
FIG. 16 is a flow diagram illustrating performing graphics rendering operations associated with a first pass of a two pass graphics rendering process, according to aspects of this disclosure.

FIG. 16 is a flow diagram illustrating performing graphics rendering operations associated with a first pass of a two pass graphics rendering process, according to aspects of this disclosure. The process shown in FIG. 16 may correspond to the Pass I operations described above with respect to step 388 of FIG. 15. While described with respect to GPU 36 (FIG. 1), aspects of this disclosure may be performed by a variety of other GPUs having a variety of other components.

In the example of FIG. 16, GPU 36 may initially designate one or more shading units 40 to perform vertex shading operations associated with a vertex shader stage of a graphics rendering pipeline, as described above (400). After performing the vertex shading operations, each of the designated shading units 40 may store the shaded vertices to local memory for hull shading operations (402). GPU 36 may also change a program counter for tracking hull shading operations, as well as change one or more resource pointers to hull shader resources offset. For example, the resource pointers may point to data locations allocated for hull shading operations.

In this sense, each of the shading units 40 change operational modes to perform hull shading operations. However, the mode change does not include re-designating the shading units 40 to perform the hull shading operations. That is, components of GPU 36 may still be configured to send data to and receive data from in the 1:1 interface format of a shading unit designated for vertex shading operations.

GPU 36 may then perform hull shading operations associated with a hull shader stage of a graphics rendering pipeline using the same shading units 40 that performed the vertex shading operations, as described above (404). For example, each shading unit 40 may operate on shaded vertices to generate one or more control points, which may be used for tessellation.

It should be understood that the steps shown in FIG. 16 are provided as merely one example. That is, the steps shown in FIG. 16 need not necessarily be performed in the order shown, and fewer, additional, or alternative steps may be performed.

Figure 17:
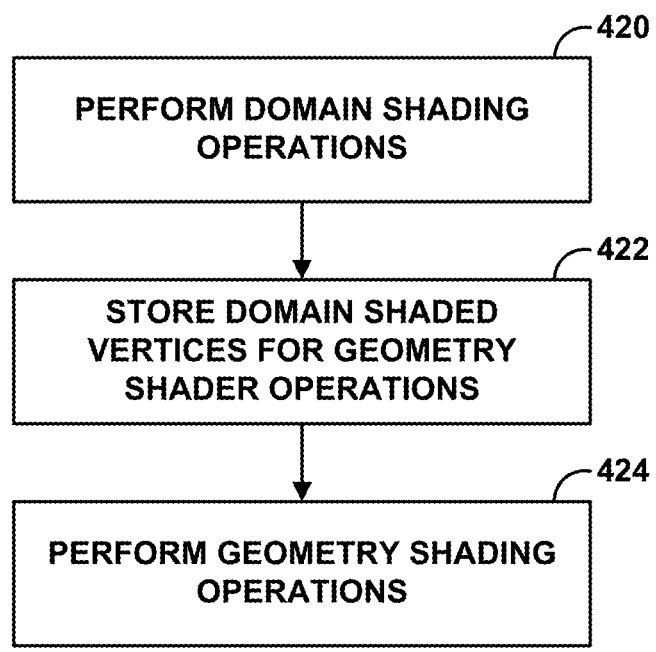
FIG. 17 is a flow diagram illustrating performing graphics rendering operations associated with a second pass of a two pass graphics rendering process, according to aspects of this disclosure.

FIG. 17 is a flow diagram illustrating performing graphics rendering operations associated with a second pass of a two pass graphics rendering process, according to aspects of this disclosure. The process shown in FIG. 17 may correspond to the Pass II operations described above with respect to step 390 of FIG. 15. While described with respect to GPU 36 (FIG. 1), aspects of this disclosure may be performed by a variety of other GPUs having a variety of other components.

In the example of FIG. 17, GPU 36 may use the same shading units 40 described above with respect to FIG. 16 for performing the operations of FIG. 17. For example, to perform Pass II operations, the same shading units 40 may first perform domain shading operations associated with a domain shader stage of the graphics rendering pipeline, as described above (420). That is, shading units 40 may operate on control points (from a hull shader stage) to generate domain shaded vertices.

After performing the domain shading operations, each of the designated shading units 40 may store the domain shaded vertices to local memory for geometry shading operations (402). GPU 36 may also change a program counter for tracking hull shading operations, as well as change one or more resource pointers to a hull shader resources offset. In examples in which the operations of FIG. 17 follow those described with respect to FIG. 16, these functions (e.g., storing values to local memory, changing a program counter, changing resource offsets) may also be performed prior to step 420.

In this sense, each of the shading units 40 change operational modes to perform domain shading and geometry shading operations. However, the mode change does not include re-designating the shading units 40 to perform the domain shading and geometry shading operations. That is, components of GPU 36 may still be configured to send data to and receive data from in the 1:1 interface format of a hardware shading unit designated for vertex shading operations.

GPU 36 may then perform geometry shading operations associated with a geometry shader stage of a graphics rendering pipeline using the same shading units 40 that performed the domain shading operations, as described above (424). For example, each shading unit 40 may operate on domain shaded vertices to generate one or more geometry shaded vertices.

It should be understood that the steps shown in FIG. 17 are provided as merely one example. That is, the steps shown in FIG. 17 need not necessarily be performed in the order shown, and fewer, additional, or alternative steps may be performed.

Figure 18:
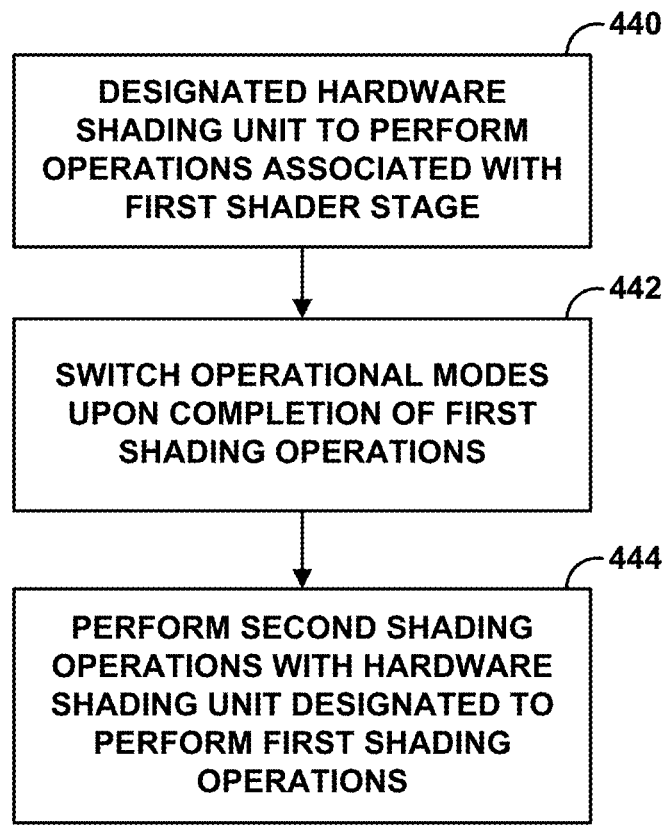
FIG. 18 is a flow diagram illustrating patching more than one shader stage together for execution by the same hardware shading unit, according to aspects of this disclosure.

FIG. 18 is a flow diagram illustrating patching more than one shader stage together for execution by the same hardware shading unit, according to aspects of this disclosure. While described with respect to GPU 36 (FIG. 1), aspects of this disclosure may be performed by a variety of other GPUs having a variety of other components.

In the example of FIG. 18, GPU 36 may designate one or more hardware shading units, e.g., one or more shading units 40, to perform shading operations associated with a first shader stage (440). In some examples, the first shader stage may be a vertex shader stage for generating vertices, such that GPU 36 designates one or more shading units to perform vertex shading operations.

Upon completing the operations associated with the first shader stage, GPU 36 may switch operational modes, allowing the same shading units 40 to perform a variety of other shading operations (442). For example, as described above, GPU 36 may change a program counter and one or more resource pointers for performing second shading operations.

In some examples, GPU 36 may switch the operational mode of the shading units 40 based on mode information associated with the draw call being executed. For example, a driver of GPU 36 (such as GPU driver 50) may generate a mode number for a draw call that indicates which shader stages are to be executed in the draw call. GPU 36 may use this mode number to change operational modes of the shading units upon executing a patch code, as described above.

Table 8, shown below, generally illustrates mode information including mode numbers for a variety of combinations of shader stages.

TABLE 8

Shader Pipeline Configurations

| VS | (HS, TE, DS) | GS | SO | PS | Draw mode |
|---|---|---|---|---|---|
| on | off | off | off | on | Mode 0 |
| on | off | off | on | on/off | Mode 0 |
| on | off | on | off | on | Mode 1 |
| on | off | on | on | on/off | Mode 1 |
| on | on | off | off | on | Pass 1: Mode 2 |
|    |    |    |    |    | Pass 2: Mode 3 |
| on | on | off | on | on/off | Pass 1: Mode 2 |
|    |    |    |    |    | Pass 2: Mode 3 |
| on | on | on | off | on | Pass 1: Mode 2 |
|    |    |    |    |    | Pass 2: Mode 4 |
| on | on | on | on | on | Pass 1: Mode 2 |
|    |    |    |    |    | Pass 2: Mode 4 |

As shown in Table 8, each mode dictates which shader stages are performed by shading units. Accordingly, GPU 36 can string shader instructions together, allowing the same shading units 40 to perform multiple shading operations. That is, GPU 36 can patch together the appropriate shader instructions based on the mode number of the draw call being executed.

In this way, GPU 36 may then perform second shading operations with the same shading units 40 designated to perform the first shading operations (444). For example, GPU 36 may perform a combination of vertex shading operations, hull shading operations, domain shading operations, and geometry shading operations, as shown in Table 8 above.

It should be understood that the steps shown in FIG. 18 are provided as merely one example. That is, the steps shown in FIG. 18 need not necessarily be performed in the order shown, and fewer, additional, or alternative steps may be performed.

While certain examples described above include initially designating hardware shading units to perform vertex shading operations and transitioning to performing other shading operations with the same hardware shading units, it should be understood that the techniques of this disclosure are not limited in this way. For example, a GPU may initially designate a set of hardware shading units to perform a variety of other shading operations. That is, in a system that allows GPU to designate hardware shading units to perform three different shading operations, GPU may designate hardware shading units to perform vertex shading operations, hull shading operations, and pixel shading operations. In this example, GPU may initially designate one more hardware shading units to perform hull shading operations, but may also perform domain shading operations and geometry shading operations with the same hardware shading units, as described above. A variety of other operational combinations are also possible.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for rendering graphics, the method comprising:
   performing, with a hardware unit of a graphics processing unit designated for vertex shading, a vertex shading operation to shade input vertices so as to output vertex shaded vertices, wherein the hardware unit adheres to an interface that receives a single vertex as an input and generates a single vertex as an output; and
   performing, with the hardware unit of the graphics processing unit designated for vertex shading, one or more tessellation operations on one or more of the vertex shaded vertices, wherein performing the one or more tessellation operations comprises performing a hull shading operation on at least one of the one or more vertex shaded vertices to output one or more control points, and wherein instructions associated with the hull shading operation are appended to instructions associated with the vertex shading operation, such that the vertex shading operation and the hull shading operation are executed in sequence.

2. The method of claim 1, wherein performing the vertex shading operation and performing the hull shading operation are associated with performing a first rendering pass, and further comprising performing a second rendering pass comprising:

performing, with the hardware unit of the graphics processing unit designated for vertex shading, a domain shading operation comprising generating vertex values based at least on the control points; and performing, with the hardware unit of the graphics processing unit designated for vertex shading, a geometry shading operation to generate one or more new vertices based on one or more of the vertex values generated by the domain shading operation, wherein the geometry shading operation operates on at least one of the one or more of the vertex values generated by the domain shading operation to output the one or more new vertices.

3. The method of claim 2, further comprising completing the first rendering pass before performing the second rendering pass such that one or more components of the graphics processing unit are idle between the first rendering pass and the second rendering pass.

4. The method of claim 2, wherein the vertex shading operation, the hull shading operation, the domain shading operation, and the geometry shading operation are associated with a draw call, and further comprising splitting the draw call into a plurality of sub-draw calls based on a size of a memory of the graphics processing unit, wherein each of the plurality of sub-draw calls comprises operations of the first rendering pass and operations of the second rendering pass.

5. The method of claim 2, further comprising appending instructions associated with the geometry shading operation to instructions associated with the domain shading operation, such that the domain shading operation and the geometry shading operation are executed in sequence.

6. The method of claim 1, wherein performing the hull shading operation comprises:
 executing a first instance of a hull shader program with the hardware unit of the graphics processing unit;
 executing a second instance of the hull shader program with the hardware unit of the graphics processing unit;
 outputting a single control point from the first instance of the hull shader program so as to adhere to the interface of the hardware unit; and
 outputting a second, single control point from the second instance of the hull shader program so as to adhere to the interface of the hardware unit.

7. The method of claim 6, wherein executing the first instance of the hull shader program comprises concurrently executing the first instance of the hull shader program and the second instance of the hull shader program with the hardware unit of the graphics processing unit.

8. The method of claim 6,
 wherein the first instance of the hull shader program is assigned a first hull shader output identifier,
 wherein the second instance of the hull shader program is assigned a second hull shader output identifier,
 wherein outputting the single control point comprises outputting the single control point based on a comparison of the first hull shader output identifier to a first control point identifier, and
 wherein outputting the second, single control point comprises outputting the second, single control point based on a comparison of the second hull shader output identifier to a second control point identifier.

9. The method of claim 1, further comprising, prior to performing the hull shading operation, switching a program counter and one or more resource pointers for the hull shading operation.

10. A graphics processing unit for rendering graphics comprising one or more processors, the one or more processors configured to:
 perform, with a hardware unit of the graphics processing unit designated for vertex shading, a vertex shading operation to shade input vertices so as to output vertex shaded vertices, wherein the hardware unit adheres to an interface that receives a single vertex as an input and generates a single vertex as an output; and
 perform, with the hardware unit of the graphics processing unit designated for vertex shading, one or more tessellation operations on one or more of the vertex shaded vertices, wherein performing the one or more tessellation operations comprises performing a hull shading operation on at least one of the one or more vertex shaded vertices to output one or more control points, and wherein instructions associated with the hull shading operation are appended to instructions associated with the vertex shading operation, such that the vertex shading operation and the hull shading operation are executed in sequence.

11. The graphics processing unit of claim 10, wherein the vertex shading operation and the hull shading operation are associated with a first rendering pass, and wherein the one or more processors are further configured to perform a second rendering pass, wherein the one or more processors are configured to:
 perform, with the hardware unit of the graphics processing unit designated for vertex shading, a domain shading operation comprising generating vertex values based at least on the control points; and
 perform, with the hardware unit of the graphics processing unit designated for vertex shading, a geometry shading operation to generate one or more new vertices based on one or more of the vertex values generated by the domain shading operation, wherein the geometry shading operation operates on at least one of the one or more of the vertex values generated by the domain shading operation to output the one or more new vertices.

12. The graphics processing unit of claim 11, wherein the one or more processors are further configured to complete the first rendering pass before performing the second rendering pass such that one or more components of the graphics processing unit are idle between the first rendering pass and the second rendering pass.

13. The graphics processing unit of claim 11, wherein the vertex shading operation, the hull shading operation, the domain shading operation, and the geometry shading operation are associated with a draw call and wherein the one or more processors are further configured to split the draw call into a plurality of sub-draw calls based on a size of a memory of the graphics processing unit, wherein each of the plurality of sub-draw calls comprises operations of the first rendering pass and operations of the second rendering pass.

14. The graphics processing unit of claim 11, wherein the one or more processors are further configured to append instructions associated with the geometry shading operation to instructions associated with the domain shading operation, such that the domain shading operation and the geometry shading operation are executed in sequence.

15. The graphics processing unit of claim 10, wherein to perform the hull shading operation, the hardware unit is configured to:
 execute a first instance of a hull shader program with the hardware unit of the graphics processing unit;

execute a second instance of the hull shader program with the hardware unit of the graphics processing unit;

output a single control point from the first instance of the hull shader program so as to adhere to the interface of the hardware unit; and output a second, single control point from the second instance of the hull shader program so as to adhere to the interface of the hardware unit.

16. The graphics processing unit of claim 15, wherein the hardware unit is configured to concurrently execute the first instance of the hull shader program and the second instance of the hull shader program with the hardware unit of the graphics processing unit.

17. The graphics processing unit of claim 15,
wherein the first instance of the hull shader program is assigned a first hull shader output identifier,
wherein the second instance of the hull shader program is assigned a second hull shader output identifier,
wherein to output the single control point, the hardware unit is configured to output the single control point based on a comparison of the first hull shader output identifier to a first control point identifier, and
wherein to output the second, single control point, the hardware unit is configured to output the second, single control point based on a comparison of the second hull shader output identifier to a second control point identifier.

18. The graphics processing unit of claim 10, wherein the one or more processors are configured to, prior to performing the hull shading operation, switch a program counter and one or more resource pointers for the hull shading operation.

19. An apparatus for rendering graphics, the apparatus comprising:
means for performing, with a hardware unit of a graphics processing unit designated for vertex shading, a vertex shading operation to shade input vertices so as to output vertex shaded vertices, wherein the hardware unit adheres to an interface that receives a single vertex as an input and generates a single vertex as an output;
means for performing, with the hardware unit of the graphics processing unit designated for vertex shading, one or more tessellation operations on one or more of the vertex shaded vertices, wherein the means for performing the one or more tessellation operations comprises means for performing a hull shading operation on at least one of the one or more vertex shaded vertices to output one or more control points; and
means for appending instructions associated with the hull shading operation to instructions associated with the vertex shading operation, such that the vertex shading operation and the hull shading operation are executed in sequence.

20. The apparatus of claim 19, wherein the means for performing the vertex shading operation and the means for performing the hull shading operation are associated with means for performing a first rendering pass, and further comprising means for performing a second rendering pass comprising:
means for performing, with the hardware unit of the graphics processing unit designated for vertex shading, a domain shading operation comprising generating vertex values based at least on the control points; and
means for performing, with the hardware unit of the graphics processing unit designated for vertex shading, a geometry shading operation to generate one or more new vertices based on one or more of the vertex values generated by the domain shading operation, wherein the geometry shading operation operates on at least one of the one or more of the vertex values generated by the domain shading operation to output the one or more new vertices.

21. The apparatus of claim 20, further comprising means for completing the first rendering pass before performing the second rendering pass such that one or more components of the graphics processing unit are idle between the first rendering pass and the second rendering pass.

22. The apparatus of claim 20, wherein the vertex shading operation, the hull shading operation, the domain shading operation, and the geometry shading operation are associated with a draw call, and further comprising means for splitting the draw call into a plurality of sub-draw calls based on a size of a memory of the graphics processing unit, wherein each of the plurality of sub-draw calls comprises operations of the first rendering pass and operations of the second rendering pass.

23. The apparatus of claim 20, further comprising means for appending instructions associated with the geometry shading operation to instructions associated with the domain shading operation, such that the domain shading operation and the geometry shading operation are executed in sequence.

24. The apparatus of claim 19, wherein the means for performing the hull shading operation comprises:
means for executing a first instance of a hull shader program with the hardware unit of the graphics processing unit;
means for executing a second instance of the hull shader program with the hardware unit of the graphics processing unit;
means for outputting a single control point from the first instance of the hull shader program so as to adhere to the interface of the hardware unit; and
means for outputting a second, single control point from the second instance of the hull shader program so as to adhere to the interface of the hardware unit.

25. The apparatus of claim 24, wherein the means for executing the first instance of the hull shader program comprises means for concurrently executing the first instance of the hull shader program and the second instance of the hull shader program with the hardware unit of the graphics processing unit.

26. The apparatus of claim 24,
wherein the first instance of the hull shader program is assigned a first hull shader output identifier,
wherein the second instance of the hull shader program is assigned a second hull shader output identifier,
wherein the means for outputting the single control point comprises means for outputting the single control point based on a comparison of the first hull shader output identifier to a first control point identifier, and
wherein the means for outputting the second, single control point comprises means for outputting the second, single control point based on a comparison of the second hull shader output identifier to a second control point identifier.

27. The apparatus of claim 19, further comprising, means for switching a program counter and one or more resource pointers for the hull shading operation prior to performing the hull shading operation.

* * * * *